(12) United States Patent
Bradwell et al.

(10) Patent No.: US 11,929,466 B2
(45) Date of Patent: Mar. 12, 2024

(54) ELECTROCHEMICAL ENERGY STORAGE DEVICES

(71) Applicant: Ambri Inc., Marlborough, MA (US)

(72) Inventors: David J. Bradwell, Arlington, MA (US); David A. H. McCleary, Boston, MA (US); Gregory A. Thompson, Cambridge, MA (US); Allan Blanchard, Brighton, MA (US); Jeffrey B. Miller, Brookline, MA (US); Ronald Teel, Georgetown, MA (US); William B. Langhauser, Boston, MA (US); Alexander W. Elliott, Billerica, MA (US); Donald R. Sadoway, Cambridge, MA (US); Michael J. McNeley, Boston, MA (US); Ian Redfern, Cambridge, MA (US)

(73) Assignee: Ambri Inc., Marlborough, MA (US)

( * ) Notice: Subject to any disclaimer, the term of this patent is extended or adjusted under 35 U.S.C. 154(b) by 0 days.

(21) Appl. No.: 18/196,225

(22) Filed: May 11, 2023

(65) Prior Publication Data

US 2023/0282892 A1    Sep. 7, 2023

Related U.S. Application Data

(63) Continuation of application No. 16/293,288, filed on Mar. 5, 2019, which is a continuation of application No. PCT/US2017/050544, filed on Sep. 7, 2017.
(Continued)

(51) Int. Cl.
*H01M 10/39* (2006.01)
*B60L 50/64* (2019.01)
(Continued)

(52) U.S. Cl.
CPC ........... *H01M 10/399* (2013.01); *B60L 50/64* (2019.02); *B60L 53/00* (2019.02); *B60L 53/53* (2019.02);
(Continued)

(58) Field of Classification Search
CPC .............. H01M 10/39; H01M 10/399; H01M 10/4207; H01M 10/425; H01M 50/138;
(Continued)

(56) References Cited

U.S. PATENT DOCUMENTS

| 11,374 A | 7/1854 | Leue |
|---|---|---|
| 2,587,443 A | 2/1952 | Crabtree |

(Continued)

FOREIGN PATENT DOCUMENTS

| AU | 2014229643 A1 | 9/2015 |
|---|---|---|
| AU | 2016225020 A1 | 9/2017 |

(Continued)

OTHER PUBLICATIONS

Advisory Action Before Filing of Appeal Brief dated May 10, 2012 for U.S. Appl. No. 12/839,130.
(Continued)

*Primary Examiner* — Christopher P Domone
(74) *Attorney, Agent, or Firm* — Wilson Sonsini Goodrich & Rosati

(57) ABSTRACT

Provided herein are energy storage devices. In some cases, the energy storage devices are capable of being transported on a vehicle and storing a large amount of energy. An energy storage device is provided comprising at least one liquid metal electrode, an energy storage capacity of at least about 1 MWh and a response time less than or equal to about 100 milliseconds (ms).

20 Claims, 16 Drawing Sheets

Related U.S. Application Data

(60) Provisional application No. 62/384,662, filed on Sep. 7, 2016.

(51) Int. Cl.
| | |
|---|---|
| *B60L 53/00* | (2019.01) |
| *B60L 53/53* | (2019.01) |
| *C04B 37/02* | (2006.01) |
| *H01M 4/134* | (2010.01) |
| *H01M 4/38* | (2006.01) |
| *H01M 10/42* | (2006.01) |
| *H01M 50/138* | (2021.01) |

(52) U.S. Cl.
CPC ............ *H01M 4/134* (2013.01); *H01M 4/38* (2013.01); *H01M 4/381* (2013.01); *H01M 4/382* (2013.01); *H01M 10/4207* (2013.01); *H01M 10/425* (2013.01); *H01M 4/387* (2013.01); *H01M 50/138* (2021.01); *H01M 2220/20* (2013.01); *Y02T 10/70* (2013.01); *Y02T 10/7072* (2013.01); *Y02T 90/14* (2013.01)

(58) Field of Classification Search
CPC .... H01M 50/463; H01M 50/471; H01M 4/38; H01M 4/381; H01M 4/382; H01M 4/387; H01M 2220/10; H01M 2220/20
See application file for complete search history.

(56) References Cited

U.S. PATENT DOCUMENTS

| | | |
|---|---|---|
| 3,057,946 A | 10/1962 | Eidensohn |
| 3,238,437 A | 3/1966 | Foster et al. |
| 3,245,836 A | 4/1966 | Agruss |
| 3,404,035 A | 10/1968 | Kummer et al. |
| 3,419,432 A | 12/1968 | Hesson |
| 3,488,221 A | 1/1970 | Hiroshi et al. |
| 3,507,703 A | 4/1970 | Laszlo |
| 3,535,214 A | 10/1970 | Rene |
| 3,588,573 A | 6/1971 | Chen et al. |
| 3,607,405 A | 9/1971 | Christopher |
| 3,607,407 A | 9/1971 | Adams |
| 3,635,765 A | 1/1972 | Greenberg |
| 3,663,295 A | 5/1972 | Baker |
| 3,666,560 A | 5/1972 | Cairns et al. |
| 3,716,409 A | 2/1973 | Cairns et al. |
| 3,770,506 A | 11/1973 | Rightmire et al. |
| 3,775,181 A | 11/1973 | Ryerson |
| 3,833,420 A | 9/1974 | Will |
| 3,833,421 A | 9/1974 | Rubischko et al. |
| 3,833,422 A | 9/1974 | Will et al. |
| 3,837,918 A | 9/1974 | Nakabayashi |
| 3,839,779 A | 10/1974 | Walker |
| 3,870,561 A | 3/1975 | Charbonnier et al. |
| 3,877,984 A | 4/1975 | Werth |
| 3,878,296 A | 4/1975 | Vine et al. |
| 3,884,715 A | 5/1975 | Gay et al. |
| 3,887,396 A | 6/1975 | Walsh et al. |
| 3,898,096 A | 8/1975 | Heredy et al. |
| 3,907,589 A | 9/1975 | Gay et al. |
| 3,915,742 A | 10/1975 | Battles et al. |
| 3,926,673 A | 12/1975 | Saridakis |
| 3,930,888 A | 1/1976 | Bowser et al. |
| 3,933,521 A | 1/1976 | Vissers et al. |
| 3,941,612 A | 3/1976 | Steunenberg et al. |
| 3,947,291 A | 3/1976 | Yao et al. |
| 3,954,504 A | 5/1976 | Zellhoefer |
| 3,959,012 A | 5/1976 | Liang et al. |
| 3,960,594 A | 6/1976 | Fritz et al. |
| 3,969,139 A | 7/1976 | Lai |
| 3,980,495 A | 9/1976 | Roche et al. |
| 3,988,164 A | 10/1976 | Liang et al. |
| 4,002,807 A | 1/1977 | Ludwig |
| 4,011,374 A | 3/1977 | Kaun |
| 4,015,054 A | 3/1977 | Cleaver et al. |
| 4,018,969 A | 4/1977 | Fischer et al. |
| 4,029,860 A | 6/1977 | Vissers et al. |
| 4,032,614 A | 6/1977 | Lewis |
| 4,044,194 A | 8/1977 | Evans et al. |
| 4,060,667 A | 11/1977 | Askew et al. |
| 4,061,841 A | 12/1977 | Sharma et al. |
| 4,065,602 A | 12/1977 | Roche et al. |
| 4,069,372 A | 1/1978 | Voinov |
| 4,107,401 A | 8/1978 | Goodson et al. |
| 4,125,683 A | 11/1978 | Beckford et al. |
| 4,130,500 A | 12/1978 | Melendres et al. |
| 4,164,608 A | 8/1979 | Coetzer |
| 4,169,120 A | 9/1979 | Miller |
| 4,189,529 A | 2/1980 | Birt et al. |
| 4,195,123 A | 3/1980 | Jumel |
| RE30,353 E | 7/1980 | Voinov |
| 4,216,273 A | 8/1980 | Cadart et al. |
| 4,238,553 A | 12/1980 | Gerlach et al. |
| 4,265,984 A | 5/1981 | Kaye |
| 4,287,268 A | 9/1981 | Coetzer |
| 4,287,269 A | 9/1981 | Coetzer et al. |
| 4,299,890 A | 11/1981 | Rea et al. |
| 4,315,974 A | 2/1982 | Athearn et al. |
| 4,338,380 A | 7/1982 | Erickson et al. |
| 4,360,574 A | 11/1982 | Park |
| 4,367,159 A | 1/1983 | Mrazek et al. |
| 4,405,433 A | 9/1983 | Payne |
| 4,407,912 A | 10/1983 | Virkar et al. |
| 4,457,989 A | 7/1984 | Coetzer |
| 4,510,210 A | 4/1985 | Hunt |
| 4,565,751 A | 1/1986 | Faust et al. |
| 4,582,553 A | 4/1986 | Buchta |
| 4,588,663 A | 5/1986 | Mason et al. |
| 4,596,637 A | 6/1986 | Kozarek et al. |
| 4,622,111 A | 11/1986 | Brown et al. |
| 4,657,830 A | 4/1987 | Kagawa |
| 4,692,390 A | 9/1987 | Roy |
| 4,764,437 A | 8/1988 | Kaun |
| 4,800,143 A | 1/1989 | Harbach et al. |
| 4,818,638 A | 4/1989 | Roy |
| 4,833,046 A | 5/1989 | Roy |
| 4,849,682 A | 7/1989 | Bauer et al. |
| 4,877,695 A | 10/1989 | Cipriano et al. |
| 4,886,715 A | 12/1989 | McCullough, Jr. et al. |
| 4,929,521 A | 5/1990 | Cipriano et al. |
| 4,945,012 A | 7/1990 | Bugga et al. |
| 4,945,257 A | 7/1990 | Marrocco |
| H816 H | 9/1990 | Carder et al. |
| 4,954,403 A | 9/1990 | Plichta et al. |
| 4,965,146 A | 10/1990 | McCullough et al. |
| 4,975,344 A | 12/1990 | Wedlake et al. |
| 4,999,097 A | 3/1991 | Sadoway |
| 5,011,748 A | 4/1991 | Shacklette et al. |
| 5,024,737 A | 6/1991 | Claus et al. |
| 5,034,290 A | 7/1991 | Sands et al. |
| 5,039,351 A | 8/1991 | Cooper et al. |
| 5,044,551 A | 9/1991 | Tanaka et al. |
| 5,139,895 A | 8/1992 | Roy et al. |
| 5,185,068 A | 2/1993 | Sadoway |
| 5,198,638 A | 3/1993 | Massacesi |
| 5,254,232 A | 10/1993 | Sadoway |
| 5,284,562 A | 2/1994 | Beck et al. |
| 5,286,359 A | 2/1994 | Richards et al. |
| 5,369,547 A | 11/1994 | Evans |
| 5,380,406 A | 1/1995 | Horton et al. |
| 5,392,191 A | 2/1995 | Thomas et al. |
| 5,407,119 A | 4/1995 | Churchill et al. |
| 5,429,895 A | 7/1995 | Lian et al. |
| 5,469,325 A | 11/1995 | Evans |
| 5,476,733 A | 12/1995 | Coetzer et al. |
| 5,491,037 A | 2/1996 | Kawakami |
| 5,529,858 A | 6/1996 | Wicker et al. |
| 5,532,078 A | 7/1996 | Redey et al. |
| 5,536,600 A | 7/1996 | Kaun |
| 5,538,813 A | 7/1996 | Li |
| 5,549,989 A | 8/1996 | Anani |
| 5,559,667 A | 9/1996 | Evans |

(56) References Cited

U.S. PATENT DOCUMENTS

| | | |
|---|---|---|
| 5,563,765 A | 10/1996 | Lian et al. |
| 5,578,389 A | 11/1996 | Tsuchimoto et al. |
| 5,587,872 A | 12/1996 | Lian et al. |
| 5,597,331 A | 1/1997 | Gable et al. |
| 5,604,053 A | 2/1997 | Coetzer et al. |
| 5,658,447 A | 8/1997 | Watson et al. |
| 5,661,403 A | 8/1997 | Mackenzie |
| 5,687,056 A | 11/1997 | Harshe et al. |
| 5,688,613 A | 11/1997 | Li et al. |
| 5,688,614 A | 11/1997 | Li et al. |
| 5,693,434 A | 12/1997 | Li et al. |
| 5,714,283 A | 2/1998 | Briscoe et al. |
| 5,716,731 A | 2/1998 | Coetzer et al. |
| 5,735,933 A | 4/1998 | Yokoyama et al. |
| 5,737,181 A | 4/1998 | Evans |
| 5,763,117 A | 6/1998 | Wright et al. |
| 5,798,308 A | 8/1998 | Chatterjee et al. |
| 5,807,412 A | 9/1998 | Li et al. |
| 5,834,131 A | 11/1998 | Lutz et al. |
| 5,856,041 A | 1/1999 | Inoue et al. |
| 5,874,183 A | 2/1999 | Uematsu |
| 5,939,221 A | 8/1999 | Tsuchimoto et al. |
| 5,972,533 A | 10/1999 | Coetzer et al. |
| 5,982,609 A | 11/1999 | Evans |
| 6,007,943 A | 12/1999 | Coetzer |
| 6,083,296 A | 7/2000 | Innes et al. |
| 6,143,054 A | 11/2000 | Dry |
| 6,180,284 B1 | 1/2001 | Shah et al. |
| 6,218,055 B1 | 4/2001 | Shah et al. |
| 6,221,513 B1 | 4/2001 | Lasater |
| 6,267,799 B1 | 7/2001 | Innes et al. |
| 6,270,553 B1 | 8/2001 | Innes |
| 6,289,034 B1 | 9/2001 | Bates |
| 6,322,745 B1 | 11/2001 | Leigh et al. |
| 6,328,783 B1 | 12/2001 | Bates |
| 6,368,486 B1 | 4/2002 | Thompson et al. |
| 6,379,422 B1 | 4/2002 | Dry |
| 6,379,424 B1 | 4/2002 | Dry |
| 6,379,840 B2 | 4/2002 | Kitoh et al. |
| 6,387,153 B1 | 5/2002 | Burke |
| 6,402,808 B1 | 6/2002 | Dry |
| 6,419,812 B1 | 7/2002 | Beck et al. |
| 6,419,813 B1 | 7/2002 | Brown et al. |
| 6,423,114 B1 | 7/2002 | Burke |
| 6,423,115 B1 | 7/2002 | McCarthy et al. |
| 6,428,603 B1 | 8/2002 | Batterham |
| 6,440,195 B1 | 8/2002 | Dry |
| 6,475,264 B1 | 11/2002 | Dry |
| 6,478,848 B1 | 11/2002 | McCarthy et al. |
| 6,498,406 B1 | 12/2002 | Hoeriuchi et al. |
| 6,517,605 B1 | 2/2003 | Bates et al. |
| 6,531,846 B1 | 3/2003 | Smith et al. |
| 6,548,212 B1 | 4/2003 | Heider et al. |
| 6,549,423 B1 | 4/2003 | Brodnick |
| 6,558,525 B1 | 5/2003 | Bradford et al. |
| 6,579,817 B2 | 6/2003 | Harada et al. |
| 6,585,929 B1 | 7/2003 | Bates et al. |
| 6,602,321 B2 | 8/2003 | Dry et al. |
| 6,692,620 B2 | 2/2004 | Duruz et al. |
| 6,692,631 B2 | 2/2004 | Bergsma |
| 6,692,870 B2 | 2/2004 | Miyake et al. |
| 6,706,239 B2 | 3/2004 | Haack et al. |
| 6,719,889 B2 | 4/2004 | Brown |
| 6,723,222 B2 | 4/2004 | Bergsma et al. |
| 6,730,210 B2 | 5/2004 | Thompson et al. |
| 6,733,924 B1 | 5/2004 | Skotheim et al. |
| 6,906,436 B2 | 6/2005 | Jenson et al. |
| 6,924,164 B1 | 8/2005 | Jenson |
| 6,962,613 B2 | 11/2005 | Jenson |
| 6,963,186 B2 | 11/2005 | Hobbs |
| 6,986,965 B2 | 1/2006 | Jenson et al. |
| 7,055,733 B2 | 6/2006 | Weil et al. |
| 7,077,945 B2 | 7/2006 | Bergsma et al. |
| 7,131,189 B2 | 11/2006 | Jenson |
| 7,144,655 B2 | 12/2006 | Jenson et al. |
| 7,157,187 B2 | 1/2007 | Jenson |
| 7,184,903 B1 | 2/2007 | Williams et al. |
| 7,194,801 B2 | 3/2007 | Jenson et al. |
| 7,211,351 B2 | 5/2007 | Klaassen |
| 7,250,233 B2 | 7/2007 | Choi et al. |
| 7,255,937 B2 | 8/2007 | Park |
| 7,274,118 B2 | 9/2007 | Jenson et al. |
| 7,294,209 B2 | 11/2007 | Shakespeare |
| 7,328,831 B1 | 2/2008 | Topolski |
| 7,344,804 B2 | 3/2008 | Klaassen |
| 7,373,222 B1 | 5/2008 | Wright et al. |
| 7,389,189 B2 | 6/2008 | Williams et al. |
| 7,389,580 B2 | 6/2008 | Jenson et al. |
| 7,433,655 B2 | 10/2008 | Jacobs et al. |
| 7,504,017 B2 | 3/2009 | Cardarelli |
| 7,513,219 B2 | 4/2009 | Louden |
| 7,554,220 B2 | 6/2009 | Sugawara |
| 7,568,537 B2 | 8/2009 | King et al. |
| 7,578,702 B1 | 8/2009 | Tom et al. |
| 7,603,144 B2 | 10/2009 | Jenson et al. |
| 7,612,537 B2 | 11/2009 | Wynne et al. |
| 7,632,604 B2 | 12/2009 | Iacovangelo et al. |
| 7,678,484 B2 | 3/2010 | Tao et al. |
| 7,776,190 B2 | 8/2010 | Hiltmann et al. |
| 7,776,191 B2 | 8/2010 | Hiltmann et al. |
| 7,776,478 B2 | 8/2010 | Klaassen |
| 7,808,131 B2 | 10/2010 | Hurst et al. |
| 7,858,228 B2 | 12/2010 | Yoon |
| 7,877,120 B2 | 1/2011 | Jacobs et al. |
| 7,883,796 B2 | 2/2011 | Kida et al. |
| 7,931,989 B2 | 4/2011 | Klaassen |
| 7,939,205 B2 | 5/2011 | Klaassen |
| 7,943,270 B2 | 5/2011 | Blake et al. |
| 8,034,484 B2 | 10/2011 | Inatomi et al. |
| 8,044,508 B2 | 10/2011 | Jenson et al. |
| 8,080,326 B2 | 12/2011 | Chan et al. |
| 8,101,293 B2 | 1/2012 | Chan et al. |
| 8,110,301 B2 | 2/2012 | Iacovangelo et al. |
| 8,142,569 B2 | 3/2012 | Kalynushkin et al. |
| 8,178,231 B2 | 5/2012 | Soloveichik et al. |
| 8,202,641 B2 | 6/2012 | Winter et al. |
| 8,219,140 B2 | 7/2012 | Jacobs et al. |
| 8,221,912 B2 | 7/2012 | Fujiwara |
| 8,236,440 B2 | 8/2012 | Bendert |
| 8,237,407 B2 | 8/2012 | Hurst et al. |
| 8,257,868 B2 | 9/2012 | Hagiwara et al. |
| 8,268,471 B2 | 9/2012 | Sadoway et al. |
| 8,281,877 B2 | 10/2012 | Shahin et al. |
| 8,298,701 B2 | 10/2012 | Whitacre et al. |
| 8,306,671 B1 | 11/2012 | Marcus |
| 8,311,681 B1 | 11/2012 | Marcus |
| 8,313,719 B2 | 11/2012 | Barker et al. |
| 8,323,816 B2 | 12/2012 | Bradwell et al. |
| 8,329,336 B2 | 12/2012 | Soloveichik et al. |
| 8,334,053 B2 | 12/2012 | Shapiro et al. |
| 8,343,646 B1 | 1/2013 | Wilkins et al. |
| 8,409,744 B2 | 4/2013 | Ijaz et al. |
| 8,436,489 B2 | 5/2013 | Stahlkopf et al. |
| 8,457,800 B2 | 6/2013 | Marcus |
| 8,459,314 B2 | 6/2013 | Frazier et al. |
| 8,460,814 B2 | 6/2013 | Deane et al. |
| 8,471,520 B2 | 6/2013 | Coe et al. |
| 8,475,954 B2 | 7/2013 | Ijaz et al. |
| 8,504,214 B2 | 8/2013 | Genc et al. |
| 8,537,581 B2 | 9/2013 | Wagoner et al. |
| 8,539,763 B2 | 9/2013 | McBride et al. |
| 8,568,915 B2 | 10/2013 | Fuhr et al. |
| 8,642,201 B2 | 2/2014 | Cheng et al. |
| 8,643,500 B2 | 2/2014 | Lee et al. |
| 8,652,672 B2 | 2/2014 | Whitacre et al. |
| 8,722,226 B2 | 5/2014 | Carter et al. |
| 8,764,962 B2 | 7/2014 | Allanore et al. |
| 8,766,642 B2 | 7/2014 | Bogdan, Jr. et al. |
| 8,806,866 B2 | 8/2014 | McBride et al. |
| 8,815,445 B2 | 8/2014 | Sugiura et al. |
| 9,000,713 B2 | 4/2015 | Boysen et al. |
| 9,035,617 B2 | 5/2015 | Parakulam et al. |
| 9,076,996 B2 | 7/2015 | Bradwell et al. |
| 9,106,980 B2 | 8/2015 | Parakulam et al. |

(56) References Cited

U.S. PATENT DOCUMENTS

| | | |
|---|---|---|
| 9,153,803 B2 | 10/2015 | Chung et al. |
| 9,312,522 B2 | 4/2016 | Bradwell et al. |
| 9,437,864 B2 | 9/2016 | Tan et al. |
| 9,502,737 B2 | 11/2016 | Bradwell et al. |
| 9,520,618 B2 | 12/2016 | Bradwell et al. |
| 9,559,386 B2 | 1/2017 | Bradwell et al. |
| 9,728,814 B2 | 8/2017 | Bradwell et al. |
| 9,735,450 B2 | 8/2017 | Bradwell et al. |
| 9,787,119 B2 | 10/2017 | Yamauchi et al. |
| 9,825,265 B2 | 11/2017 | Bradwell et al. |
| 9,876,258 B2 | 1/2018 | Bradwell et al. |
| 9,893,385 B1 | 2/2018 | Nayar et al. |
| 9,925,881 B2 | 3/2018 | Manotas et al. |
| 10,205,195 B2 | 2/2019 | Boysen et al. |
| 10,297,870 B2 | 5/2019 | Bradwell |
| 10,541,451 B2 | 1/2020 | Bradwell et al. |
| 10,566,662 B1 | 2/2020 | Nayar et al. |
| 10,608,212 B2 | 3/2020 | Bradwell et al. |
| 10,637,015 B2 | 4/2020 | Thompson et al. |
| 10,903,528 B2 | 1/2021 | Ouchi et al. |
| 11,196,091 B2 | 12/2021 | Bradwell et al. |
| 11,211,641 B2 | 12/2021 | Bradwell et al. |
| 11,289,759 B2 | 3/2022 | Thompson et al. |
| 11,387,497 B2 | 7/2022 | Bradwell et al. |
| 11,411,254 B2 | 8/2022 | Bradwell et al. |
| 11,611,112 B2 | 3/2023 | Bradwell et al. |
| 11,677,100 B2 | 6/2023 | Bradwell et al. |
| 11,721,841 B2 | 8/2023 | Bradwell et al. |
| 2002/0009649 A1 | 1/2002 | Sato et al. |
| 2002/0012833 A1 | 1/2002 | Gow et al. |
| 2002/0051912 A1 | 5/2002 | Fitter et al. |
| 2002/0064704 A1 | 5/2002 | Thackeray et al. |
| 2003/0008212 A1 | 1/2003 | Akashi et al. |
| 2003/0044686 A1 | 3/2003 | Bushong et al. |
| 2003/0052646 A1 | 3/2003 | Minamiura et al. |
| 2003/0182791 A1* | 10/2003 | Janmey ............... H01M 50/152 29/623.2 |
| 2003/0186111 A1 | 10/2003 | Tamakoshi |
| 2003/0196908 A1 | 10/2003 | Brown |
| 2003/0203279 A1 | 10/2003 | Tsukamoto et al. |
| 2003/0207161 A1 | 11/2003 | Rusta-Sallehy et al. |
| 2003/0228520 A1 | 12/2003 | Kaun |
| 2004/0061841 A1 | 4/2004 | Black et al. |
| 2004/0076885 A1 | 4/2004 | Sato et al. |
| 2004/0229116 A1 | 11/2004 | Malinski et al. |
| 2004/0258953 A1 | 12/2004 | Kido et al. |
| 2005/0079411 A1 | 4/2005 | Kairawicz et al. |
| 2005/0237029 A1 | 10/2005 | Takezawa et al. |
| 2005/0238954 A1 | 10/2005 | Kawada |
| 2006/0127735 A1 | 6/2006 | Sabin et al. |
| 2006/0151333 A1 | 7/2006 | Banek |
| 2006/0187614 A1 | 8/2006 | Ushio et al. |
| 2007/0067119 A1 | 3/2007 | Loewen et al. |
| 2007/0184711 A1 | 8/2007 | Thrap et al. |
| 2007/0215483 A1 | 9/2007 | Johansen et al. |
| 2007/0252556 A1 | 11/2007 | West et al. |
| 2008/0023321 A1 | 1/2008 | Sadoway |
| 2008/0044725 A1 | 2/2008 | Sadoway et al. |
| 2008/0050295 A1 | 2/2008 | Uchida et al. |
| 2008/0053838 A1 | 3/2008 | Yamaguchi et al. |
| 2008/0118428 A1 | 5/2008 | Awano et al. |
| 2008/0145755 A1 | 6/2008 | Iacovangelo et al. |
| 2008/0241689 A1 | 10/2008 | Takami et al. |
| 2008/0264565 A1 | 10/2008 | Sun et al. |
| 2008/0308415 A1 | 12/2008 | Hiltmann et al. |
| 2009/0011331 A1 | 1/2009 | Stringer et al. |
| 2009/0014320 A1 | 1/2009 | Chiang et al. |
| 2009/0029236 A1 | 1/2009 | Mailley et al. |
| 2009/0162736 A1 | 6/2009 | Vallance et al. |
| 2009/0208836 A1 | 8/2009 | Fuhr et al. |
| 2009/0212743 A1 | 8/2009 | Hagiwara et al. |
| 2009/0253017 A1 | 10/2009 | Larsen et al. |
| 2009/0297892 A1 | 12/2009 | Ijaz et al. |
| 2010/0028723 A1 | 2/2010 | Haba |
| 2010/0047671 A1 | 2/2010 | Chiang et al. |
| 2010/0058578 A1 | 3/2010 | Vallance et al. |
| 2010/0068610 A1 | 3/2010 | Sudworth |
| 2010/0089547 A1 | 4/2010 | King et al. |
| 2010/0119847 A1 | 5/2010 | Wu et al. |
| 2010/0154205 A1 | 6/2010 | Nakagawa et al. |
| 2010/0178532 A1 | 7/2010 | Shapiro et al. |
| 2010/0233518 A1 | 9/2010 | Kwon et al. |
| 2010/0240517 A1 | 9/2010 | Ashkin et al. |
| 2010/0243017 A1 | 9/2010 | Normann et al. |
| 2010/0291443 A1 | 11/2010 | Farmer |
| 2011/0014503 A1 | 1/2011 | Bradwell et al. |
| 2011/0014505 A1 | 1/2011 | Bradwell et al. |
| 2011/0020694 A1 | 1/2011 | Khakhalev et al. |
| 2011/0027624 A1 | 2/2011 | Deane et al. |
| 2011/0027627 A1 | 2/2011 | Deane et al. |
| 2011/0027633 A1 | 2/2011 | Deane et al. |
| 2011/0027637 A1 | 2/2011 | Deane et al. |
| 2011/0027638 A1 | 2/2011 | Deane et al. |
| 2011/0027639 A1 | 2/2011 | Deane et al. |
| 2011/0048066 A1 | 3/2011 | Gielda et al. |
| 2011/0050235 A1 | 3/2011 | Bogdan, Jr. et al. |
| 2011/0052968 A1 | 3/2011 | Venkataramani et al. |
| 2011/0086258 A1 | 4/2011 | Yaginuma et al. |
| 2011/0104570 A1 | 5/2011 | Galloway et al. |
| 2011/0111296 A1 | 5/2011 | Berdichevsky et al. |
| 2011/0135975 A1 | 6/2011 | Fuhr et al. |
| 2011/0144861 A1 | 6/2011 | Lakirovich et al. |
| 2011/0177413 A1 | 7/2011 | Tao et al. |
| 2011/0189520 A1 | 8/2011 | Carter et al. |
| 2011/0200848 A1 | 8/2011 | Chiang et al. |
| 2011/0262794 A1 | 10/2011 | Yoon |
| 2012/0003508 A1 | 1/2012 | Narbonne et al. |
| 2012/0003513 A1 | 1/2012 | Fuhr |
| 2012/0015235 A1 | 1/2012 | Fuhr et al. |
| 2012/0077095 A1 | 3/2012 | Roumi et al. |
| 2012/0086128 A1 | 4/2012 | Ponoth et al. |
| 2012/0091806 A1 | 4/2012 | Tsutsumi et al. |
| 2012/0094194 A1 | 4/2012 | Visco et al. |
| 2012/0104990 A1 | 5/2012 | Boysen et al. |
| 2012/0107675 A1 | 5/2012 | Kim et al. |
| 2012/0125784 A1 | 5/2012 | Berlin et al. |
| 2012/0129056 A1 | 5/2012 | Majima et al. |
| 2012/0146585 A1 | 6/2012 | Darcy |
| 2012/0161083 A1 | 6/2012 | Jha et al. |
| 2012/0171524 A1 | 7/2012 | Hiraiwa et al. |
| 2012/0183838 A1 | 7/2012 | An et al. |
| 2012/0190252 A1 | 7/2012 | Pavlinsky et al. |
| 2012/0191262 A1 | 7/2012 | Marcus |
| 2012/0194140 A1 | 8/2012 | Rijssenbeek et al. |
| 2012/0196170 A1 | 8/2012 | Ijaz et al. |
| 2012/0217032 A1 | 8/2012 | Beaupre et al. |
| 2012/0244404 A1 | 9/2012 | Obasih et al. |
| 2012/0244418 A1 | 9/2012 | Cheng et al. |
| 2012/0263988 A1 | 10/2012 | Obasih et al. |
| 2012/0264021 A1 | 10/2012 | Sugiura et al. |
| 2012/0265397 A1 | 10/2012 | Aliberti et al. |
| 2012/0282501 A1 | 11/2012 | Haynes et al. |
| 2012/0282508 A1 | 11/2012 | Bendert |
| 2012/0297772 A1 | 11/2012 | McBride et al. |
| 2012/0319653 A1 | 12/2012 | Kumar et al. |
| 2012/0328910 A1 | 12/2012 | La et al. |
| 2012/0328930 A1 | 12/2012 | Inagaki et al. |
| 2012/0328935 A1 | 12/2012 | Matsui et al. |
| 2013/0009602 A1 | 1/2013 | Hoff et al. |
| 2013/0017417 A1 | 1/2013 | Whitacre et al. |
| 2013/0022845 A1 | 1/2013 | Davis et al. |
| 2013/0022852 A1 | 1/2013 | Chang et al. |
| 2013/0029195 A1 | 1/2013 | Peace |
| 2013/0045408 A1 | 2/2013 | Sadoway et al. |
| 2013/0049466 A1 | 2/2013 | Adams et al. |
| 2013/0049478 A1 | 2/2013 | Wagoner et al. |
| 2013/0055559 A1 | 3/2013 | Slocum et al. |
| 2013/0057220 A1 | 3/2013 | Whitacre |
| 2013/0059176 A1 | 3/2013 | Stefani et al. |
| 2013/0059185 A1 | 3/2013 | Whitacre et al. |
| 2013/0065122 A1 | 3/2013 | Chiang et al. |
| 2013/0069001 A1 | 3/2013 | Luo et al. |
| 2013/0071306 A1 | 3/2013 | Camp et al. |
| 2013/0073234 A1 | 3/2013 | Leport et al. |

(56) References Cited

U.S. PATENT DOCUMENTS

| | | |
|---|---|---|
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |
| 2013/0084474 A1 | 4/2013 | Mills |
| 2013/0119937 A1 | 5/2013 | Arseneault et al. |
| 2013/0130085 A1 | 5/2013 | Choi |
| 2013/0134928 A1 | 5/2013 | Uchihashi et al. |
| 2013/0136980 A1 | 5/2013 | Bartling |
| 2013/0143139 A1 | 6/2013 | Tao et al. |
| 2013/0145764 A1 | 6/2013 | McBride et al. |
| 2013/0149567 A1 | 6/2013 | Schaefer |
| 2013/0166085 A1 | 6/2013 | Cherian et al. |
| 2013/0183544 A1 | 7/2013 | Yoshioka et al. |
| 2013/0295435 A1 | 11/2013 | Vu |
| 2013/0315659 A1 | 11/2013 | Kumar et al. |
| 2014/0000251 A1 | 1/2014 | McBride et al. |
| 2014/0038011 A1 | 2/2014 | Fukunaga et al. |
| 2014/0038012 A1 | 2/2014 | Alimario et al. |
| 2014/0038038 A1 | 2/2014 | Vallance et al. |
| 2014/0099522 A1 | 4/2014 | Spatocco et al. |
| 2014/0113181 A1 | 4/2014 | Bradwell et al. |
| 2014/0162090 A1 | 6/2014 | Whitacre et al. |
| 2014/0176147 A1 | 6/2014 | Wiegman et al. |
| 2014/0220428 A1 | 8/2014 | Zinck et al. |
| 2014/0242466 A1 | 8/2014 | Murashi et al. |
| 2014/0248521 A1 | 9/2014 | Chiang et al. |
| 2014/0272481 A1 | 9/2014 | Chung et al. |
| 2014/0272508 A1 | 9/2014 | Musetti |
| 2014/0277791 A1 | 9/2014 | Lenard et al. |
| 2014/0315097 A1 | 10/2014 | Tan et al. |
| 2014/0349159 A1 | 11/2014 | Bartling et al. |
| 2014/0365027 A1 | 12/2014 | Namba et al. |
| 2015/0004455 A1 | 1/2015 | Bradwell et al. |
| 2015/0010792 A1 | 1/2015 | Amendola et al. |
| 2015/0015210 A1 | 1/2015 | Bradwell et al. |
| 2015/0037670 A1 | 2/2015 | Tanaka et al. |
| 2015/0093614 A1 | 4/2015 | Fukuhara et al. |
| 2015/0132627 A1 | 5/2015 | Bradwell et al. |
| 2015/0132628 A1 | 5/2015 | Bradwell et al. |
| 2015/0249273 A1 | 9/2015 | Bradwell et al. |
| 2015/0249274 A1 | 9/2015 | Bradwell et al. |
| 2015/0280480 A1 | 10/2015 | Mitri et al. |
| 2015/0303525 A1 | 10/2015 | Bradwell et al. |
| 2015/0318586 A1 | 11/2015 | Rahmane et al. |
| 2015/0325821 A1 | 11/2015 | Bradwell et al. |
| 2015/0380713 A1 | 12/2015 | Kimura et al. |
| 2016/0006090 A1 | 1/2016 | Licht |
| 2016/0156068 A1 | 6/2016 | Burke et al. |
| 2016/0172714 A1 | 6/2016 | Ouchi et al. |
| 2016/0186235 A1 | 6/2016 | Joseph et al. |
| 2016/0190607 A1 | 6/2016 | Wyser et al. |
| 2016/0211555 A9 | 7/2016 | Bradwell et al. |
| 2016/0254512 A1 | 9/2016 | Yin et al. |
| 2016/0301038 A1 | 10/2016 | Modest et al. |
| 2016/0336623 A1 | 11/2016 | Nayar et al. |
| 2016/0344066 A1 | 11/2016 | Sudworth et al. |
| 2016/0365612 A1 | 12/2016 | Bradwell et al. |
| 2016/0372763 A1 | 12/2016 | Lu et al. |
| 2017/0018811 A1* | 1/2017 | Bradwell .............. H01M 4/381 |
| 2017/0104244 A1 | 4/2017 | Bull et al. |
| 2017/0149095 A1 | 5/2017 | Amendola et al. |
| 2017/0222273 A1 | 8/2017 | Bradwell et al. |
| 2017/0248041 A1 | 8/2017 | Lenk et al. |
| 2017/0259648 A1 | 9/2017 | Putcha et al. |
| 2017/0263951 A1 | 9/2017 | Kanno et al. |
| 2017/0309979 A1 | 10/2017 | Lee et al. |
| 2017/0338451 A9 | 11/2017 | Bradwell et al. |
| 2017/0358941 A1 | 12/2017 | Mitri et al. |
| 2018/0034110 A1 | 2/2018 | Sudworth et al. |
| 2018/0083274 A1 | 3/2018 | Martin |
| 2018/0090726 A1 | 3/2018 | Thompson et al. |
| 2018/0097259 A1 | 4/2018 | Bradwell et al. |
| 2018/0191162 A1 | 7/2018 | Hanada et al. |
| 2019/0089013 A1 | 3/2019 | Ouchi et al. |
| 2019/0115632 A1 | 4/2019 | Beuning et al. |
| 2019/0123369 A1 | 4/2019 | Ma et al. |
| 2019/0296276 A1 | 9/2019 | Bradwell et al. |
| 2021/0376394 A1 | 12/2021 | Bradwell et al. |
| 2022/0013835 A1 | 1/2022 | Bradwell et al. |
| 2022/0077508 A1 | 3/2022 | Nayar et al. |
| 2022/0216527 A1 | 7/2022 | Bradwell et al. |
| 2022/0255138 A1 | 8/2022 | Bradwell et al. |
| 2022/0263168 A1 | 8/2022 | Thompson et al. |
| 2022/0359917 A1 | 11/2022 | Bradwell et al. |
| 2023/0282891 A1 | 9/2023 | Bradwell et al. |

FOREIGN PATENT DOCUMENTS

| | | |
|---|---|---|
| CA | 2767920 A1 | 1/2011 |
| CA | 2811218 A1 | 3/2012 |
| CA | 2887201 A1 | 4/2014 |
| CH | 703320 B1 | 12/2011 |
| CN | 1429417 A | 7/2003 |
| CN | 1578553 A | 2/2005 |
| CN | 1743056 A | 3/2006 |
| CN | 1750309 A | 3/2006 |
| CN | 101436780 A | 5/2009 |
| CN | 101506117 A | 8/2009 |
| CN | 101519313 A | 9/2009 |
| CN | 101828285 A | 9/2010 |
| CN | 101942676 A | 1/2011 |
| CN | 201809448 U | 4/2011 |
| CN | 201908137 U | 7/2011 |
| CN | 102181883 A | 9/2011 |
| CN | 202076339 U | 12/2011 |
| CN | 102498589 A | 6/2012 |
| CN | 102646808 A | 8/2012 |
| CN | 103001239 A | 3/2013 |
| CN | 202797170 U | 3/2013 |
| CN | 103137916 A | 6/2013 |
| CN | 103342556 A | 10/2013 |
| CN | 103367663 A | 10/2013 |
| CN | 104364930 A | 2/2015 |
| CN | 105190984 A | 12/2015 |
| CN | 105659415 A | 6/2016 |
| CN | 105830247 A | 8/2016 |
| DE | 3239964 A1 | 5/1984 |
| DE | 19618609 A1 | 11/1997 |
| DE | 102012103386 A1 | 10/2013 |
| EP | 0078404 A2 | 5/1983 |
| EP | 0078404 A3 | 10/1985 |
| EP | 0327959 A1 | 8/1989 |
| EP | 0343333 A1 | 11/1989 |
| EP | 1096593 A2 | 5/2001 |
| EP | 1469536 A1 | 10/2004 |
| EP | 1548912 A1 | 6/2005 |
| EP | 2408083 A1 | 1/2012 |
| EP | 2416464 A2 | 2/2012 |
| EP | 2499507 A1 | 9/2012 |
| EP | 2665120 A1 | 11/2013 |
| EP | 2709188 A1 | 3/2014 |
| EP | 2909887 A1 | 8/2015 |
| EP | 3607603 | 2/2020 |
| EP | 3898421 A1 | 10/2021 |
| GB | 2062939 A | 5/1981 |
| JP | S4933815 B1 | 9/1974 |
| JP | S55053877 A1 | 4/1980 |
| JP | S61114664 A | 6/1986 |
| JP | H06223872 A | 8/1994 |
| JP | H06310171 A | 11/1994 |
| JP | H09167631 A | 6/1997 |
| JP | H1012270 | 1/1998 |
| JP | H10208771 A | 8/1998 |
| JP | H117923 A | 1/1999 |
| JP | H11185800 A | 7/1999 |
| JP | 2001115369 A | 4/2001 |
| JP | 2001243994 A | 9/2001 |
| JP | 3355377 B2 | 12/2002 |
| JP | 2003146771 A | 5/2003 |
| JP | 2007157373 A | 6/2007 |
| JP | 2010206101 A | 9/2010 |
| JP | 2010214396 A | 9/2010 |

(56) References Cited

FOREIGN PATENT DOCUMENTS

| | | |
|---|---|---|
| JP | 2010535942 A | 11/2010 |
| JP | 2011508379 A | 3/2011 |
| JP | 2012124009 A | 6/2012 |
| JP | 2012226866 A | 11/2012 |
| JP | 2012533865 A | 12/2012 |
| JP | 2013055193 A | 3/2013 |
| JP | 2013537361 A | 9/2013 |
| JP | 2014154337 A | 8/2014 |
| JP | 2014526114 A | 10/2014 |
| JP | 2016510936 A | 4/2016 |
| JP | 2016535392 A | 11/2016 |
| KR | 20120059106 A | 6/2012 |
| RU | 2031491 C1 | 3/1995 |
| RU | 2013111960 A | 10/2014 |
| SG | 188400 A1 | 4/2013 |
| WO | WO-9965642 A1 | 12/1999 |
| WO | WO-0005774 A1 | 2/2000 |
| WO | WO-2008045996 A2 | 4/2008 |
| WO | WO-2008105807 A2 | 9/2008 |
| WO | WO-2008045996 A3 | 10/2008 |
| WO | WO-2008105811 A3 | 12/2008 |
| WO | WO-2009046533 A1 | 4/2009 |
| WO | WO-2009151639 A1 | 12/2009 |
| WO | WO-2010130583 A2 | 11/2010 |
| WO | WO-2011011056 A2 | 1/2011 |
| WO | WO-2011014242 A1 | 2/2011 |
| WO | WO-2011014243 A1 | 2/2011 |
| WO | WO-2011022390 A2 | 2/2011 |
| WO | WO-2011025574 A1 | 3/2011 |
| WO | WO-2011047067 A2 | 4/2011 |
| WO | WO-2011022390 A3 | 5/2011 |
| WO | WO-2011050924 A1 | 5/2011 |
| WO | WO-2011079548 A1 | 7/2011 |
| WO | WO-2011082659 A1 | 7/2011 |
| WO | WO-2011047067 A3 | 8/2011 |
| WO | WO-2011100686 A1 | 8/2011 |
| WO | WO-2011116236 A2 | 9/2011 |
| WO | WO-2011148347 A1 | 12/2011 |
| WO | WO-2011153312 A2 | 12/2011 |
| WO | WO-2012003649 A1 | 1/2012 |
| WO | WO-2012009145 A2 | 1/2012 |
| WO | WO-2012033692 A2 | 3/2012 |
| WO | WO-2012040176 A1 | 3/2012 |
| WO | WO-2011153312 A3 | 4/2012 |
| WO | WO-2012009145 A3 | 4/2012 |
| WO | WO-2012051790 A1 | 4/2012 |
| WO | WO-2012033692 A3 | 6/2012 |
| WO | WO-2012129827 A1 | 10/2012 |
| WO | WO-2012138576 A1 | 10/2012 |
| WO | WO-2012144344 A1 | 10/2012 |
| WO | WO-2012145314 A2 | 10/2012 |
| WO | WO-2012158751 A1 | 11/2012 |
| WO | WO-2012158781 A2 | 11/2012 |
| WO | WO-2013025608 A1 | 2/2013 |
| WO | WO-2013032667 A1 | 3/2013 |
| WO | WO-2013048704 A1 | 4/2013 |
| WO | WO-2013052494 A1 | 4/2013 |
| WO | WO-2014062702 A1 | 4/2014 |
| WO | WO-2014062706 A1 | 4/2014 |
| WO | WO-2014190318 A1 | 11/2014 |
| WO | WO-2015042295 A1 | 3/2015 |
| WO | WO-2015058010 A1 | 4/2015 |
| WO | WO-2015058165 A1 | 4/2015 |
| WO | WO-2015066359 A1 | 5/2015 |
| WO | WO-2016050329 A1 | 4/2016 |
| WO | WO-2016138499 A1 | 9/2016 |
| WO | WO-2016141354 A2 | 9/2016 |
| WO | WO-2018052797 | 3/2018 |
| WO | WO-2018187777 | 11/2018 |

OTHER PUBLICATIONS

Advisory Action Before Filing of Appeal Brief dated Jun. 8, 2012 for U.S. Appl. No. 12/839,130.

AGRUSS. The Thermally Regenarative Liquid-Metal Cell, J. Electrochem. Soc. Nov. 1963; 110(11):1097-1103.
Allanore, A. Features and Challenges of Molten Oxide Electrolytes for Metal Extraction. Journal of The Electrochemical Society, 162 (1): E13-E22 (2015). Published Nov. 25, 2014.
Allanore, et al. A new anode material for oxygen evolution in molten oxide electrolysis. Nature, vol. 497, May 16, 2013, pp. 353-356 and Online Methods Section. Published online May 8, 2013.
ATI Technical Data Sheet, ATI 18CrCb Stainless Steel, Feb. 17, 2014.
Atthey. A Mathematical Model for Fluid Flow in a Weld Pool at High Currents. J. Fluid Mech. 1980; 98(4):787-801.
Biswas, et al. Towards Implementation of Smart Grid: An Updated Review on Electrical Energy Storage Systems. Smart Grid and Renewable Energy. 2013; 4:122-132. Published online Feb. 2013.
Bradwell, et al. Magnesium-antimony liquid metal battery for stationary energy storage. J Am Chem Soc. Feb. 1, 2012;134(4): 1895-7. doi: 10.1021/ja209759s. Published on web Jan. 6, 2012.
Bradwell, et al. Recycling ZnTe, CdTe, and Other Compound Semiconductors by Ambipolar Electrolysis. J. Am. Chem. Soc., 2011, 133, 19971-19975. Published Oct. 28, 2011.
Bradwell, et al. Supporting Information: Recycling ZnTe, CdTe, and other compound semiconductors by ambipolar electrolysis. J. Am. Chem. Soc., 2011, 133, S1-S8. Published Oct. 28, 2011.
Bradwell, et al. Supporting Material: Magnesium-antimony liquid metal battery for stationary energy storage. J Am Chem Soc. Feb. 1, 2012;134(4):S1-S11. doi: 10.1021/ja209759s. Published on web Jan. 6, 2012.
Bradwell. Liquid metal batteries: ambipolar electrolysis and alkaline earth electroalloying cells. Thesis. Massachusetts Institute of Technology. Dept. of Materials Science and Engineering. 2011.
Bradwell. Technical and economic feasibility of a high-temperature self-assembling battery. Thesis. Department of Material Science and Engineering. MIT. 2006.
Cairns, et al. Galvanic Cells with Fused-Salt Electrolytes. AEC Research and Development. 220 pages, Nov. 1967.
Cairns, et al. High Temperature Batteries Research in high-temperature electrochemistry reveals compact, powerful energy-storage cells. Science. Jun. 20, 1969; 164(3886): 1347-1355.
Cerablak™ technology. Atfi Surface Science Solutions. http://www.atfinet.com/index.php/technology. Accessed Feb. 24, 2016.
Chuang. Floating capacitor active charge balancing for PHEV application. Thesis. Ohio State University. 2010.
Co-pending U.S. Appl. No. 13/999,704, inventors David; S. Deak et al., filed on Mar. 14, 2014.
Co-pending U.S. Appl. No. 15/628,538, inventor Bradwell; David J., filed on Jun. 20, 2017.
Co-pending U.S. Appl. No. 16/740,178, inventors Nayarhari et al., filed on Jan. 10, 2020.
Co-pending U.S. Appl. No. 17/136,432, inventors Nayarhari et al., filed on Dec. 29, 2020.
Co-pending U.S. Appl. No. 18/141,041, inventors Bradwelldavid; J. et al., filed on Apr. 28, 2023.
Co-pending U.S. Appl. No. 18/203,822, inventors Bradwell; David J. et al., filed on May 31, 2023.
Co-pending U.S. Appl. No. 18/218,412, inventors Bradwell; David J. et al., filed on Jul. 5, 2023.
Crowley, B. New battery could be solar power's BFF video. http://money.cnn.com/video/technology/2012/08/16/bsg-liquid-metal-battery-energy.cnnmoney.CNN Money, 2012. Accessed Jun. 29, 2015.
Cubicciotti, et al. Metal-Salt Interactions at High Temperatures: The Solubilities of Some alkaline Earth Metals in their Halides. J. Am. Chem. Soc. 1949; 71(6):2149-2153.
Davis, J.R., Effect of temperature on properties. ASM specialty handbook—Copper and copper alloys. ASM international. 2001: pp. 430-439.
Donald Sadoway: The Colbert Report video. http://thecolbertreport.cc.com/videos/8uddyg/donald-sadoway. The Colbert Report, Oct. 22, 2012. Accessed Jun. 29, 2015.

(56) References Cited

OTHER PUBLICATIONS

Donald Sadoway: The missing link to renewable energy Youtube Video. https://www.youtube.com/watch?v=Sddb0Khx0yA. TED, Mar. 2012. Accessed Jun. 29, 2015.
Dworkin, et al. The Electrical Conductivity of Solutions of Metals in their Molten Halides. VIII. alkaline Earth Metal Systems. J. Phys. Chem. Jul. 1966; 70(7):2384.
Electroville: Grid-Scale Batteries. MIT Electroville: High Amperage Energy Storage Device—Energy for the Neighborhood. http://arpa-e.energy.gov/?q=slick-sheet-project/electroville-grid-scale-batteries. Accessed Jul. 2, 2015.
Electroville: High-Amperage Energy Storage Device - Energy Storage for the Neighborhood Project. U.S. Department of Energy Categorical Exclusion Determination Form. http://arpa-e.energy.gov/sites/default/files/25A1089%20MIT%20-%20Electroville.pdf. Accessed Jul. 2, 2015.
Energy 2064 with Professor Donald R. Sadoway Youtube Video. https://www.youtube.com/watch?v=0iwG32R2R50. Alger, Oct. 7, 2014. Accessed Jun. 29, 2015.
EP17851347.9 Extended European Search Report dated Mar. 16, 2020.
EP18194103.0 Extended European Search Report dated Mar. 29, 2019.
EP18781400.9 Examination report dated Feb. 24, 2022.
EP18781400.9 Extended European Search Report dated Dec. 11, 2020.
EP19901138.8 Extended European Search Report dated Sep. 5, 2022.
"European Extended Search Report and opinion dated May 29, 2017 for EP Application No. 14857245.".
European search report and search opinion dated Feb. 12, 2014 for EP Application No. 13196841.4.
European search report and search opinion dated May 6, 2016 for EP Application No. 13847926.
European search report and search opinion dated May 13, 2016 for EP Application No. 13846301.
European supplemental search report and opinion dated Mar. 16, 2017 for EP Application No. 14853610.
Fujiwara, et al. New molten salt systems for high temperature molten salt batteries: Ternary and quaternary molten salt systems based on LiF-LiCl, LiF-LiBr, and LiCl-LiBr. Journal of Power Sources. Apr. 15, 2011; 196(8):4012-4018.
Gay, et al. Lithium/Chalcogen Secondary Cells for Components in Electric Vehicular-Propulsion Generating Systems. Argonne National Laboratory, Argonne, Illinois, ANL-7863, 62 pages, Jan. 1972.
GE Energy Storage Durathon Battery Durathon E620 Battery Module Technical Specifications. Avallable at http://www.geenergystorage.com/images/ge/PDF/DurathonGridE620ModuleSpecSheet.pdf. 2012, Accessed on Oct. 18, 2012.
GE Energy Storage Durathon DC System Technical Specifications—MWh Series, 2014. Accessed Apr. 7, 2015. https://renewables.gepower.com/content/dam/gepower-renewables/global/en_US/documents/Durathon_DCMWh_Spec_Sheet_GEA-988123002A.pdf.
Hall-heroult cell. Wikimedia Commons. Accessed Nov. 10, 2014. http://commons.wikimedia.org/wiki/File:Hall-heroult-kk-2008-12-31.png. Dec. 30, 2008.
Intermetallic—Wikipedia Website. https://en.wikipedia.org/wiki/Intermetallic. Accessed Jul. 2, 2015.
International preliminary report on patentability and written opinion dated Jan. 24, 2012 for PCT Application No. US2010/002035.
International preliminary report on patentability and written opinion dated Feb. 17, 2009 for PCT Application No. US2007/018168.
International preliminary report on patentability and written opinion dated Mar. 26, 2013 for PCT Application No. US2011/052316.
International preliminary report on patentability and written opinion dated Apr. 7, 2015 for PCT Application No. US2013/063472.
International preliminary report on patentability and written opinion dated Apr. 21, 2015 for PCT Application No. US2013/065086.
International preliminary report on patentability and written opinion dated Apr. 21, 2015 for PCT Application No. US2013/065092.
International preliminary report on patentability and written opinion dated Sep. 15, 2015 for PCT Application No. IB2014/000617.
International preliminary report on patentability and written opinion dated Nov. 24, 2015 for PCT Application No. US2014/039439.
International preliminary report on patentability dated Mar. 31, 2016 for PCT Application No. PCT/US2014/056367.
International preliminary report on patentability dated Apr. 28, 2016 for PCT Application No. PCT/US2014/060979.
International preliminary report on patentability dated Apr. 28, 2016 for PCT Application No. PCT/US2014/061266.
International preliminary report on patentability dated May 12, 2016 for PCT Application No. PCT/US2014/0063222.
International search report and written opinion dated Jan. 22, 2015 for PCT Application No. US2014/061266.
International search report and written opinion dated Jan. 23, 2015 for PCT Application No. PCT/US2014/056367.
International search report and written opinion dated Jan. 24, 2014 for PCT/US2013/065086.
International search report and written opinion dated Jan. 27, 2014 for PCT Application No. US2013/063472.
International search report and written opinion dated Jan. 29, 2015 for PCT Application No. US2014/060979.
International search report and written opinion dated Feb. 7, 2011 for PCT/US2010/002035.
International search report and written opinion dated Jun. 1, 2016 for PCT/US2016/019970.
International search report and written opinion dated Jun. 11, 2015 for PCT Application No. IB2014/002608.
International search report and written opinion dated Sep. 7, 2016 for PCT/US2016/021048.
International search report and written opinion dated Sep. 18, 2008 for PCT/US2007/018168.
International search report and written opinion dated Oct. 20, 2014 for PCT Application No. US2014/039439.
International search report and written opinion dated Dec. 26, 2013 for PCT Application No. US2013/065092.
International search report and written opinion dated Dec. 29, 2011 for PCT/US2011/052316.
International search report and written opnion dated Feb. 13, 2015 for PCT Application No. US2014/063222.
International search report dated Oct. 15, 2014 for PCT Application No. IB2014/000617.
Jarret, et al. Advances in the Smelting of aluminum. Metallurgical Treatises, pp. 137-157, 1981.
Javadekar, et al. Energy Storage in Electrochemical Cells with Molten Sb Electrodes. Journal of The Electrochemical Society, 159 (4) A386-A389 (2012); Jan. 24, 2012 http://repository.upenn.edu/cgi/viewcontent.cgi?article=1170&context=cbe_papers.
JPH1012270 English translation. Udou et al. Japan. Jan. 16, 1998.
Jungblut, et al. Diffusion of lithium in highly oriented pyrolytic graphite at low concentrations and high temperatures. Phys Rev B Condens Matter. Dec. 1, 1989;40(16): 10810-10815.
Kane, et al. Electrochemical Determination of the Thermodynamic Properties of Lithium- Antimony Alloys. Journal of the Electrochemical Society, 162 (3) A421-A425 (2015). Published Dec. 31, 2014.
Kaufman, J.G., Application of aluminum alloys and tempers. Introduction to aluminum alloys and tempers—Preface. ASM International. 2000; pp. 87-118.
Kaufman, J.G., Properties and Characteristics of Aluminum and Aluminum Alloys. Fire Resistance of Aluminum and Aluminum Alloys and Measuring the Effects of Fire Exposure on the Properties of Aluminum Alloys. 2016. 9 Pages.
Kelley, et al. Mixing in a liquid metal electrode. Physics of Fluids 26, 2014, 057102, pp. 1-12. Published online May 20, 2014.
Kim, et al. Calcium-bismuth electrodes for large-scale energy storage (liquid metal batteries). Journal of Power Sources, vol. 241, 2013, pp. 239-248. Available online Apr. 19, 2013.

(56) References Cited

OTHER PUBLICATIONS

Kim, et al. Electrolysis of Molten Iron Oxide with an Iridium Anode: The Role of Electrolyte Basicity. Journal of The Electrochemical Society, 158 (10) E101-E105 (2011). Published Aug. 5, 2011.

Kim, et al. Liquid Metal Batteries: Past, Present, and Future. Chemical Reviews, vol. 113, No. 3, Mar. 13, 2013, pp. 2075-2099. Published on web Nov. 27, 2012.

Kipouros, et al. Toward new technologies for the production of Lithium. JOM, May 1998, pp. 24-26.

Lalau, et al. Sodium-bismuth-lead low temperature liquid metal battery. Journal for Electrochemistry and Plating Technology, Jun. 2015, pp. 1-7.

Lee, et al., Oxidation Behavior of Copper at a Temperature below 300 and the Methodology for Passivation. Materials Research. 2016; 19(1): 51-56.

Li, et al. High Performance Liquid Metal Battery with Environmentally Friendly Antimony-Tin Positive Electrode. ACS Appl Mater Interfaces. May 25, 2016;8(20): 12830-5. doi: 10.1021/acsami.6b02576. Epub May 2016.With supporting information.

Li, et al. Liquid Metal Electrodes for Energy Storage Batteries. Advanced Energy Materials (2016) 6:1600483-1-19. DOI: 10.1002/aenm.201600483. Published May 31, 2016.

Liquid Metal Battery Research Company website. http://www.lmbrc.com/. 2015. Accessed Jul. 7, 2015.

Liquid-metal batteries get boost from molten lead. Nature news website. Sep. 21, 2014. Accessed Dec. 9, 2014. http://www.nature.com/news/liquid-metal-batteries-get-boost-from-molten-lead-1.15967.

Magnuski, H. Innovations in Energy Storage - Professor Sadoway Video. https://vimeo.com/20906061. MIT Club of Northern California, Mar. 8, 2011. Accessed Jun. 29, 2015.

McAlister, A. J. The Al-Li (Aluminum-Lithium) System. Bulletin of Alloy Phase Diagrams, vol. 3, No. 2, 1982, pp. 177-178. doi: 10.1007/BF02892377.

Merriam-Webster's Medical Dictionary Website. http://merriam-webster.com/medical/room%20temperature. Apr. 2009.

MIT Electroville—Liquid Metal Battery wesite. http://www.ct-si.org/events/EnergyInnovation/showcase/popt.html?id=198. 2011. Accessed Jul. 2, 2015.

Molten metal batteries aimed at the grid. BBC News website. Sep. 21, 2014. Accessed Dec. 9, 2014. http://www.bbc.com/news/science-environment-29284934.

NAS Sodium Sulfur Battery Energy Storage System website, accessed Jul. 13, 2015. https://www.ngk.co.jp/nas/specs/#topto_specs.

Ning, et al. Self-healing Li-Bi liquid metal battery for grid-scale energy storage. Journal of Power Sourches 275 (2015) 370-376. Available online Oct. 29, 2014.

Norbert Weber et al., Sloshing instability and electrolyte layer rupture in liquid metal batteries. arxiv.org, Cornell university library, 201 OLIN library cornell university ithaca, NY 14853, Dec. 12, 2016, XP081362128.

Notice of allowance dated Jan. 6, 2015 for U.S. Appl. No. 13/237,215.
Notice of allowance dated Jan. 11, 2018 for U.S. Appl. No. 15/136,337.
Notice of allowance dated Mar. 8, 2016 for U.S. Appl. No. 13/801,333.
Notice of allowance dated Mar. 12, 2015 for U.S. Appl. No. 12/839,130.
Notice of allowance dated Apr. 6, 2015 for U.S. Appl. No. 13/801,333.
Notice of allowance dated Apr. 11, 2017 for U.S. Appl. No. 14/688,214.
Notice of allowance dated Apr. 13, 2017 for U.S. Appl. No. 14/688,179.
Notice of allowance dated Apr. 20, 2012 for U.S. Appl. No. 12/505,937.
Notice of allowance dated Apr. 22, 2014 for U.S. Appl. No. 12/839,130.
Notice of allowance dated Apr. 30, 2015 for U.S. Appl. No. 13/801,333.
"Notice of allowance dated May 11, 2017 for U.S. Appl. No. 14/688,214".
Notice of allowance dated Jul. 5, 2016 for U.S. Appl. No. 14/178,806.
Notice of allowance dated Jul. 13, 2012 for U.S. Appl. No. 11/839,413.
"Notice of allowance dated Jul. 17, 2017 for U.S. Appl. No. 14/688,214".
Notice of allowance dated Jul. 25, 2016 for U.S. Appl. No. 14/286,369.
"Notice of allowance dated Jul. 28, 2017 for U.S. Appl. No. 14/688,214".
Notice of allowance dated Jul. 31, 2015 for U.S. Appl. No. 13/801,333.
Notice of allowance dated Aug. 2, 2012 for U.S. Appl. No. 12/505,937.
Notice of allowance dated Aug. 22, 2016 for U.S. Appl. No. 14/536,549.
"Notice of allowance dated Sep. 11, 2017 for U.S. Appl. No. 15/289,857".
Notice of allowance dated Sep. 18, 2015 for U.S. Appl. No. 13/801,333.
"Notice of allowance dated Sep. 28, 2017 for U.S. Appl. No. 14/688,214".
Notice of allowance dated Oct. 4, 2017 for U.S. Appl. No. 15/136,337.
Notice of allowance dated Oct. 7, 2016 for U.S. Appl. No. 14/178,806.
Notice of allowance dated Oct. 19, 2017 for U.S. Appl. No. 14/688,214.
Notice of allowance dated Nov. 17, 2017 for U.S. Appl. No. 15/136,337.
Notice of allowance dated Dec. 11, 2015 for U.S. Appl. No. 13/801,333.
Notice of allowance dated Dec. 20, 2017 for U.S. Appl. No. 15/136,337.
Notice of allowance dated Mar. 22, 2017 for U.S. Appl. No. 14/536,563.
"Notice of allowance dated Aug. 31, 2018 for U.S. Appl. No. 15/057,732".
Nuvation BMS—Grid Energy Storage. Battery Management System for Grid Energy Storage. Accessed Nov. 11, 2015. http://www.nuvation.com/battery-management-system/bms-for-grid-energy-storage-platforms.
Nuvation BMS A Scalable and highly configurable battery management system for grid energy storage systems, 2014. http://nuvation.wpengine.netdna-cdn.com/img/nuvation-bms-web/downloads/NuvationBMS_Grid-Energy_20140922.pdf. Accessed Feb. 4, 2015.
Nuvation BMS Battery Management Systems. http://www.nuvation.com/battery-management-system. Accessed Feb. 4, 2015.
Nuvation BMS. Grid Battery Controller Battery Management Solution for Multi-Stack Grid-Scale Energy Storage Systems. 2015.
Nuvation Engineering Electronic Product Design Newsletter dated Jul. 9, 2014. http://us4.campaign-archive1.com/?u=d41c6a8dd772177f8c2976a94&id=d288872315&e=724575b634. Accessed Feb. 4, 2015.
Nuvation Engineering Electronic Product Design Newsletter dated Sep. 9, 2014. http://us4.campaign-archive1.com/?u=d41c6a8dd772177f8c2976a94&id=610713e05f&e=e9700170fc. Accessed Feb. 4, 2015.
Office action—Requirement for Restriction Election dated Aug. 13, 2015 for U.S. Appl. No. 14/045,967.
Office action dated Jan. 5, 2012 for U.S. Appl. No. 12/839,130.
Office action dated Jan. 10, 2014 for U.S. Appl. No. 12/839,130.
"Office action dated Feb. 5, 2016 for U.S. Appl. No. 14/536,549.".
Office action dated Mar. 14, 2014 for U.S. Appl. No. 13/237,215.
Office action dated Mar. 16, 2012 for U.S. Appl. No. 12/839,130.
"Office action dated Mar. 27, 18 for U.S. Appl. No. 15/140,434.".
"Office action dated Apr. 18, 2018 for U.S. Appl. No. 14/975,587.".
"Office action dated Apr. 20, 2018 for U.S. Appl. No. 15/057,732.".
"Office action dated May 1, 2017 for U.S. Appl. No. 14/678,602.".
Office action dated May 13, 2011 for U.S. Appl. No. 11/839,413.
Office action dated Jun. 7, 2016 for U.S. Appl. No. 14/045,967.
"Office action dated Jun. 7, 2018 for U.S. Appl. No. 14/687,838.".
"Office action dated Jun. 15, 2017 for U.S. Appl. No. 14/687,838".
"Office action dated Jun. 25, 2018 for U.S. Appl. No. 15/063,842.".
Office action dated Jun. 30, 2016 for U.S. Appl. No. 14/536,563.
Office action dated Aug. 21, 2014 for U.S. Appl. No. 12/839,130.
"Office action dated Aug. 30, 2017 for U.S. Appl. No. 14/975,587".
Office action dated Sep. 3, 2014 for U.S. Appl. No. 13/801,333.

(56) References Cited

OTHER PUBLICATIONS

"Office action dated Sep. 5, 2017 for U.S. Appl. No. 15/140,434".
Office action dated Oct. 4, 2011 for U.S. Appl. No. 11/839,413.
Office action dated Nov. 5, 2015 for U.S. Appl. No. 14/178,806.
Office action dated Nov. 9, 2015 for U.S. Appl. No. 14/286,369.
Office action dated Nov. 13, 2017 for U.S. Appl. No. 14/678,602.
Office action dated Nov. 18, 2016 for U.S. Appl. No. 14/688,179.
Office action dated Nov. 22, 2016 for U.S. Appl. No. 14/688,214.
Office action dated Nov. 24, 2015 for U.S. Appl. No. 14/045,967.
Office action dated Dec. 5, 2014 for U.S. Appl. No. 12/839,130.
Office action dated Dec. 11, 2012 for U.S. Appl. No. 13/588,741.
Ouchi, et al. Calcium-Antimony Alloys as Electrodes for Liquid Metal Batteries. Journal of The Electrochemical Society. 2014; 161(12):A1898-A1904. Published Sep. 9, 2014.
Ouchi, et al. Calcium-based multi-element chemistry for grid-scale electrochemical energy storage. Nat Commun. Mar. 22, 2016;7:10999. doi: 10.1038/ncomms10999.With supplementary materials.
"SPATOCCO, et al. Low-Temperature Molten Salt Electrolytes for Membrane-Free Sodium Metal Batteries. Published Oct. 20, 2015, available at http://jes.ecsdl.org/content/162/14/A2729.full.pdf+html".
PCT/US2017/050544 International Search Report dated Apr. 25, 2018.
PCT/US2018/026601 International Search Report dated Jul. 30, 2018.
PCT/US2019/066231 International Search Report and Written Opinion dated Mar. 2, 2020.
PCT/US2020/050547 International Preliminary Report on Patentability dated Mar. 24, 2022.
PCT/US2020/050547 International Search Report and Written Opinon dated Dec. 24, 2020.
Pflanz, K. A Liquid Layer Solution for the Grid. http://energy.gov/articles/liquid-layer-solution-grid. Sep. 15, 2011. Accessed Jul. 2, 2015.
Poizeau, Sophie, Thermodynamic properties and atomic structure of Ca-based liquid alloys, PhD Thesis, Massachusetts Institute of Technology, pp. 1-164, Feb. 2013.
Pongsaksawad, et al. Phase-Field Modeling of Transport-Limited Electrolysis in Solid and Liquid States. Journal of the Electrochemical Society, 154 (6) pp. F122-F133, 2007. Available electronically Apr. 18, 2007.
Powell, et al. Modeling electrochemistry in metallurgical processes. Chemistry and Materials Science; JOM Journal of the Minerals, Metals and Materials Society vol. 59, No. 5 (2007), 35-43, DOI: 10.1007/s11837-007-0063-y http://lyre.mit.edu/~powell/papers/jom-0705-35-43.pdf.
Response After Final Rejection dated Apr. 27, 2012 for U.S. Appl. No. 12/839,130.
RU2031491C1 English translation. Nikolaev et al., Russia. Mar. 20, 1995.
Sadoway, D. The Electrochemical Processing of Refractory Metals. JOM, Jul. 1991, pp. 15-19.
Sadoway, Donald R. A Technical Feasibility Study of Steelmaking by Molten Oxide Electrolysis Presentation. Presented at 9th Aisi/Doe Trp Industry Briefing Session, Oct. 10, 2007, Salt Lake City. http://steeltrp.com/Briefing07slides/09-TRP9956_MIT-07IBS.pdf.
Sadoway, Donald R. Electrochemical Pathways Towards Carbon-Free Metals Production Presentation. Presented at GCEP Carbon Management in Manufacturing Industries workshop, Apr. 15-16, 2008, Stanford University. http://gcep.stanford.edu/pdfs/2RK4ZjKBF2f71uM4uriP9g/SadowayGCEP_reduced.pdf.
Sadoway, Donald R. New opportunities for metals extraction and waste treatment by electrochemical processing in molten salts. J. Mater. Res., vol. 10, No. 3, Mar. 1995, pp. 487-492.
Sadoway, Donald R. New opportunities for waste treatment by electrochemical processing in molten salts. Metals and Materials Waste Reduction, Recovery and Remediation, Edited by K.C. Liddell, R.G. Bautista and R.J. Orth, The Minerals, Metals & Materials Society, 1994, pp. 73-76.
Sadoway, et al. Block and graft copolymer electrolytes for high-performance, solid-state, lithium batteries. Journal of Power Sources, Elsevier SA, CH, vol. 129, No. 1, Apr. 15, 2004, pp. 1-3. Available online Jan. 14, 2004.
Sadoway, et al. Innovation in Energy Storage: What I Learned in 3.091 was All I Needed to Know video. http://video.mit.edu/watch/innovation-in-energy-storage-what-i-learned-in-3091-was-all-i-needed-to-know-9601/. MIT Technology Day 2010, Jun. 5, 2010. (Originally posted at http://mitworld.mit.edu/video/800. Archived at http://archive.is/http://mitworld.mit.edu/video/800.) Accessed Jun. 29, 2015.
Salois, Gretchen. Pursuing Metal Purity. Aug. 26, 2013, Modern Metals Website. Accessed Sep. 18, 2015. http://www.modernmetals.com/item/11618-pursuing-metal-purity.html.
Shannon. Revised effective ionic radii and systematic studies of interatomic distances in halides and chalcogenides. Acta Crystallographica Section A: Crystal Physics, Diffraction, Theoretical and General Crystallography. Mar. 9, 1976; A32:751-767.
Shimotake, et al. Bimetallic Galvanic Cells With Fused-Salt Electrolytes. Advances in Energy Conversion Engineering. pages 951-962. 1967 Intersociety Energy Conversion Engineering Conference. American Society of Mechanical Engineers, 1967.
Shimotake, et al. Secondary Cells with Lithium Anodes and Immobilized Fused-Salt Electrolytes. I & EC ProcessDesign and Development, vol. 8, No. 1, Jan. 1969, pp. 51-56.
Sodium Sulfur-Battery Definition; Wikipedia website. Accessed Sep. 3, 2015. https://en.wikipedia.org/wiki/Sodium%E2%80%93sulfur_battery.
Spatocco, et al. Cost-based discovery for engineering solutions. Pp. 1-43. Adv. In Electrochemical Science and Technology (vol. XV), Feb. 9, 2015.
Staller, A. The Real Science of an Alkali Metal Explosion. The Electrochemical Society, Jan. 28, 2015. Accessed Apr. 20, 2015. http://www.ecsblog.org/uncategorized/the-real-science-behind-an-alkali-metal-explosion/.
Supplemental Amendment After Final Rejection dated May 15, 2012 for U.S. Appl. No. 12/839,130.
The Colbert Report. Donald Sadoway interview. Oct. 22, 2012. http://www.colbertnation.com/full-episodes/mon-october-22-2012-donald-sadoway.
U.S. Appl. No. 15/647,468 Notice of Allowance dated Oct. 2, 2019.
U.S. Appl. No. 14/687,838 Notice of Allowance dated Nov. 26, 2019.
U.S. Appl. No. 14/975,587 Notice of Allowance dated Jan. 9, 2019.
U.S. Appl. No. 14/975,587 Notice of Allowance dated Mar. 15, 2019.
U.S. Appl. No. 14/975,587 Notice of Allowance dated Oct. 9, 2018.
U.S. Appl. No. 15/057,732 Notice of Allowance dated Oct. 10, 2018.
U.S. Appl. No. 15/063,842 Office Action dated Feb. 17, 2021.
U.S. Appl. No. 15/063,842 Office Action dated Feb. 26, 2019.
U.S. Appl. No. 15/063,842 Office Action dated May 27, 2020.
U.S. Appl. No. 15/063,842 Office Action dated Sep. 20, 2019.
U.S. Appl. No. 15/130,129 Office Action dated Dec. 6, 2018.
U.S. Appl. No. 15/130,129 Office Action dated Jul. 3, 2019.
U.S. Appl. No. 15/130,129 Office Action dated Jul. 9, 2020.
U.S. Appl. No. 15/130,292 Office Action dated Jan. 24, 2020.
U.S. Appl. No. 15/130,292 Office Action dated Mar. 20, 2019.
U.S. Appl. No. 15/130,292 Office Action dated Nov. 19, 2018.
U.S. Appl. No. 15/140,434 Office Action dated Jun. 12, 2019.
U.S. Appl. No. 15/140,434 Office Action dated Sep. 19, 2018.
U.S. Appl. No. 15/647,468 Notice of Allowance dated Oct. 24, 2019.
U.S. Appl. No. 15/647,468 Office Action dated Jun. 5, 2019.
U.S. Appl. No. 15/690,863 Notice of Allowance dated Jan. 22, 2020.
U.S. Appl. No. 15/690,863 Office Action dated May 17, 2019.
U.S. Appl. No. 15/836,038 Notice of Allowance dated Jan. 9, 2019.
U.S. Appl. No. 16/202,758 Notice of Allowance dated Nov. 8, 2019.
U.S. Appl. No. 16/202,758 Notice of Allowance dated Oct. 7, 2019.
U.S. Appl. No. 16/293,288 Office Action dated Feb. 13, 2023.
U.S. Appl. No. 16/293,288 Office Action dated May 13, 2022.
U.S. Appl. No. 16/293,288 Office Action dated Sep. 12, 2022.
U.S. Appl. No. 16/293,288 Office Action dated Sep. 28, 2021.

(56) References Cited

OTHER PUBLICATIONS

U.S. Appl. No. 16/592,621 Notice of Allowance dated Feb. 23, 2022.
U.S. Appl. No. 16/592,621 Office Action dated Jul. 6, 2021.
U.S. Appl. No. 16/593,278 Notice of Allowance dated Apr. 7, 2022.
U.S. Appl. No. 16/593,278 Notice of Allowance dated Mar. 24, 2022.
U.S. Appl. No. 16/718,020 Notice of Allowance dated Jul. 28, 2021.
U.S. Appl. No. 16/829,965 Notice of Allowance Nov. 19, 2021.
U.S. Appl. No. 16/858,189 Notice of Allowance dated Aug. 18, 2021.
U.S. Appl. No. 17/404,341 Office Action dated Mar. 10, 2023.
U.S. Appl. No. 17/510,056 Notice of Allowance dated Jun. 22, 2023.
U.S. Appl. No. 17/510,056 Notice of Allowance dated Mar. 3, 2023.
U.S. Appl. No. 17/510,056 Office Action dated Sep. 23, 2022.
U.S. Appl. No. 17/529,171 Notice of Allowance dated Nov. 10, 2022.
U.S. Appl. No. 17/670,168 Notice of Allowance dated Jul. 19, 2023.
U.S. Appl. No. 17/670,168 Office Action dated Mar. 7, 2023.
U.S. Appl. No. 17/747,333 Notice of Allowance dated Feb. 1, 2023.
U.S. Appl. No. 18/166,814 Notice of Allowance dated Oct. 12, 2023.
U.S. Appl. No. 18/218,412 Office Action dated Aug. 24, 2023.
Vassiliev, et al. A new proposal for the binary (Sn, Sb) phase diagram and its thermodynamic properties based on a new e.m.f study Journal of Alloys and Compounds 247 (1997) 223-233.
Villar, et al. Assessment of high-temperature self-assembling battery implementation based on the aluminum smelting process. Massachusetts Institute of Technology, Dept. of Materials Science and Engineering, Thesis, 2010. http://hdl.handle.net/1721.1/62677.
Wang, et al. Lithium-antimony-lead liquid metal battery for grid-level energy storage. Nature. Oct. 16, 2014;514(7522):348-50. doi: 10.1038/nature13700. Epub Sep. 21, 2014.
Wang, et al., Thermal runaway caused fire and explosion of lithium ION battery. Journal of Power Sources, 2012; 208: 210-224.
Weaver, et al. The Sodium1Tin Liquid-Metal Cell. J. Electrochem. Soc., 109 (8), 653-657 (Aug. 1962).
Wesoff, E. Video: MIT's Don Sadoway and Energy Storage on the Colbert Report. http://www.greentechmedia.com/articles/read/Video-MITs-Don-Sadoway-and-Energy-Storage-on-the-Colbert-Report. Oct. 24, 2012. Accessed Jul. 2, 2015.
Written opinion of the International Search Authority dated Oct. 15, 2014 for PCT Application No. IB2014/000617.
Xue, et al. Ionic Liquid Redox Catholyte for high Energy Efficiency, Low-cost Energy Storage. Advanced Energy Materials 2015, vol. 5, Issue 12, 1500271, Published online Apr. 17, 2015.
Yu, et al. Determination of the Lithium Ion Diffusion Coefficient in Graphite. J. Electrochem. Soc. 1999 volume 146, issue 1, 8-14.
ZHANG; et al. Pyrite $FeS_2$ as an efficient adsorbent of lithium polysulfide for improved lithium- sulfur batteries. Journal of Materials Chemistry A, vol. 4, Feb. 23, 2016, pp. 4371-4374. doi: 10.1039/C6TA01214K. With supporting information.

* cited by examiner

A

B

C

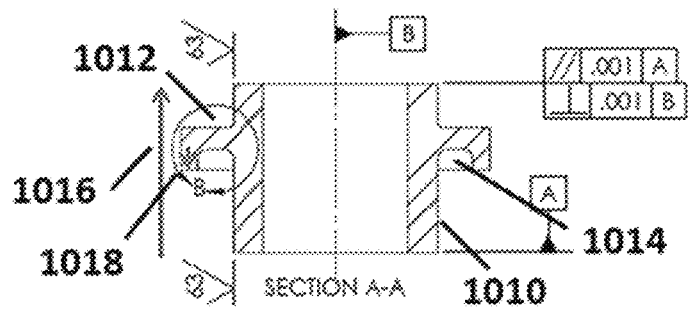
*FIG. 10A*
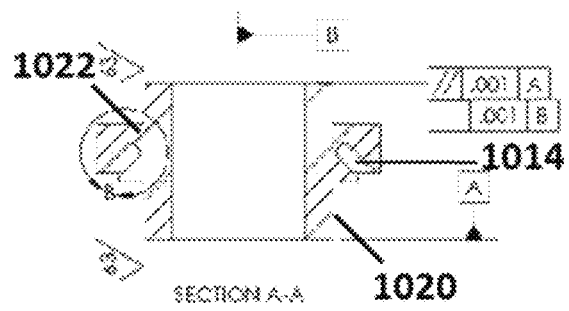 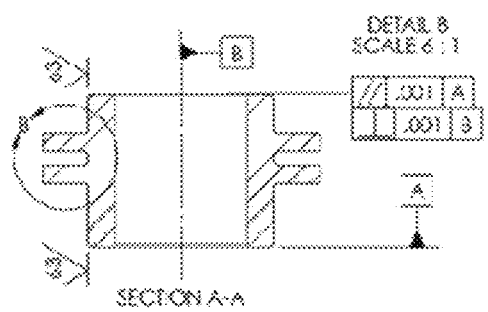
*FIG. 10B*   *FIG. 10C*

ELECTROCHEMICAL ENERGY STORAGE DEVICES

CROSS-REFERENCE

This application is a continuation of U.S. application Ser. No. 16/293,288, filed Mar. 5, 2019, which is a continuation of International Patent Application No. PCT/US2017/050544, filed Sep. 7, 2017, which claims the benefit of U.S. Provisional Patent Application No. 62/384,662, filed Sep. 7, 2016, each of which is incorporated herein by reference in its entirety.

BACKGROUND

Various devices are configured for use at elevated (or high) temperatures. Examples of such devices include elevated temperature batteries, which are devices capable of converting stored chemical energy into electrical energy. Batteries may be used in many household and industrial applications. Another example of a high temperature device is a chemical vapor deposition chamber such as those used in the fabrication of semiconductor devices. Another example of a high temperature device is a chemical process vessel, a transfer pipe, or storage vessel designed to process, transport, contain and/or store reactive metals. Another example of a high temperature device may be any high temperature device requiring electrical isolation between two portions of the exterior surface of the device for the purpose of passing or receiving electrical energy and/or electrical signals into or from the device. These devices typically may operate at a temperature at or in excess of 200° C.

SUMMARY

Recognized herein are various limitations associated with elevated (or high) temperature devices. For instance, some batteries operate at high temperatures (e.g., at least about 100° C. or 300° C.) and have reactive material vapors (e.g., reactive metal vapors such as, for example, vapors of lithium, sodium, potassium, magnesium or calcium) that may be sufficiently contained within the devices. Other examples of high temperature reactive material devices include nuclear (e.g., fusion and/or fission) reactors that use a molten salt or metal (e.g., molten sodium or lithium or molten sodium- or lithium-containing alloys) as a coolant, devices for manufacturing semiconductors, heterogeneous reactors, and devices for producing (e.g., processing) and/or handling (e.g., transporting or storing) reactive materials (e.g., reactive chemicals such as, for examples, a chemical with a strong chemical reducing capability, or reactive metals such as, for example, lithium or sodium). Such devices may be sufficiently sealed from an external environment during use to prevent reactive material vapors from leaving the device (e.g., to prevent device failure, prolong device use, or avoid adverse health effects on users or operators of such devices), and/or may have a protective lining in the device to avoid corrosion of the container. Moreover, the seals of these devices themselves may be protected from effects of use in the presence of high-temperature, reactive materials.

The present disclosure provides ceramic materials that may be used in high temperature devices and/or in other devices, including, for example, strengthened ceramics used in ballistic protection systems and devices (e.g., ballistic penetration resistant armor).

The present disclosure provides seals and/or reactor vessel linings for energy storage devices and other devices having (e.g., containing or comprising) reactive materials (e.g., reactive metals) and operating at high temperatures (e.g., at least about 100° C. or 300° C.). The energy storage devices (e.g., batteries) may be used within an electrical power grid or as part of a standalone system. The batteries may be charged from an electricity production source for later discharge when there is a demand for electrical energy consumption.

In an aspect, the present disclosure provides a high-temperature device, comprising: a container comprising an internal cavity, wherein the internal cavity comprises a reactive material, and wherein the reactive material is maintained at a temperature of at least about 200° C.; a seal that seals the internal cavity of the container from an environment external to the container, wherein the seal comprises a ceramic component, and wherein the seal is exposed to both the reactive material and the environment external to the container; a conductor that extends from the environment external to the container through the seal to the internal cavity of the container; and a first metal sleeve coupled to the conductor and to the ceramic component, wherein the first metal sleeve is coupled to the ceramic component by a first braze joint comprising a first braze, and wherein the first braze comprises an alloy of silver and aluminum.

In some embodiments, the conductor is a negative current lead. In some embodiments, the device further comprises a negative current collector within the container, wherein the negative current collector is in contact with the reactive material and is attached to the negative current lead.

In some embodiments, the device further comprises a second metal sleeve coupled to the ceramic component, wherein the second metal sleeve is coupled to the container or to a collar joined to the container, wherein the second metal sleeve is coupled to the ceramic component by a second braze joint comprising a second braze, and wherein the second braze comprises the alloy of silver and aluminum. In some embodiments, the alloy of silver and aluminum comprises a ratio of silver to aluminum of less than or equal to about 19 to 1. In some embodiments, one or both of the first braze and the second braze further comprises a titanium braze alloy. In some embodiments, the titanium braze alloy comprises about 19-21 weight percent zirconium, 19-21 weight percent nickel, 19-21 weight percent copper, and a remaining weight percent comprises at least titanium.

In some embodiments, the device further comprises an internal braze disposed adjacent to the first braze joint, the second braze joint, or both the first and second braze joint, wherein the internal braze is exposed to the internal cavity of the container. In some embodiments, the internal braze comprises a titanium braze alloy.

In some embodiments, the second metal sleeve is coupled to the container or the collar by a third braze. In some embodiments, the third braze comprises a nickel-based or titanium based braze and the nickel-based braze comprises greater than or equal to about 70 weight percent nickel. In some embodiments, the nickel-based braze comprises a BNi-2 braze, a BNi-5b braze, or a BNi-9 braze.

In some embodiments, the first metal sleeve is coupled to the conductor by a fourth braze. In some embodiments, the fourth braze is a nickel-based braze, titanium-based braze, or the alloy of silver and aluminum.

In some embodiments, the alloy of silver and aluminum further comprises a wetting agent. In some embodiments, the wetting agent comprises titanium. In some embodiments, the ceramic component comprises aluminum nitride. In some embodiments, the ceramic component further comprises greater than or equal to about 3 weight percent yttrium oxide. In some embodiments, the ceramic component further comprises from about 1 percent to about 4 percent yttrium oxide by weight.

In some embodiments, the first and second metal sleeves comprise alloy 42 and the conductor and the collar comprise a stainless steel. In some embodiments, the stainless steel comprises 304L stainless steel. In some embodiments, the first and the second metal sleeves have a thickness of less than or equal to about 0.020 inches.

In an aspect, the present disclosure provides an electrochemical cell, comprising: a container comprising an internal cavity, wherein the internal cavity comprises a reactive material, and wherein the reactive material is maintained at a temperature of at least about 200° C.; a seal that seals the internal cavity of the container from an environment external to the container, wherein the seal comprises a ceramic component exposed to both the reactive material and the environment external to the container; a current lead that extends from the internal cavity of the container through the seal to the environment external to the container; a first metal sleeve coupled to the current lead and to the ceramic component; and a second metal sleeve coupled to the ceramic component and to the container or to a collar joined to the container, wherein the ceramic component comprises a physical ion blocker on a surface of the ceramic component.

In some embodiments, the physical ion blocker is shaped to inhibit electromigration along the surface of the ceramic component. In some embodiments, the physical ion blocker is shaped to inhibit the formation of metal dendrites across the surface of the ceramic component. In some embodiments, the first metal sleeve and the second metal sleeve are respectively coupled to the ceramic component by a first braze and a second braze. In some embodiments, the surface of the ceramic component is an exposed surface of the ceramic component between the first braze and the second braze and the physical ion blocker is shaped such that a shortest path along the exposed surface of the ceramic component from the first braze to the second braze includes a path segment directed at least partially away from both the first braze and the second braze.

In some embodiments, the first and second brazes each comprise an alloy of silver and aluminum. In some embodiments, the current lead is a negative current lead. In some embodiments, the physical ion blocker is attached to the surface of the ceramic component. In some embodiments, the physical ion blocker is disposed on an exposed surface of the ceramic component. In some embodiments, the physical ion blocker is an integral part of the ceramic component, the phisycal ion blocker comprises one or more protrusions as part of the exposed surface of the ceramic component, and the one or more protrusions extend out from a reference surface of the ceramic component.

In some embodiments, the one or more protrusions comprise a plurality of protrusions defining a groove. In some embodiments, the one or more protrusions extend a distance greater than or equal to about 2 mm from the reference surface of the ceramic component. In some embodiments, the one or more protrusions comprise a long dimension and a short dimension, and wherein the long dimension defines a slope disposed at an angle substantially orthogonal to the reference surface of the ceramic component. In some embodiments, the one or more protrusions define a slope disposed at an acute angle relative to the reference surface of the ceramic component and facing toward a source of positive electric field. In some embodiments, the one or more protrusions comprise a first portion extending out from the reference surface of the ceramic component and a second part defining a slope parallel to the reference surface of the ceramic component and extending toward a source of positive electric field. In some embodiments, the source of positive electric field is a body of the container in electrical communication with a positive electrode.

In an aspect, the present disclosure provides a high-temperature device, comprising: a container comprising an internal cavity, wherein the internal cavity comprises a reactive material, and wherein the reactive material is maintained at a temperature of at least about 200° C.; a seal that seals the internal cavity of the container from an environment external to the container, wherein the seal comprises a ceramic component, and wherein the seal is exposed to both the reactive material and the environment external to the container; a conductor that extends from the environment external to the container through the seal to the internal cavity of the container; and a metal sleeve coupled to the conductor and to the ceramic component, wherein the metal sleeve is coupled to the ceramic component by a braze joint comprising a braze, and wherein the braze is formed of a material that is substantially unreactive to air and prevents diffusion of air into the container when the reactive material is maintained at the temperature of at least about 200° C. for a time period of at least about 1 day.

In some embodiments, the braze is ductile. In some embodiments, the device further comprises an internal braze and wherein the internal braze is in contact with and protects the braze from the reactive material. In some embodiments, the internal braze is an active metal braze. In some embodiments, the diffusion of air into the container is of at most about $1 \times 10^{-8}$ atmosphere-cubic centimeters per second. In some embodiments, the braze is an alloy of at least two different metals.

In an aspect, the present disclosure provides a high-temperature device, comprising: a container having a chamber containing a reactive material comprising a gas portion and a liquid portion, the reactive material maintained at a temperature of at least about 200° C.; a seal that seals the chamber of the container from an environment external to the container, wherein the seal comprises a ceramic component exposed to the gas portion; a conductor extending through the seal from the external environment of the container to the chamber of the container, wherein the conductor is in electrical communication with the liquid portion; and a first shield connected to the conductor and disposed within the gas portion between the seal and the liquid portion.

In some embodiments, the first shield at least partially blocks the seal and the liquid portion from each other. In some embodiments, the first shield fully blocks the seal and the liquid portion from each other. In some embodiments, wherein the first shield extends a distance from the conductor, the distance being greater than or equal to about 1.5 times a width of the conductor. In some embodiments, the first shield is shaped to increase an effective gas diffusion path from the liquid portion to the seal by greater than or equal to about 10 percent relative to the same high-temperature device without the shield. In some embodiments, the first shield is shaped to provide an effective gas diffusion path from the liquid portion to the seal of about 7 cm$^{-1}$ or more.

In some embodiments, the first shield is shaped to increase an effective ion path length from the liquid portion to the seal by about 30 percent or more relative to an otherwise identical high-temperature device without a shield. In some embodiments, the increase in effective ion diffusion path length is about 75 percent or more. In some embodiments, the first shield is shaped to provide an effective ion diffusion path length of greater than or equal to about 1.5. In some embodiments, the first shield is shaped to provide an effective ion diffusion path length of greater than or equal to about 2.

In some embodiments, the conductor is a negative current lead. In some embodiments, the device further comprises a second shield disposed between the first shield and the seal. In some embodiments, the first shield and second shield comprise alternating convex and concave portions shaped to produce a diffusion path from the liquid portion to the seal at least 1.5 times as long as a width of the container. In some embodiments, the second shield is coupled to a wall of the chamber. In some embodiments, the first shield is in electrical contact with the negative current lead and wherein the second shield is in electrical contact with a positive current lead.

In some embodiments, the device further comprises a second shield in electrical contact with a positive current lead and disposed between the first shield and the liquid portion. In some embodiments, the liquid portion produces a vapor and the second shield converts the vapor to a salt upon contact. In some embodiments, an internal surface of the container exposed to the gas portion comprises an ionically conductive film in electrical communication with a positive current source and the first shield is shaped to cause vapor flowing between the liquid portion and the seal to flow along the internal surface. In some embodiments, the first shield comprises an edge at its perimeter wherein the edge is shaped and positioned in the chamber to inhibit capillary flow of liquid from the liquid portion along a path from the liquid portion to the seal.

In an aspect, the present disclosure provides an electrochemical cell, comprising: a container having a chamber containing a reactive material maintained at a temperature of at least about 200° C.; a seal that seals the chamber of the container from an environment external to the container, wherein the seal comprises a ceramic component exposed to the reactive material and a metal sleeve coupled to the ceramic component by a braze; and a current lead extending through the seal from the external environment of the container to the chamber of the container, wherein current lead is in electrical contact with the reactive material, and wherein the current lead comprises a shoulder comprising the same material as the current lead and wherein the shoulder couples the sleeve to the current lead.

In some embodiments, the current lead is a negative current lead. In some embodiments, the electrochemical cell further comprises a negative current collector within the chamber and attached to an end of the negative current lead. In some embodiments, the negative current lead comprises a cylindrical body extending through the seal and a threaded portion attaching the negative current lead to the negative current collector and the negative current lead further comprises two parallel, substantially flat surfaces located on opposite sides of an end of the negative current lead outside the container. In some embodiments, the negative current collector comprises a foam.

In some embodiments, the high-temperature device is a battery and the battery comprises a negative electrode, a positive electrode, and a liquid electrolyte. In some embodiments, at least one of the negative electrode and the positive electrode is a liquid metal electrode. In some embodiments, the liquid electrolyte is a molten halide electrolyte.

Another aspect of the present disclosure provides an electrochemical energy storage device comprising a container including a negative electrode, a positive electrode and an electrolyte disposed between the negative electrode and positive electrode. The electrochemical energy storage device can have a first potential difference between the negative electrode and positive electrode at a first temperature that is less than about 50° C. and a second potential difference between the negative electrode and positive electrode at a second temperature of at least about 250° C. The second potential difference can be greater than the first potential difference. At least two of the positive electrode, electrolyte and negative electrode can be liquid at the second temperature. The container can have a surface area-to-volume ratio of less than or equal to about 100 $m^{-1}$, and the electrochemical energy storage device can maintain at least about 90% of its energy storage capacity after 500 charge/discharge cycles.

In some embodiments, the container can contain one or more electrochemical cells, and an individual electrochemical cell of the one or more electrochemical cells can include the negative electrode, the positive electrode and the electrolyte. In some embodiments, over the charge/discharge cycle, a rate of heat generation in the individual electrochemical cell can be greater than or equal to about 50% of a rate of heat loss from the individual electrochemical cell. In some embodiments, the electrochemical energy storage device can maintain at least about 90% of its energy storage capacity after 1,000 charge/discharge cycles.

Another aspect of the present disclosure provides an energy storage system, comprising a container comprising one or more energy storage cells. An individual energy storage cell of the one or more energy storage cells can comprise at least one liquid electrode and a control system. The control system can comprise a computer processor that is programmed to monitor at least one operating temperature of the one or more energy storage cells and/or the container. The computer processor can regulate a flow of electrical energy into at least a subset of the one or more energy storage cells such that the subset undergoes sustained self-heating over a charge/discharge cycle.

In some embodiments, over the charge/discharge cycle, a rate of heat generation in the individual energy storage cell can be greater than or about equal to a rate of heat loss from the individual energy storage cell. In some embodiments, over the charge/discharge cycle, a rate of heat generation in the individual energy storage cell can be less than or equal to about 150% of a rate of heat loss from the individual energy storage cell.

In some embodiments, the computer processor can monitor the at least one operating temperature and regulates the flow of electrical energy such that the at least one operating temperature is greater than or equal to about 250° C. and the at least one liquid electrode is maintained as a liquid. In some embodiments, the computer processor can monitor the at least one operating temperature and regulate the flow of electrical energy such that over the charge/discharge cycle, the at least one operating temperature is greater than or equal to about 250° C.

In some embodiments, the at least one liquid electrode can comprise (i) lithium, sodium, potassium, magnesium, calcium, or any combination thereof, or (ii) antimony, lead, tin, tellurium, bismuth, or any combination thereof.

In some embodiments, the individual energy storage cell can further comprise an electrolyte adjacent to the at least one liquid electrode. The electrolyte can be a liquid, solid or a paste.

In some embodiments, the one or more energy storage cells can maintain at least about 90% of their energy storage capacity after 100 charge/discharge cycles. In some embodiments, the one or more energy storage cells can maintain at least about 90% of their energy storage capacity after 500 charge/discharge cycles.

In some embodiments, the individual energy storage cell can have an efficiency of at least about 80%. In some embodiments, the individual energy storage cell can have an efficiency of at least about 80% at a current density of at least about 100 mA/cm$^2$. In some embodiments, the individual energy storage cell can have an efficiency of at least about 90%. In some embodiments, the individual energy storage cell can have an efficiency of at least about 90% at a current density of at least about 100 mA/cm$^2$.

In another aspect, the present disclosure provides an energy storage device comprising a negative electrode, a positive electrode and an electrolyte disposed between the negative electrode and positive electrode. At least one of the positive electrode and negative electrode can be liquid at an operating temperature of the energy storage device that is greater than a non-operating temperature of the energy storage device. The energy storage device can maintain at least about 90% of its energy storage capacity after 500 charge/discharge cycles, and the energy storage device can have an efficiency of at least about 80% at a current density of at least about 100 mA/cm$^2$.

In some embodiments, the energy storage device can maintain at least about 95% of its energy storage capacity after 500 charge/discharge cycles.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" or "FIG." herein), of which:

FIG. 10A, FIG. 10B, and FIG. 10C illustrate different configurations of a physical ion blocker;

DETAILED DESCRIPTION

Figure 1:
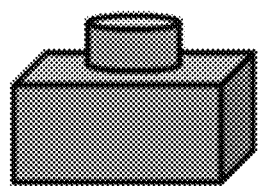
FIG. 1 is an illustration of an electrochemical cell (A) and a compilation (e.g., battery) of electrochemical cells (B and C)
Figure 1:
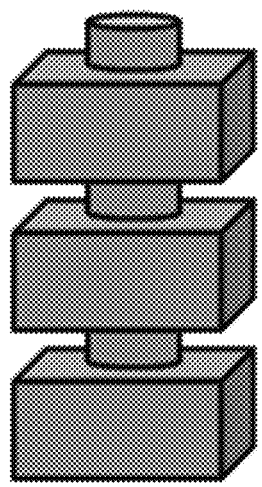
Figure 1:
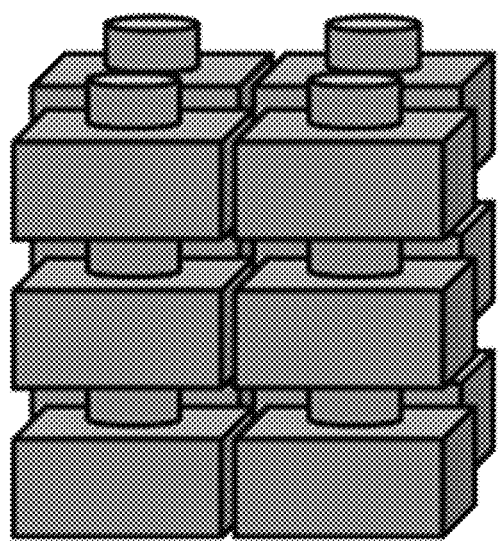

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

The term "direct metal-to-metal joining" or "direct metal-to-metal joint," as used herein, generally refers to an electrical connection where two metal surfaces are brought into contact (e.g., by forming a braze or a weld). In some examples, direct metal-to-metal joints do not include wires.

The term "electronically," as used herein, generally refers to a situation in which electrons can readily flow between two or more components with little resistance. Components that are in electronic communication with one another can be in electrical communication with one another.

The term "vertical," as used herein, generally refers to a direction that is parallel to the force of gravity.

The term "stable," as used herein to describe a material, generally refers to a material that is thermodynamically stable, chemically stable, thermochemically stable, electrochemically stable, kinetically stable, or any combination thereof. A stable material may be substantially thermodynamically, chemically, thermochemically, electrochemically and/or kinetically stable. A stable material may not be substantially chemically or electrochemically reduced, attacked or corroded. Any aspects of the disclosure described in relation to stable, thermodynamically stable or chemically stable materials may equally apply to thermodynamically stable, chemically stable, thermochemically stable and/or electrochemically stable materials at least in some configurations.

Ceramic Materials and Seals for High-Temperature Devices

The present disclosure provides a seal or a corrosion resistant lining for a high-temperature device. The device can be a high temperature reactive material device that contains/comprises one or more reactive materials. For example, the high-temperature device can contain a reactive material. In some cases, the device can be a high-temperature reactive metal device. The device can be, without limitation, for the production and/or handling of a reactive material, such as, for example, a reactive metal (e.g., lithium, sodium, magnesium, aluminum, calcium, titanium and/or other reactive metals) and/or a chemical with a strong chemical reducing capability (e.g., reactive chemical), for semiconductor manufacturing, for a nuclear reactor (e.g., nuclear fusion/fission reactor, nuclear reactor that uses a molten salt or metal, such as, for example, molten sodium or lithium or molten sodium- or lithium-containing alloys, as a coolant), for a heterogeneous reactor, for a chemical processing device, for a chemical transportation device, for a chemical storage device, or for a battery (e.g., a liquid metal battery). For instance, some batteries operate at high temperatures (e.g., at least about 100° C. or 300° C.) and have reactive metal vapors (e.g., lithium, sodium, potassium, magnesium, or calcium) that may be sufficiently contained within the battery to reduce failure. In some examples, such high-temperature devices operate, are heated to and/or maintained at a temperature of at least about 100° C., 150° C., 200° C., 250° C., 300° C., 350° C., 400° C., 450° C., 500° C., 550° C., 600° C., 650° C., 700° C., 750° C., 800° C., 850° C., 900° C. or more. At such temperatures, one or more components of the device can be in a liquid (or molten) or vaporized state.

The device may comprise a ceramic material. The ceramic material may function as a dielectric insulator in a device that contains one or more reactive materials. The device may operate at a temperature of, for example, at least about 300° C. or 400° C. The device may be associated with a nuclear fission or fusion reactor. The dielectric insulator may be part of a seal (e.g., a gas-tight seal). The ceramic material may be used in a seal of a device that contains reactive materials and operates at a temperature of greater than about 300° C.

The seal can comprise a ceramic material (e.g., aluminum nitride (AlN)) that is in contact with the reactive material (e.g., a reactive metal or molten salt) contained in the device. The ceramic material can be capable of being chemically resistant to a reactive material (e.g., a reactive material contained in the device, such as, for example, reactive metal or molten salt). The ceramic material can be capable of being chemically resistant to the reactive material when the device operates at a high temperature (e.g., at least about 100° C., 150° C., 200° C., 250° C., 300° C., 350° C., 400° C., 500° C., 600° C., 700° C., 800° C. or 900° C.).

The seal can comprise an active metal braze disposed between the ceramic material and at least one of the metal collar/sleeve and the device. The active metal braze can comprise a metal species that chemically reduces the ceramic material (e.g., titanium (Ti) or zirconium (Zr)).

The seal can surround an electrically conductive feed-through (and can electrically isolate the feed-through from a housing of the device), a thermocouple or a voltage sensor. For example, the ceramic material can be an insulator.

In some examples, the seal may be capable of being chemically resistant to reactive materials in the device at a temperature of at least about 100° C., 150° C., 200° C., 250° C., 300° C., 350° C., 400° C., 500° C., 600° C., 700° C., 800° C. or 900° C. In some examples the seal may be capable of being chemically resistant to reactive materials at such temperatures for at least about 6 months, 1 year, 2 years, 5 years, 10 years, 20 years or more. In some examples, the device can be a high-temperature reactive metal device, and the seal can be capable of being chemically resistant to materials in the device that comprise the reactive metal. In an example, the seal is capable of being resistant to lithium vapor at a temperature of at least about 300° C. for at least about one year. The seal can retain the reactive material (e.g., vapors of the reactive material) in the device. For example, the seal can retain reactive metal vapors and/or molten salt vapors in the device.

Electrochemical Cells, Devices, and Systems

The present disclosure provides electrochemical energy storage devices (e.g., batteries) and systems. An energy storage device may form or be provided within an energy storage system. The electrochemical energy storage device generally includes at least one electrochemical cell, also "cell" and "battery cell" herein, sealed (e.g., hermetically sealed) within a housing. A cell can be configured to deliver electrical energy (e.g., electrons under potential) to a load, such as, for example, an electronic device, another energy storage device or a power grid.

An electrochemical cell of the disclosure can include a negative electrode, an electrolyte adjacent to the negative electrode, and a positive electrode adjacent to the electrolyte. The negative electrode can be separated from the positive electrode by the electrolyte. The negative electrode can be an anode during discharge. The positive electrode can be a cathode during discharge. A cell can include a negative electrode of material 'A' and a positive electrode of material 'B', denoted as A∥B. The positive and negative electrodes can be separated by an electrolyte. A cell can also include a housing, one or more current collectors, and a seal (e.g., a high temperature electrically isolating seal).

In some examples, an electrochemical cell is a liquid metal battery cell. In some examples, a liquid metal battery cell can include a liquid electrolyte arranged between a negative liquid (e.g., molten) metal electrode and a positive solid, semi-solid, or liquid (e.g., molten) metal, metalloid and/or non-metal electrode. In some cases, a liquid metal battery cell has a molten alkaline earth metal (e.g., magnesium (Mg), calcium (Ca)) and/or alkali metal (e.g., lithium, sodium, potassium) negative electrode, an electrolyte, and a metal positive electrode. The metal positive electrode can include, for example, one or more of tin (Sn), lead (Pb), bismuth (Bi), antimony (Sb), tellurium (Te), and selenium (Se). For example, the positive electrode can include liquid Pb, solid Sb, a liquid or semi-solid Pb—Sb alloy or liquid Bi. The positive electrode can also include one or more transition metals or d-block elements (e.g., zinc (Zn), cadmium (Cd), and mercury (Hg)) alone or in combination with other metals, metalloids or non-metals, such as, for example, a Zn—Sn alloy or Cd—Sn alloy. In some examples, the positive electrode can comprise a metal or metalloid that has one stable oxidation state (e.g., a metal with a single or singular oxidation state). Any description of a metal or molten metal positive electrode, or a positive electrode, herein may refer to an electrode including one or more of a metal, a metalloid and a non-metal. The positive electrode may contain one or more of the listed examples of materials. In an example, the metal positive electrode can include lead and/or antimony. In some examples, the metal positive electrode may include an alkali and/or alkaline earth metal alloyed in the positive electrode.

The electrolyte can include a salt (e.g., molten salt), such as an alkali or alkaline earth metal salt. The alkali or alkaline earth metal salt can be a halide, such as a fluoride (F), chloride (Cl), bromide (Br), or iodide (I) of the active alkali or alkaline earth metal, or combinations thereof. In an example, the electrolyte (e.g., in Type 1 or Type 2 chemistries) includes lithium chloride (LiCl). In some examples, the electrolyte can comprise sodium fluoride (NaF), sodium chloride (NaCl), sodium bromide (NaBr), sodium iodide (NaI), lithium fluoride (LiF), lithium chloride (LiCl), lithium bromide (LiBr), lithium iodide (LiI), potassium fluoride (KF), potassium chloride (KCl), potassium bromide (KBr), potassium iodide (KI), calcium fluoride ($CaF_2$), calcium chloride ($CaCl_2$), calcium bromide ($CaBr_2$), calcium iodide ($CaI_2$), strontium fluoride ($SrF_2$), strontium chloride ($SrCl_2$), strontium bromide ($SrBr_2$), strontium iodide ($SrI_2$) or any combination thereof. In some examples, the electrolyte includes magnesium chloride ($MgCl_2$). As an alternative, the salt of the active alkali metal can be, for example, a non-chloride halide, bistriflimide, fluorosulfano-amine, perchlorate, hexaflourophosphate, tetrafluoroborate, carbonate, hydroxide, nitrate, nitrite, sulfate, sulfite, or combinations thereof. In some cases, the electrolyte can comprise a mixture of salts (e.g., 25:55:20 mol-% LiF:LiCl:LiBr, 50:37:14 mol-% LiCl:LiF:LiBr, 34:32.5:33.5 mol-% LiCl—LiBr—KBr, etc.). In some examples, the electrolyte comprises about 30:15:55 mol % of $CaCl_2$:KCl:LiCl. In some examples, the electrolyte comprises about 35:65 mol % $CaCl_2$:LiCl. In some examples, the electrolyte comprises about 24:38:39 wt % LiCl:$CaCl_2$:$SrCl_2$. In some examples, the electrolyte comprises at least about 20 wt % $CaCl_2$, 20 wt % $SrCl_2$, and 10 wt % KCl. In some examples, the electrolyte comprises at least about 10 wt % LiCl, 30 wt % $CaCl_2$, 30 wt % $SrCl_2$, and 10 wt % KCl. The electrolyte may exhibit low (e.g., minimal) electronic conductance. For example, the electrolyte can have an electronic transference number (i.e., percentage of electrical (electronic and ionic) charge that is due to the transfer of electrons) of less than or equal to about 0.03% or 0.3%.

In some cases, the negative electrode and/or the positive electrode of an electrochemical energy storage device is/are in the liquid state at an operating temperature of the energy storage device. To maintain the electrode(s) in the liquid state(s), the battery cell may be heated to any suitable temperature. In some examples, the battery cell is heated to and/or maintained at a temperature of about 100° C., 150° C., 200° C., 250° C., 300° C., 350° C., 400° C., 450° C., 475° C., 500° C., 550° C., 600° C., 650° C. or about 700° C. The battery cell may be heated to and/or maintained at a temperature of at least about 100° C., 150° C., 200° C., 250° C., 300° C., 350° C., 400° C., 450° C., 475° C., 500° C., 550° C., 600° C., 650° C., 700° C., 800° C. or 900° C. In such a case, the negative electrode, electrolyte and/or positive electrode can be in a liquid (or molten) state. In one example, the negative electrode and the electrolyte are in a liquid state and the positive electrode is in a solid or semi-solid state. In some situations, the battery cell is heated to between about 200° C. and 600° C., 500° C. and 550° C. or 450° C. and 575° C.

In some implementations, the electrochemical cell or energy storage device may be at least partially or fully self-heated. For example, a battery may be sufficiently insulated, charged, discharged and/or conditioned at sufficient rates, and/or cycled a sufficient percentage of the time to allow the system to generate sufficient heat through inefficiencies of the cycling operation so that cells are maintained at a given operating temperature (e.g., a cell operating temperature above the freezing point of at least one of the liquid components) without applying additional energy to the system.

Electrochemical cells of the disclosure may be adapted to cycle between charged (or energy storage) modes and discharged modes. In some examples, an electrochemical cell can be fully charged, partially charged or partially discharged, or fully discharged.

Cells may have voltages. Charge cutoff voltage (CCV) may refer to the voltage at which a cell is fully or substantially fully charged, such as a voltage cutoff limit used in a battery when cycled in a constant current mode. Open circuit voltage (OCV) may refer to the voltage of a cell (e.g., fully or partially charged) when it is disconnected from any circuit or external load (i.e., when no current is flowing through the cell). Voltage or cell voltage, as used herein, may refer to the voltage of a cell (e.g., at any state of charge or charging/discharging condition). In some cases, voltage or cell voltage may be the open circuit voltage. In some cases, the voltage or cell voltage can be the voltage during charging or during discharging. Voltages of the present disclosure may be taken or represented with respect to reference voltages, such as ground (0 volt (V)), or the voltage of the opposite electrode in an electrochemical cell.

The present disclosure provides Type 1 and Type 2 cells, which can vary based on, and be defined by, the composition of the active components (e.g., negative electrode, electrolyte and positive electrode), and based on the mode of operation of the cells (e.g., low voltage mode versus high voltage mode). A cell can comprise materials that are configured for use in Type 2 mode of operation. A cell can comprise materials that are configured for use in Type 1 mode of operation. In some cases, a cell can be operated in both a high voltage (Type 2) operating mode and the low voltage (Type 1) operating mode. For example, a cell with positive and negative electrode materials that are ordinarily configured for use in a Type 1 mode can be operated in a Type 2 mode of operation. A cell can be cycled between Type 1 and Type 2 modes of operation. A cell can be initially charged (or discharged) under Type 1 mode to a given voltage (e.g., 0.5 V to 1 V), and subsequently charged (then discharged) under Type 2 mode to a higher voltage (e.g., 1.5 V to 2.5 V, or 1.5 V to 3 V). In some cases, cells operated under Type 2 mode can operate at a voltage between electrodes that can exceed those of cells operated under Type 1 mode. In some cases, Type 2 cell chemistries can operate at a voltage between electrodes that can exceed those of Type 1 cell chemistries operated under Type 1 mode. Type 2 cells can be operated in Type 2 mode.

In an example Type 1 cell, upon discharging, cations formed at the negative electrode can migrate into the electrolyte. Concurrently, the electrolyte can provide a cation of the same species (e.g., the cation of the negative electrode material) to the positive electrode (e.g., Sb, Pb, Bi, Sn, or any combination thereof), which can reduce from a cation to a neutrally charged metallic species, and alloy with the positive electrode. In some examples, different cation species in the electrolyte can co-deposit onto the positive electrode (e.g., calcium$^{2+}$ (Ca$^{2+}$) and lithium$^+$ (Li$^+$) deposit onto Sb and form Ca—Li—Sb alloy(s)). In a discharged state, the negative electrode can be depleted (e.g., partially or fully) of the negative electrode material (e.g., lithium (Li), sodium (Na), potassium (K), Mg, Ca). During charging, the alloy at the positive electrode can disassociate to yield one or more different species of cations of the negative electrode material (e.g., Li$^+$, Na$^+$, K$^+$, Mg$^{2+}$, Ca$^{2+}$), which migrates into the electrolyte. The electrolyte can then provide cations (e.g., a cation of the negative electrode material) to the negative electrode, where the cations accept one or more electrons from an external circuit and are converted back to a neutral metal species, which replenishes the negative electrode to provide a cell in a charged state. In some examples, different cation species in the electrolyte can co-deposit onto the negative electrode during charging. A Type 1 cell can operate in a push-pop fashion, in which the entry of one or a set of cations into the electrolyte results in the discharge of the same cation or same set of cation species from the electrolyte.

In an example Type 2 cell, in a discharged state the electrolyte comprises cations of the negative electrode material (e.g., Li$^+$, Na$^+$, K$^+$, Mg$^{2+}$, Ca$^{2+}$), and the positive electrode comprises positive electrode material (e.g., Sb, Pb, Sn, Zn, Hg). During charging, a cation of the negative electrode material from the electrolyte accepts one or more electrons (e.g., from a negative current collector) to form the negative electrode comprising the negative electrode material. In some examples, the negative electrode material is liquid and wets into a foam (or porous) structure of the negative current collector. In some examples, negative current collector may not comprise foam (or porous) structure. In some examples, the negative current collector may comprise a metal, such as, for example, tungsten (W) (e.g., to avoid corrosion from Zn), tungsten carbide (WC) or molybdenum (Mo) negative collector not comprising iron-nickel (Fe—Ni) foam. Concurrently, positive electrode material from the positive electrode sheds electrons (e.g., to a positive current collector) and dissolves into the electrolyte as cations of the positive electrode material (e.g., Sb$^{3+}$, Pb$^{2+}$, Sn$^{2+}$, Hg$^{2+}$). The concentration of the cations of the positive electrode material can vary in vertical proximity within the electrolyte (e.g., as a function of distance above the positive electrode material) based on the atomic weight and diffusion dynamics of the cation material in the electrolyte. In some examples, the cations of the positive electrode material are concentrated in the electrolyte near the positive electrode.

In some implementations, negative electrode material may not be provided at the time of assembly of a cell that can be operated in a Type 2 mode. For example, a Li∥Pb cell or an energy storage device comprising such cell(s) can be assembled in a discharged state having a Li salt electrolyte and a Pb or Pb alloy (e.g., Pb—Sb) positive electrode (i.e., Li metal may not be included during assembly).

Although electrochemical cells of the present disclosure have been described, in some examples, as operating in a Type 1 mode or Type 2 mode, other modes of operation are possible. Type 1 mode and Type 2 mode are provided as examples and are not intended to limit the various modes of operation of electrochemical cells disclosed herein.

In some cases, an electrochemical cell comprises a liquid metal negative electrode (e.g., sodium (Na) or lithium (Li)), a liquid (e.g., LiF—LiCl—LiBr, LiCl—KCl or LiCl—LiBr—KBr) or solid ion-conducting electrolyte (e.g., β"-alumina ceramic), and a solid, liquid, or semi-solid positive electrode (e.g., a solid matrix or particle bed impregnated with a liquid or molten electrolyte). Such a cell can be a high temperature battery. One or more such cells can be provided in an electrochemical energy storage device. The negative electrode may comprise an alkali or alkaline earth metal, such as, for example, lithium, sodium, potassium, magnesium, calcium, or any combination thereof. The positive electrode and/or electrolyte may comprise a liquid chalcogen or a molten chalcogen-halogen compound (e.g., elemental, ionic or other form of sulfur (S), selenium (Se) or tellurium (Te)), a molten salt comprising a transition metal halide (e.g., halides comprising Ni, Fe, chromium (Cr), manganese (Mn), cobalt (Co) or vanadium (V), such as, for example, nickel chloride (NiCl$_3$) or iron chloride (FeCl$_3$)), a solid transition metal (e.g., particles of Ni, Fe, Cr, Mn, Co or V), sulfur, one or more metal sulfides (e.g., FeS$_2$, FeS, NiS$_2$, CoS$_2$, or any combination thereof), a liquid or molten alkali halometallate (e.g., comprising aluminum (Al), Zn or Sn) and/or other (e.g., supporting) compounds (e.g., NaCl, NaF, NaBr, NaI, KCl, LiCl or other alkali halides, bromide salts, elemental zinc, zinc-chalcogen or zinc-halogen compounds, or metallic main-group metals or oxygen scavengers such as, for example, aluminum or transition metal-aluminum alloys), or any combination thereof. The solid ion-conducting electrolyte may comprise a beta alumina (e.g., β"-alumina) ceramic capable of conducting sodium ions at elevated or high temperature. In some instances, the solid ion-conducting electrolyte operates above about 100° C., 150° C., 200° C., 250° C., 300° C. or 350° C.

In one example, the electrochemical cell in a charged state comprises a negative electrode comprising calcium, an electrolyte comprising CaCl$_2$, and a positive electrode comprising antimony. The cell may have an operating temperature of less than about 600° C., 550° C., 500° C., 450° C., 400° C., 350° C., 300° C., 250° C., or 200° C. In some examples, the cell may have an operating temperature of at least about 200° C., 250° C., 300° C., 350° C., 400° C., 450° C., 500° C., or greater. The positive electrode, or cathode in the charged state, may comprise solid antimony and/or solid antimony alloys and may not comprise any liquid metal. The negative electrode, or anode in the charged state, may comprise lithium and/or magnesium metal. The negative electrode may remain a liquid or semi-solid during normal operating (e.g., charging, discharging) conditions.

Any aspects of the disclosure described in relation to cathodes can equally apply to anodes at least in some configurations. Similarly, one or more battery electrodes and/or the electrolyte may not be liquid in alternative configurations. In an example, the electrolyte can be a polymer, a gel or a paste. In a further example, at least one battery electrode can be a solid, a gel or a paste. Furthermore, in some examples, the electrodes and/or electrolyte may not include metal. Aspects of the disclosure are applicable to a variety of energy storage/transformation devices without being limited to liquid metal batteries.

Batteries and Housings

Electrochemical cells of the disclosure can include housings that may be suited for various uses and operations. A housing can include one cell or a plurality of cells. A housing can be configured to electrically couple the electrodes to a switch, which can be connected to the external power source and the electrical load. The cell housing may include, for example, an electrically conductive current feedthrough conductor (e.g., current lead rod) that is electrically coupled to a first pole of the switch and/or another cell housing, and an electrically conductive container lid that is electrically coupled to a second pole of the switch and/or another cell housing. The cell can be arranged within a cavity of the container. A first one of the electrodes of the cell (e.g., positive electrode) can contact and be electrically coupled with an endwall of the container. A second one of the electrodes of the cell (e.g., negative electrode) can contact and be electrically coupled with a conductive feed-through or conductor (e.g., negative current lead) on the container lid (collectively referred to herein as "cell lid assembly," "lid assembly" or "cap assembly" herein). An electrically insulating seal (e.g., bonded ceramic ring) may electrically isolate negative potential portions of the cell from positive portions of the cell (e.g., electrically insulate the negative current lead from the positive current lead or electrically insulate a positively polarized current lead from a negatively polarized cell lid/cell housing). In an example, the negative current lead and the container lid (e.g., cell cap) can be electrically isolated from each other, where a dielectric sealant material can be placed between the negative current lead and the cell cap. As an alternative, a housing includes an electrically insulating sheath (e.g., alumina sheath) or corrosion resistant and electrically conductive sheath or crucible (e.g., graphite sheath or crucible). In some examples, a housing and/or container may be a battery housing and/or container.

A cell can have any cell and seal configuration disclosed herein. For instance, the active cell materials can be held within a sealed steel/stainless steel container with a high temperature seal on the cell lid. A current lead (e.g., negative current lead rod) can pass through the cell lid (and be sealed to the cell lid by the dielectric high temperature seal), and connect with a porous current collector (e.g., negative current collector, such as a metal foam) suspended in an electrolyte. In some examples, the cell can use a graphite sheath, coating, crucible, surface treatment or lining (or any combination thereof) on the inner wall of the cell crucible (e.g., container). In some examples, the cell may not use a graphite sheath, coating, crucible, surface treatment or lining on an inner wall of the cell crucible (e.g., container).

A cell may have a set of dimensions. In some examples, a cell can be greater than or equal to about 4 inches wide, 4 inches deep and 2.5 inches tall. In some examples, a cell can be greater than or equal to about 8 inches wide, 8 inches deep and 2.5 inches tall. In some examples, the height and width of the cell can be greater than the depth of the cell, with the seal positioned on the top horizontal surface of the cell, and can be referred to as a 'prismatic' cell geometry. A prismatic cell geometry may have a width that is at least about 4, 6, 8, 10, 12, 14, or more inches, a height that is at least about 4, 6, 8, 10, 12, 14, or more inches, and a depth that is less than about 8, 6, 4, 2, or less inches. In some examples, a prismatic cell geometry has a width of about 4 inches, a height of about 6 inches, and a depth of about 2 inches. In some examples, a prismatic cell geometry has a width of about 6 inches, a height of about 6 inches, and a depth of about 2 inches. In some examples, a prismatic cell geometry has a width of about 6 inches, a height of about 6 inches, and a depth of about 3 inches. In some examples, a prismatic cell geometry has a width of about 8 inches, a height of about 8 inches, and a depth of about 2 inches. In some examples, a prismatic cell geometry has a width of about 8 inches, a height of about 8 inches, and a depth of about 3 inches. In some examples, a prismatic cell geometry has a width of about 9 inches, a height of about 9 inches, and a depth of about 2 inches. In some examples, a prismatic cell geometry has a width of about 9 inches, a height of about 9 inches, and a depth of about 3 inches. In some examples, any given dimension (e.g., height, width or depth) of an electrochemical cell can be at least about 1, 2, 2.5, 3, 3.5, 4, 4.5, 5, 5.5, 6, 6.5, 7, 7.5, 8, 8.5, 9, 9.5, 10, 12, 14, 16, 18 or 20 inches. In an example, a cell (e.g., each cell) can have dimensions of greater than or equal to about 4 inches×4 inches×2 inches. In some examples, a cell (e.g., each cell) can have dimensions of greater than or equal to about 8 inches×8 inches×2.5 inches. In some examples, a cell may have greater than or equal to about 50 Watt-hours of energy storage capacity. In some examples, a cell may have at least about 200 Watt-hours of energy storage capacity.

The positive electrode may be in electrical communication with a positive current collector. In some embodiments, the positive electrode may be in electrical communication with the housing. In some embodiments, the positive electrode may comprise antimony. In some embodiments, the positive electrode may comprise an antimony alloy. In some embodiments, the positive electrode may be a solid metal electrode. In some embodiments, the solid metal positive electrode may be in a slab configuration. Alternatively, or in addition to, the solid metal positive electrode may comprise particles. The particles may comprise granules, flakes, needles, or any combination thereof of solid material. In some embodiments, the positive electrode may be solid antimony. The solid antimony may be in a slab configuration. Alternatively, or in addition to, the solid antimony may be particles comprising granules, flakes, needles, or any combination thereof of solid material. The solid metal positive electrode particles may comprise a dimension of at least about 0.001 mm, at least about 0.01 mm, at least about 0.1 mm, at least about 0.25 mm, at least about 0.5 mm, at least about 1 mm, at least about 2 mm, at least about 3 mm, at least about 5 mm, or larger. In some embodiments, the electrolyte sits on top of the positive electrode. Alternatively, or in addition to, the positive electrode may be submerged in or surrounded by the electrolyte.

The electrochemical cell may be arranged within the housing so that the average flow path of ions is substantially perpendicular to the plane of the container lid (e.g., ions flow vertically between the negative and positive electrode when the lid is facing in an upwards direction). This configuration may comprise a negative electrode contained within a negative current collector suspended within the cavity of the housing by a negative current lead. In this configuration, the width of the negative current collector may be greater than the height. The negative electrode may be partially or fully submerged in a molten salt electrolyte. A gaseous headspace may be present above the negative electrode (i.e., between the negative electrode and the container lid). The molten salt electrolyte may be between, and separate, the negative electrode and the positive electrode. The positive electrode may be positioned at or near the bottom (i.e., opposite the container lid) of the cavity. The positive electrode may comprise a solid slab geometry or may comprise particles of solid material. The positive electrode may be positioned below the electrolyte or may be submerged or surrounded by the electrolyte. During discharge, ions may flow from the negative electrode to the positive electrode with an average flow path that is perpendicular to and away from the container lid. During charging, ions may flow from the positive electrode to the negative electrode with an average flow path that is perpendicular to and towards the container lid.

The electrochemical cell may be arranged with the housing so that the average flow path of ions is substantially parallel to the plane of the container lid (e.g., ions flow horizontally between the negative and positive electrode when the lid is facing in an upward direction). In some examples, an electrochemical cell comprises a negative electrode contained within a negative current collector suspended within the cavity of the housing by a negative current lead. In this configuration, the height of the negative current collector may be greater than the width. The negative electrode may be partially or fully submerged in a molten salt electrolyte. A gaseous headspace may be present between the negative electrode and the container lid. In some embodiments, the negative electrode may be submerged and covered by a molten electrolyte and the gaseous headspace may be between the electrolyte and the container lid. The positive electrode may be positioned along the sidewalls of the housing between the bottom of the cavity and the container lid. The positive electrode may be positioned along a portion of the interior sidewall or cover one or more of the entire interior sidewall(s) of the cavity. The positive electrode may cover an area that is at least about 5%, at least about 10%, at least about 20%, at least about 30%, at least about 40%, at least about 50%, at least about 60%, at least about 70%, at least about 80%, at least about 90%, or more of the sidewall.

The cross-sectional geometry of the cell or battery can be circular, elliptical, square, rectangular, polygonal, curved, symmetric, asymmetric, or any other compound shape based on design requirements for the battery. In some examples, the cell or battery is axially symmetric with a circular or square cross-section. Components of cell or battery (e.g., negative current collector) may be arranged within the cell or battery in an axially symmetric fashion. In some cases, one or more components may be arranged asymmetrically, such as, for example, off the center of the axis.

One or more electrochemical cells ("cells") may be arranged in groups. Examples of groups of electrochemical cells include modules, packs, cores, CEs and systems.

A module can comprise cells that are attached together in parallel by, for example, mechanically connecting the cell housing of one cell with the cell housing of an adjacent cell (e.g., cells that are connected together in an approximately horizontal packing plane). In some examples, a module can comprise cells that are attached together in series, by, for example, mechanically connecting the cell housing of one cell with the current lead rod that protrudes from the seal of an adjacent cell. In some examples, the cells are connected to each other by joining features that are part of and/or connected to the cell body (e.g., tabs protruding from the main portion of the cell body). A module can include a plurality of cells in parallel or in series. A module can comprise any number of cells, e.g., at least about 2, 3, 4, 5, 6, 7, 8, 9, 10, 11, 12, 13, 14, 15, 16, 17, 18, 19, 20 or more cells. In some examples, a module comprises at least about 4, 9, 12 or 16 cells. In some examples, a module is capable of storing greater than or equal to about 700 Watt-hours of energy and/or delivering at least about 175 Watts of power. In some examples, a module is capable of storing at least about 1080 Watt-hours of energy and/or delivering at least about 500 Watts of power. In some examples, a module is capable of storing at least about 1080 Watt-hours of energy and/or delivering at least about 200 Watts (e.g., greater than or equal to about 500 Watts) of power. In some examples, a module can include a single cell.

A pack can comprise modules that are attached through different electrical connections (e.g., vertically). A pack can comprise any number of modules, e.g., at least about 1, 2, 3, 4, 5, 6, 7, 8, 9, 10, 11, 12, 13, 14, 15, 16, 17, 18, 19, 20 or more modules. In some examples, a pack comprises at least about 3 modules. In some examples, a pack is capable of storing at least about 2 kilo-Watt-hours of energy and/or delivering at least about 0.4 kilo-Watts (e.g., at least about 0.5 kilo-Watts or 1.0 kilo-Watts) of power. In some examples, a pack is capable of storing at least about 3 kilo-Watt-hours of energy and/or delivering at least about 0.75 kilo-Watts (e.g., at least about 1.5 kilo-Watts) of power. In some examples, a pack comprises at least about 6 modules. In some examples, a pack is capable of storing greater than or equal to about 6 kilo-Watt-hours of energy and/or delivering at least about 1.5 kilo-Watts (e.g., greater than or equal to about 3 kilo-Watts) of power. In some examples, modules are connected together into a pack in a series connection.

A core can comprise a plurality of modules or packs that are attached through different electrical connections (e.g., in series and/or parallel). A core can comprise any number of modules or packs, e.g., at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50 or more packs. In some examples, the core also comprises mechanical, electrical, and thermal systems that allow the core to efficiently store and return electrical energy in a controlled manner. In some examples, a core comprises at least about 12 packs. In some examples, a core is capable of storing at least about 25 kilo-Watt-hours of energy and/or delivering at least about 6.25 kilo-Watts of power. In some examples, a core comprises at least about 36 packs. In some examples, a core is capable of storing at least about 200 kilo-Watt-hours of energy and/or delivering at least about 40, 50, 60, 70, 80, 90, 100, 200, 500, 1000, or more kilo-Watts or more of power.

A core enclosure (CE) can comprise a plurality of cores that are attached through different electrical connections (e.g., in series and/or parallel). A CE can comprise any number of cores, e.g., at least about 1, 2, 3, 4, 5, 6, 7, 8, 9, 10, 11, 12, 13, 14, 15, 16, 17, 18, 19, 20 or more cores. In some examples, the CE contains cores that are connected in parallel with appropriate by-pass electronic circuitry, thus enabling a core to be disconnected while continuing to allow the other cores to store and return energy. In some examples, a CE comprises at least 4 cores. In some examples, a CE is capable of storing at least about 100 kilo-Watt-hours of energy and/or delivering greater than or equal to about 25 kilo-Watts of power. In some examples, a CE comprises 4 cores. In some examples, a CE is capable of storing greater than or equal to about 100 kilo-Watt-hours of energy and/or delivering greater than or equal to about 25 kilo-Watts of power. In some examples, a CE is capable of storing greater than or equal to about 400 kilo-Watt-hours of energy and/or delivering at least about 80 kilo-Watts, e.g., greater than or equal to about 80, 100, 120, 140, 160, 180, 200, 250, 300, 500, 1000 or more kilo-Watts or more of power.

A system can comprise a plurality of cores or CEs that are attached through different electrical connections (e.g., in series and/or parallel). A system can comprise any number of cores or CEs, e.g., at least about 2, 3, 4, 5, 6, 7, 8, 9, 10, 11, 12, 13, 14, 15, 16, 17, 18, 19, 20 or more cores. In some examples, a system comprises 20 CEs. In some examples, a system is capable of storing greater than or equal to about 2 mega-Watt-hours of energy and/or delivering at least about 400 kilo-Watts (e.g., about or at least about 500 kilo-Watts or 1000 kilo-Watts) of power. In some examples, a system comprises 5 CEs. In some examples, a system is capable of storing greater than or equal to about 2 mega-Watt-hours of energy and/or delivering at least about 400 kilo-Watts, e.g., at least about 400, 500, 600, 700, 800, 900, 1,000, 1,200, 1,500, 2,000, 2,500, 3,000 or 5,000 kilo-Watts or more of power.

A group of cells (e.g., a core, a CE, a system, etc.) with a given energy capacity and power capacity (e.g., a CE or a system capable of storing a given amount of energy) may be configured to deliver at least about 10%, 20%, 30%, 40%, 50%, 60%, 70%, 80%, 90% or 95%, or about 100% of a given (e.g., rated) power level. For example, a 1000 kW system may be capable of also operating at 500 kW, but a 500 kW system may not be able to operate at 1000 kW. In some examples, a system with a given energy capacity and power capacity (e.g., a CE or a system capable of storing a given amount of energy) may be configured to deliver less than about 100%, 110%, 125%, 150%, 175% or 200% of a given (e.g., rated) power level, and the like. For example, the system may be configured to provide more than its rated power capacity for a period of time that is less than the time it may take to consume its energy capacity at the power level that is being provided (e.g., provide power that is greater than the rated power of the system for a period of time corresponding to less than about 1%, 10% or 50% of its rated energy capacity).

A battery can comprise one or more electrochemical cells connected in series and/or parallel. A battery can comprise any number of electrochemical cells, modules, packs, cores, CEs or systems. A battery may undergo at least one charge/discharge or discharge/charge cycle ("cycle").

A battery can comprise one or more (e.g., a plurality of) electrochemical cells. The cell(s) can include housings. Individual cells can be electrically coupled to one another in series and/or in parallel. In series connectivity, the positive terminal of a first cell is connected to a negative terminal of a second cell. In parallel connectivity, the positive terminal of a first cell can be connected to a positive terminal of a second, and/or additional, cell(s). Similarly, cell modules, packs, cores, CEs and systems can be connected in series and/or in parallel in the same manner as described for cells.

Reference will now be made to the figures, wherein like numerals refer to like parts throughout. It will be appreciated that the figures and features therein are not necessarily drawn to scale.

With reference to FIG. 1, an electrochemical cell (A) is a unit comprising an anode and a cathode. The cell may comprise an electrolyte and be sealed in a housing as described herein. In some examples, the electrochemical cells can be stacked (B) to form a battery (i.e., a compilation of one or more electrochemical cells). The cells can be arranged in parallel, in series, or both in parallel and in series (C). Further, as described in greater detail elsewhere herein, the cells can be arranged in groups (e.g., modules, packs, cores, CEs, systems, or any other group comprising one or more electrochemical cells). In some examples, such groups of electrochemical cells may allow a given number of cells to be controlled or regulated together at the group level (e.g., in concert with or instead of regulation/control of individual cells).

Electrochemical cells of the disclosure (e.g., Type 1 cell operated in Type 2 mode, Type 1 cell operated in Type 1 mode, or Type 2 cell) may be capable of storing, receiving input of ("taking in") and/or discharging a suitably large amount of energy (e.g., substantially large amounts of energy). In some instances, a cell is capable of storing, taking in and/or discharging greater than or equal to about 1 watt-hour (Wh), 5 Wh, 25 Wh, 50 Wh, 100 Wh, 250 Wh, 500 Wh, 1 kilo-Watt-hour (kWh), 1.5 kWh, 2 kWh, 3 kWh, 5 kWh, 10 kWh, 15 kWh, 20 kWh, 30 kWh, 40 kWh or 50 kWh. It is recognized that the amount of energy stored in an electrochemical cell and/or battery may be less than the amount of energy taken into the electrochemical cell and/or battery (e.g., due to inefficiencies and losses). A cell can have such energy storage capacities upon operating at any of the current densities herein.

A cell can be capable of providing a current at a current density of at least about 10 milli-amperes per square centimeter ($mA/cm^2$), 20 $mA/cm^2$, 30 $mA/cm^2$, 40 $mA/cm^2$, 50 $mA/cm^2$, 60 $mA/cm^2$, 70 $mA/cm^2$, 80 $mA/cm^2$, 90 $mA/cm^2$, 100 $mA/cm^2$, 200 $mA/cm^2$, 300 $mA/cm^2$, 400 $mA/cm^2$, 500 $mA/cm^2$, 600 $mA/cm^2$, 700 $mA/cm^2$, 800 $mA/cm^2$, 900 $mA/cm^2$, 1 $A/cm^2$, 2 $A/cm^2$, 3 $A/cm^2$, 4 $A/cm^2$, 5 $A/cm^2$ or 10 $A/cm^2$, where the current density is determined based on the effective cross-sectional area of the electrolyte and where the cross-sectional area is the area that is orthogonal to the net flow direction of ions through the electrolyte during charge or discharging processes. In some instances, a cell can be capable of operating at a direct current (DC) efficiency of at least about 10%, 20%, 30%, 35%, 40%, 45%, 50%, 55%, 60%, 65%, 70%, 75%, 80%, 90%, 95%, and the like. In some instances, a cell can be capable of operating at a charge efficiency (e.g., Coulombic charge efficiency) of at least about 10%, 20%, 30%, 40%, 50%, 60%, 70%, 80%, 85%, 90%, 95%, 98%, 99%, 99.5%, 99.9%, 99.95%, 99.99%, and the like.

In a charged state, electrochemical cells of the disclosure (e.g., Type 1 cell operated in Type 2 mode, Type 1 cell operated in Type 1 mode, or Type 2 cell) can have (or can operate at) a voltage of at least about 0 V, 0.1 V, 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V or 3.0 V. In some examples, a cell can have an open circuit voltage (OCV) of at least about 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V or 3.0 V. In an example, a cell has an open circuit voltage greater than about 0.5 V, 1 V, 2 V or 3 V. In some examples, a charge cutoff voltage (CCV) of a cell is from greater than or equal to about 0.5 V to 1.5 V, 1 V to 3 V, 1.5 V to 2.5 V, 1.5 V to 3 V or 2 V to 3 V in a charged state. In some examples, a charge cutoff voltage (CCV) of a cell is at least about 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V or 3.0 V. In some examples, a voltage of a cell (e.g., operating voltage) is between about 0.5 V and 1.5 V, 1 V and 2 V, 1 V and 2.5 V, 1.5 V and 2.0 V, 1 V and 3 V, 1.5 V and 2.5 V, 1.5 V and 3 V or 2 V and 3 V in a charged state. A cell can provide such voltage(s) (e.g., voltage, OCV and/or CCV) upon operating at up to and exceeding about 10 cycles, 20 cycles, 30 cycles, 40 cycles, 50 cycles, 100 cycles, 200 cycles, 300 cycles, 400 cycles, 500 cycles, 600 cycles, 700 cycles, 800 cycles, 900 cycles, 1,000 cycles, 2,000 cycles, 3,000 cycles, 4,000 cycles, 5,000 cycles, 10,000 cycles, 20,000 cycles, 50,000 cycles, 100,000 cycles or 1,000,000 or more cycles (also "charge/discharge cycles" herein).

In some examples, the limiting factor on the number of cycles may be dependent on, for example, the housing and/or the seal as opposed to the chemistry of the negative electrode, electrolyte and/or the positive electrode. The limit in cycles may be dictated not by the electrochemistry, but by the degradation of non-active components of the cell, such as the container or seal. A cell can be operated without a substantial decrease in capacity. The operating lifetime of a cell can be limited, in some cases, by the life of the container, seal and/or cap of the cell. During operation at an operating temperature of the cell, the cell can have a negative electrode, electrolyte and positive electrode in a liquid (or molten) state.

An electrochemical cell of the present disclosure can have a response time of any suitable value (e.g., suitable for responding to disturbances in the power grid). In some instances, the response time is less than or equal to about 100 milliseconds (ms), 50 ms, 10 ms, 1 ms, and the like. In some examples, the response time is at most about 100 ms, 50 ms, 10 ms, 1 ms, and the like.

A cell can be hermetically or non-hermetically sealed. Further, in a group of cells (e.g., a battery), each of the cells can be hermetically or non-hermetically sealed. If the cells are not hermetically sealed, the group of cells or battery (e.g., several cells in series or parallel) can be hermetically sealed.

The seal may be made hermetic by one or more methods. For example, the seal may be subject to relatively high compressive forces (e.g., greater than about 1,000 psi or 10,000 psi) between the container lid and the container in order to provide a seal in addition to electrical isolation. Alternatively, the seal may be bonded through a weld, a braze, or other chemically adhesive material that joins relevant cell components to the insulating sealant material.

In an example, a cell housing comprises an electrically conductive container, a container aperture and a conductor in electrical communication with a current collector. The conductor may pass through the container aperture and can be electrically isolated from the electrically conductive container. The housing may be capable of hermetically sealing a cell which is capable of storing at least about 10 Wh of energy.

Figure 2:
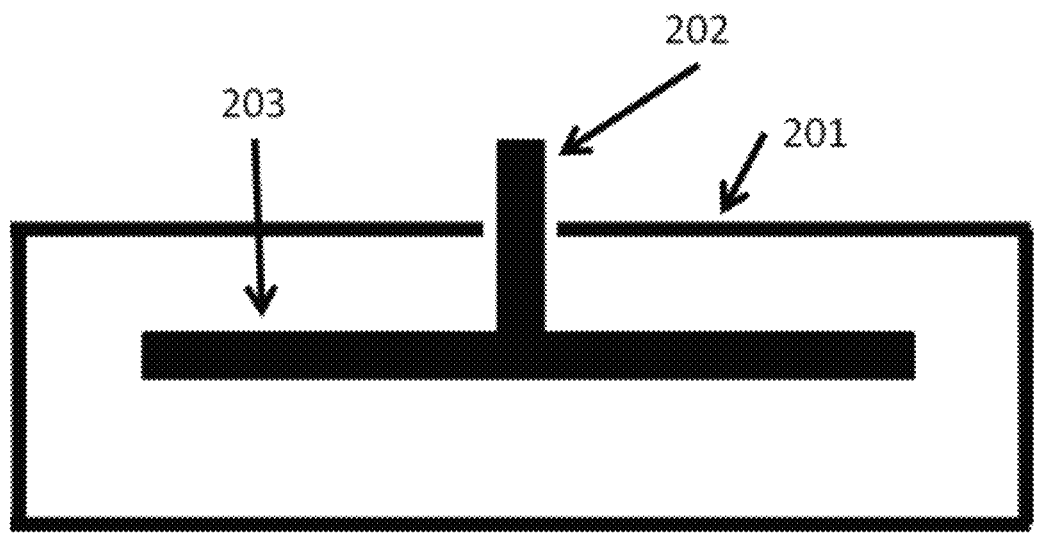
FIG. 2 is a schematic cross-sectional illustration of a housing having a conductor in electrical communication with a current collector pass through an aperture in the housing.

FIG. 2 schematically illustrates a battery that comprises an electrically conductive housing 201 and a conductor 202 in electrical communication with a current collector 203. The battery of FIG. 2 can be a cell of an energy storage device. The conductor can be electrically isolated from the housing and can protrude through the housing through an aperture in the housing such that the conductor of a first cell is in electrical communication with the housing of a second cell when the first and second cells are stacked.

In some examples, a cell comprises a negative current collector, a negative electrode, an electrolyte, a positive electrode and a positive current collector. The negative electrode can be part of the negative current collector. As an alternative, the negative electrode is separate from, but otherwise kept in electronic communication with, the negative current collector. The positive electrode can be part of the positive current collector. As an alternative, the positive electrode can be separate from, but otherwise kept in electronic communication with, the positive current collector.

A cell can comprise an electronically conductive housing and a conductor in electronic communication with a current collector. The conductor protrudes through the housing through an aperture in the housing and may be electronically isolated from the housing.

A cell housing may comprise an electrically conductive container and a conductor in electrical communication with a current collector. The conductor may protrude through the housing and/or container through an aperture in the container and may be electrically isolated from the container. The conductor of a first housing may contact the container of a second housing when the first and second housings are stacked.

In some instances, the area of the aperture through which the conductor protrudes from the housing and/or container is small relative to the area of the housing and/or container. The ratio of the area of the aperture to the area of the container and/or housing may be less than or equal to about 0.5, 0.4, 0.3, 0.2, 0.15, 0.1, 0.05, 0.01, 0.005 or 0.001 (e.g., less than about 0.1).

The housing can be capable of enclosing a cell that is capable of storing, taking in and/or discharging any suitable amount of energy, as described in greater detail elsewhere herein. For example, the housing can be capable of enclosing a cell that is capable of storing, taking in and/or discharging less than about 100 Wh, equal to about 100 Wh, more than about 100 Wh or at least about 10 Wh or 25 Wh of energy.

Features and Properties of Seals

The seal can be an important part of a high temperature system containing reactive metals (e.g., a liquid metal battery). Provided herein is a method for choosing materials suitable for forming a seal and methods for designing a suitable seal for a system containing reactive liquid metals or liquid metal vapors and/or reactive molten salt(s) or reactive molten salt vapors such as, for example, a liquid metal battery (e.g., based on the selection of these materials, and considerations of thermal, mechanical and electrical properties). The seal can also be used as part of an electrically isolated feed-through connected to a vessel comprising reactive liquid metals or reactive metal vapors for applications other than energy storage, such as fusion reactors comprising molten or high pressure Li vapor, or other applications that involve liquid sodium, potassium, magnesium, calcium, and/or lithium. The use of stable ceramic and electronically conductive materials can also be appropriate for applications with reactive gases such as those used in semiconductor material processing or device fabrication.

The seal can be electrically insulating and gas-tight (e.g., hermetic). The seals can be made of materials that are not attacked by the liquid and vapor phases of system/vessel components (e.g., cell components), such as, for example, molten sodium (Na), molten potassium (K), molten magnesium (Mg), molten calcium (Ca), molten lithium (Li), Na vapor, K vapor, Mg vapor, Ca vapor, Li vapor, or any combination thereof. The method identifies a seal comprising an aluminum nitride (AlN) or silicon nitride ($Si_3N_4$) ceramic and an active alloy braze (e.g., Ti, Fe, Ni, B, Si or Zr alloy-based) as being thermodynamically stable with most reactive metal vapors, thus allowing for the design of a seal that is not appreciably attacked by metal or metal vapors.

In some implementations, the seal can physically separate the current lead (e.g., a negative current collector, such as a metal rod that extends into the cell cavity) from the oppositely polarized (e.g., positive polarized) cell body (e.g., the cell (also "container" herein) and lid). The seal can act as an electrical insulator between these cell components, and hermetically isolate the active cell components (e.g., the liquid metal electrodes, the liquid electrolyte, and vapors of these liquids). In some examples, the seal prevents external elements from entering the cell (e.g., moisture, oxygen, nitrogen, and other contaminants that may negatively affect the performance of the cell). Some examples of general seal specifications are listed in TABLE 1. Such specifications (e.g., properties and/or metrics) can include, but are not limited to, hermeticity, electrical insulation, durability, Coulombic efficiency (e.g., charge efficiency or round-trip efficiency), DC-DC efficiency, discharge time, and capacity fade rate.

TABLE 1

EXAMPLES OF GENERAL SEAL SPECIFICATIONS

| Specification | Example value |
|---|---|
| The seal can have these properties under operating conditions: | |
| Hermetic | <1 × 10$^{-8}$ atm cc/s He total leak rate |
| Electrically insulating | >1 kOhm impedance across seal |
| Durable | maintain integrity for >20 years |
| Battery metrics: | |
| Coulombic efficiency | >98% (@ ~200 mA/cm$^2$) |
| DC-DC efficiency | >70% (@ ~200 mA/cm$^2$) |
| Discharge time | 4-6 hours (@ ~200 mA/cm$^2$) |
| Capacity fade rate | <0.02%/cycle |

The seal can be hermetic, for example, to a degree quantified by a leak rate of helium (He) (e.g., leak rate from a device at operating conditions (e.g., at operating temperature, operating pressure, etc.) filled with He). In some examples, the leak rate of helium (He) can be less than about $1\times10^{-6}$ atmospheric cubic centimeters per second (atm cc/s), $5\times10^{-7}$ atm cc/s, $1\times10^{-7}$ atm cc/s, $5\times10^{-8}$ atm cc/s or $1\times10^{-8}$ atm cc/s. In some examples, the leak rate of He is equivalent to the total leak rate of He leaving the system (e.g., cell, seal). In some examples, the leak rate of He is the equivalent total He leak rate if one atmosphere of He pressure was placed across the sealed interface, as determined from the actual pressure/concentration differential of He across the sealed interface and the measured He leak rate.

The seal can provide any suitably low helium leak rate. In some examples, the seal provides a helium leak rate of no more than or equal to about $1\times10^{-10}$, $1\times10^{-9}$, $1\times10^{-8}$, $1\times10^{-7}$, $5\times10^{-7}$, $1\times10^{-6}$, $5\times10^{-6}$, $1\times10^{-5}$ or $5\times10^{-5}$ atmosphere-cubic centimeters per second (atm-cc/s) at a temperature (e.g., a storage temperature of the cell, an operating temperature of the cell, and/or a temperature of the seal) of greater than or equal to about −25° C., 0° C., 25° C., 50° C., 200° C., 350° C., 450° C., 550° C. or 750° C. The seal can provide such helium leak rates when the electrochemical cell has been operated (e.g., at rated capacity) for a period of, for example, at least about 1 hour, 12 hours, 1 day, 2 days, 3 days, 4 days, 5 days, 1 week, 2 weeks, 3 weeks, 1 month, 6 months, 1 year, 2 years, 5 years, 10 years, 20 years or more. In some examples, the seal provides such helium leak rates when the electrochemical cell has been operated for at least about 350 charge/discharge cycles (or cycles), 500 cycles, 1,000 cycles, 3,000 cycles, 10,000 cycles, 50,000 cycles, 75,000 cycles or 150,000 cycles.

In an example, the seal is substantially unreactive to air and prevents diffusion of air into the container when a reactive material is maintained at a temperature of at least about 200° C., 250° C., 300° C., 350° C., 400° C., 450° C., 500° C., or greater. The seal may prevent diffusion of air into the container for at least about 1 hour, 12 hours, 1 day, 2 days, 3 days, 4 days, 5 days, 1 week, 2 weeks, 3 weeks, 1 month, 6 months, 1 year, 2 years, 5 years, 10 years, 20 years or more. The diffusion of air into the container may be at most about $1\times10^{-4}$, $1\times10^{-5}$, $1\times10^{-6}$, $1\times10^{-7}$, $1\times10^{-8}$, $1\times10^{-9}$, $1\times10^{-10}$, or less atmosphere-cubic centimeters per second.

The seal can electrically isolate the conductor from the electrically conductive housing. The degree of electrical isolation can be quantified by measuring the impedance across the seal. In some examples, the impedance across the seal is greater than or equal to about 0.05 kilo-Ohms (kOhm), 0.1 kOhm, 0.5 kOhm, 1 kOhm, 1.5 kOhm, 2 kOhm, 3 kOhm, 5 kOhm, 10 kOhm, 50 kOhm, 100 kOhm, 500 kOhm, 1,000 kOhm, 5,000 kOhm, 10,000 kOhm, 50,000 kOhm, 100,000 kOhm or 1,000,000 kOhm at any operating, resting, or storing temperature. In some examples, the impedance across the seal is less than about 0.1 kOhm, 1 kOhm, 5 kOhm, 10 kOhm, 50 kOhm, 100 kOhm, 500 kOhm, 1,000 kOhm, 5,000 kOhm, 10,000 kOhm, 50,000 kOhm, 100,000 kOhm or 1,000,000 kOhm at any operating, resting, or storing temperature. The seal can provide electrical isolation when the electrochemical cell has been operated (e.g., at rated capacity) for a period of, for example, at least about 1 month, 6 months, 1 year or more. In some examples, the seal provides the electrical isolation when the electrochemical cell has been operated for at least about 350 charge/discharge cycles (or cycles), 500 cycles, 1,000 cycles, 3,000 cycles, 10,000 cycles, 50,000 cycles, 75,000 cycles or 150,000 cycles. The seal can provide electrical isolation when the electrochemical cell has been operated for a period of at least about 1 year, 5 years, 10 years, 20 years, 50 years or 100 years. In some examples, the seal provides the electrical isolation when the electrochemical cell has been operated for greater than or equal to about 350 charge/discharge cycles.

The seal can be durable. In some examples, the seal can maintain integrity for at least about 1 month, 2 months, 6 months, 1 year, 2 years, 5 years, 10 years, 15 years, 20 years or more. The seal can have such properties and/or metrics under operating conditions.

In some examples, a battery or device comprising the seal can have a Coulombic efficiency (e.g., measured at a current density of about 20 mA/cm$^2$, 200 mA/cm$^2$ or 2,000 mA/cm$^2$) of at least about 50%, 55%, 60%, 65%, 70%, 75%, 80%, 85%, 90%, 95%, 96%, 97%, 98%, 99%, 99.5%, 99.8%, 99.9% or more. In some examples, a battery or device comprising the seal can have a DC-DC efficiency (e.g., measured at a current density of about 200 mA/cm$^2$ or 220 mA/cm$^2$) of at least about 50%, 55%, 60%, 65%, 70%, 75%, 80%, 85%, 90%, 95% or more. In some examples, a battery or device comprising the seal can have a discharge time (e.g., measured at a current density of about 200 mA/cm$^2$ or 220 mA/cm$^2$) of at least about 1 hour, 2 hours, 3 hours, 4 hours, 5 hours, 6 hours, 7 hours, 8 hours, 9 hours, 10 hours or more. In some examples, a battery or device comprising the seal can have a discharge time (e.g., measured at a current density of about 200 mA/cm$^2$ or 220 mA/cm$^2$) between about 4 hours and 6 hours, 2 hours and 6 hours, 4 hours and 8 hours or 1 hour and 10 hours. In some examples, a battery or device comprising the seal can have a capacity fade rate (e.g., discharge capacity fade rate) of less than about 10%/cycle, 5%/cycle, 1%/cycle, 0.5%/cycle, 0.1%/cycle, 0.08%/cycle, 0.06%/cycle, 0.04%/cycle, 0.02%/cycle, 0.01%/cycle, 0.005%/cycle, 0.001%/cycle, 0.0005%/cycle, 0.0002%/cycle, 0.0001%/cycle, 0.00001%/cycle or less. The capacity fade rate can provide a measure of the change (decrease) in discharge capacity in '% per cycle' (e.g., in % per charge/discharge cycle).

In some examples, the seal allows the electrochemical cell to achieve on one or more given operating conditions (e.g., operating temperature, temperature cycling, voltage, current, internal atmosphere, internal pressure, vibration, etc.). Some examples of operating conditions are described in TABLE 2. Such operating conditions can include, but are not limited to, metrics such as, for example, operating temperature, idle temperature, temperature cycling, voltage, current, internal atmosphere, external atmosphere, internal pressure, vibration, and lifetime.

TABLE 2

EXAMPLES OF OPERATING CONDITIONS FOR CELLS

| Item | Example description | Example metrics |
|---|---|---|
| Operating temperature | The normal temperature experienced by the seal during operation. | 400° C. to 550° C. |
| Idle temperature | The temperature experienced by the seal while battery is idle (e.g., in manufacturing, during transport, battery in off-mode). | −25° C. to 50° C. |
| Temperature cycling | The seal can experience infrequent but large amplitude thermal cycles over the course of battery operating lifetime. | −25° C. to 700° C. with at least about 10 thermal cycles |
| Voltage | The voltage drop across the seal. | 0 V to 3 V |
| Current | The electric current flowing through materials that interface with the seal. | 0 A to 500 A |
| Internal atmosphere | The seal is exposed to vapors of reactive alkali metals or reactive alkaline earth metals and halide salts from within the battery. | 0.133 Pa or 0.001 torr vapor pressure of alkali metals or alkaline earth metals and halide salts |
| External atmosphere | The atmosphere that the seal is exposed to from the externals of the battery, e.g., ambient air, high moisture. | Air at 0° C. to 550° C. accompanied by 100% relative humidity |
| Internal pressure | Vacuum gradient or positive pressure across the seal. | 0.5 atm to 4.0 atm |
| Vibration | The seal can be exposed to vibrations caused during manufacturing, transportation, installation, operation, and rare events (e.g., drops, shock impact). | Capable of handling vibrational loading analogous to transportation when used in cell or system application. |
| Lifetime | The expected lifetime of a seal in full operation. | 20 year life with <1% failure |

In some examples, an operating temperature (e.g., temperature experienced by the seal during operation) is at least about 100° C., 200° C., 300° C., 400° C., 500° C., 600° C., 700° C., 800° C., 900° C. or more. In some examples, the temperature experienced by the seal during operation is between about 440° C. and 550° C., 475° C. and 550° C., 350° C. and 600° C. or 250° C. and 650° C. In an example, an operating temperature of about 400° C. to about 500° C., about 450° C. to about 550° C., about 450° C. to about 500° C. or about 500° C. to about 600° C., or an operating temperature of at least about 200° C. (e.g., suitable for cell chemistries that can operate as low as 200° C.) can be achieved. In some examples, the temperature experienced by the seal may be about equal to the operating temperature of the electrochemical cell or high temperature device (e.g., energy storage device). In some examples, the temperature experienced by the seal may differ from the operating temperature of the electrochemical cell or high temperature device (e.g., by at least, less than or equal to about 1° C., 5° C., 10° C., 20° C., 50° C., 100° C., 150° C., 200° C., and the like). In an example, an electrochemical cell comprises a reactive material maintained at a temperature (e.g., operating temperature of the cell) of at least about 200° C., and the temperature of the seal is at least about 200° C. (e.g., the same as the operating temperature of the cell, or different than the operating temperature of the cell). In some examples, the operating temperature of the seal can be lower or higher than the operating temperature of the electrochemical cell or high temperature device.

The chemical stability of the materials (e.g., cell lid assembly materials, adhesive seal material(s), etc.) can be considered (e.g., to ensure the durability of the seal during all possible temperatures that the system may reach). The seal may be exposed to one or more different atmospheres, including the cell internals (internal atmosphere) and open air (external atmosphere). For example, the seal can be exposed to typical air constituents including moisture, as well as to potentially corrosive active materials in the cell. In some implementations, a hermetic seal is provided. A hermetically sealed battery or battery housing can prevent an unsuitable amount of air, oxygen, nitrogen, and/or water from leaking or otherwise entering into the battery. A hermetically sealed battery or battery housing can prevent an unsuitable amount of one or more gases surrounding the battery (e.g., air or any component(s) thereof, or another type of surrounding atmosphere or any component(s) thereof) from leaking or otherwise entering into the battery. In some examples, a hermetically sealed cell or cell housing can prevent gas or metal/salt vapors (e.g., helium, argon, negative electrode vapors, electrolyte vapors) from leaking from the cell.

A hermetically sealed battery or battery housing may prevent an unsuitable amount of air, oxygen, nitrogen, and/or water into the battery (e.g., an amount such that the battery maintains at least about 80% of its energy storage capacity and/or maintains a round-trip Coulombic efficiency of at least about 90% per cycle when charged and discharged at least about 100 mA/cm$^2$ for at least about one year, 2 years, 5 years, 10 years or 20 years). In some instances, the rate of oxygen, nitrogen, and/or water vapor transfer into the battery is less than about 0.25 milli-liter (mL) per hour, 0.02 mL per hour, 0.002 mL per hour or 0.0002 mL per hour when the battery is contacted with air at a pressure that is at least about (or less than about) 0 atmospheres (atm), 0.1 atm, 0.2 atm, 0.3 atm, 0.4 atm, 0.5 atm, 0.6 atm, 0.7 atm, 0.8 atm, 0.9 atm or 0.99 atm higher than, or at least about (or less than about) 0.1 atm, 0.2 atm, 0.5 atm or 1 atm lower than the pressure inside the battery and a temperature of between about 400° C. and 700° C. In some instances, the rate of metal vapor, molten salt vapor, or inert gas transfer out of the battery is less than about 0.25 mL per hour, 0.02 mL per hour, 0.002 mL per hour or 0.0002 mL per hour when the battery is contacted with air at a pressure of greater than or equal to about 0.5 atm, 1 atm, 1.5 atm, 2 atm, 2.5 atm, 3 atm, 3.5 atm or 4 atm less than the pressure inside the battery and a temperature between about 400° C. and 700° C. In some examples, the number of moles of oxygen, nitrogen, or water vapor that leaks into the cell over a given period (e.g., at least about a 1 month period, 6 month period, 1 year period, 2 year period, 5 year period, 10 year period or more) is less than about 10%, 5%, 3%, 1%, 0.5%, 0.1%, 0.05% or 0.5% of the number of moles of active material (e.g., active metal material) in the cell.

The seal can meet one or more specifications, including, but not limited to: electrically insulating and hermetic, ability to function at operating temperature for duration of lifespan, thermal cycle-ability, sufficiently high electrical conductivity of the conductor (e.g., negative current lead), configuration that does not excessively protrude from cell body, inner surface chemically stable with liquids and vapors of active components, outer surface stable in air, ability to avoid arcing under high potentials, etc.

Materials, Chemical Compatibility, and Coefficients of Thermal Expansion

Materials and features of seals herein may be configured to achieve suitable materials (e.g., chemical, mechanical, thermal) compatibility. Materials compatibility may include, for example, suitable matching of coefficients of thermal expansion (CTEs), suitable Young's modulus characteristics (e.g., low Young's modulus metal materials) and/or suitable ductility characteristics (e.g., one or more components with high ductility). Seals may incorporate structural features that can compensate for CTE mismatch.

Materials may be selected to achieve low CTE mismatch between various (e.g., pairs of) seal materials and/or housing (e.g., cell lid and/or body) materials. Materials may be selected to achieve low stress (e.g., stress due to CTE mismatch) at joint(s) between various (e.g., pairs of) seal materials and/or housing materials. A joint between various seal materials and/or housing materials may be of a given type (e.g., ceramic-to-metal or metal-to-metal). In an example, a ceramic material has a CTE that suitably (e.g., substantially) matches a CTE of a cell lid or body, thereby decreasing or minimizing stress(es) (e.g., stress(es) at one or more ceramic-to-metal joint(s) between the ceramic material and the cell lid or body). In some examples, a ceramic material has a CTE that is suitably (e.g., substantially) different than the CTE of the cell lid or body. In this instance, a metal collar or sleeve that is a better CTE match or has one or more other properties that reduce the ceramic-to-metal joint stress may be used. The metal collar or sleeve may move the CTE stress from the ceramic joint (e.g., from the ceramic-to-metal joint between the ceramic and the metal collar or sleeve) to the cell lid or body joint (e.g., to the metal-to-metal joint between the metal collar or sleeve and the cell lid or body). The ceramic material may have a CTE that suitably (e.g., substantially) matches a CTE of the metal collar or sleeve. The ceramic material may have a CTE that is suitably (e.g., substantially) different than the CTE of the metal collar or sleeve. The ceramic-to-metal seal joint stress(es) can be reduced, for example, by using a ductile metal collar or sleeve (e.g., comprising at least about 95% or 99% Ni) and/or by using a ductile braze material (e.g., comprising at least about 95% or 99% Ag, Cu or Ni). The ductile braze material may be used to reduce stress(es) at the ceramic-to-metal joint between the ceramic and the cell lid or body or to reduce stress(es) at the ceramic-to-metal joint between the ceramic and metal collar or sleeve.

The seal can be made of any suitable material (e.g., such that the seal forms a hermetic seal and an electrical isolation). In some examples, the seal comprises a ceramic material and a braze material. The ceramic material can have a CTE that is matched to the housing material such that the electrochemical cell maintains suitable gas-tight and/or electrically insulating properties during operation and/or start-up of the battery. The ceramic material may have a CTE that matches a CTE of the braze material and/or the cell top (e.g., lid or cap, or any component of a cell lid assembly) or body. In some examples, the CTEs of the ceramic material, braze material and cell top or body may not be identically matched, but may be sufficiently close to minimize stresses during the braze operation and subsequent thermal cycles in operation. In some examples, the CTE of the ceramic material may not be sufficiently close to the CTE of the cell top or body (e.g., in some cases resulting in an unstable and/or unreliable ceramic-to-metal joint which may lose its leak-tight property). The seal can comprise a collar (e.g., a thin metal collar) or sleeve (e.g., to overcome the CTE mismatch between a ceramic material and the cell lid or cell body). The collar or sleeve can be a metal collar or sleeve. The collar or sleeve can be brazed to the ceramic (e.g., via a braze material) and joined to the cell lid and/or the current lead that protrudes through the cell lid and into the cell cavity. A suitable collar or sleeve material and/or design may be selected in order to reduce the resulting stresses at the ceramic-to-metal joint (e.g., by reducing the CTE mismatch), increase the resulting stress at the collar or sleeve-to-cell lid or body joint (e.g., by increasing the CTE mismatch), or a combination thereof. The seal can comprise features that alleviate CTE mismatches between the ceramic and the cell lid and/or the current lead rod. Any aspects of the disclosure described in relation to the cell top or body (e.g., CTE, joint stress, configuration and/or formation, etc.) may equally apply to the cell top and body at least in some configurations. Any aspects of the disclosure described in relation to the cell top may equally apply to the cell body at least in some configurations, and vice versa.

The CTE of the metal collar or sleeve may be at least about 5 µm/m/° C., 6 µm/m/° C., 7 µm/m/° C., 8 µm/m/° C., 9 µm/m/° C., 10 µm/m/° C., 11 µm/m/° C., 12 µm/m/° C., 13 µm/m/° C., 14 µm/m/° C., 15 µm/m/° C., 16 µm/m/° C., 17 µm/m/° C., 18 µm/m/° C., 19 µm/m/° C. or 20 µm/m/° C. The CTE of the metal collar or sleeve may be less than or equal to about 20 µm/m/° C., 19 µm/m/° C., 18 µm/m/° C., 17 µm/m/° C., 16 µm/m/° C., 15 µm/m/° C., 14 µm/m/° C., 13 µm/m/° C., 12 µm/m/° C., 11 µm/m/° C., 10 µm/m/° C., 9 µm/m/° C., 8 µm/m/° C., 7 µm/m/° C., 6 µm/m/° C. or 5 µm/m/° C. In some examples, the metal collar or sleeve comprises Zr and has a CTE of less than or equal to about 7 µm/m/° C. In some examples, the metal collar or sleeve comprises Ni (e.g., at least about 95% or 99% Ni, or at least about 40% Ni and at least about 40% Fe by weight) and has a CTE of greater than or equal to about 6 µm/m/° C., 7 µm/m/° C., 8 µm/m/° C., 9 µm/m/° C., 10 µm/m/° C., 11 µm/m/° C., 12 µm/m/° C., 13 µm/m/° C., 14 µm/m/° C., 15 µm/m/° C., 16 µm/m/° C., 17 µm/m/° C., 18 µm/m/° C., 19 µm/m/° C. or 20 µm/m/° C. The metal collar or sleeve may comprise greater than or equal to about 5%, 10%, 15%, 20%, 25%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 65%, 70%, 75%, 80%, 85%, 90%, 95% or 99% Ni (e.g., by weight). The metal collar or sleeve may comprise such Ni compositions in combination with greater than or equal to about 5%, 10%, 15%, 20%, 25%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 65%, 70%, 75%, 80%, 85%, 90%, 95% or 99% Fe (e.g., by weight). Such Ni or Ni—Fe compositions (e.g., alloys) may comprise one or more other elements (e.g., C, Co, Mn, P, S, Si, Cr and/or Al) with individual concentrations or a total concentration of less than or equal to about 1%, 0.9%, 0.8%, 0.7%, 0.6%, 0.5%, 0.4%, 0.3%, 0.15%, 0.1%, 0.09%, 0.08%, 0.07%, 0.06%, 0.05%, 0.04%, 0.03%, 0.025%, 0.01% or 0.005%. In some examples, the metal collar or sleeve comprises greater than or equal to about 50.5% Ni, greater than or equal to about 48% Fe, and less than or equal to about 0.60% Mn, 0.30% Si, 0.005% C, 0.25% Cr, 0.10% Co, 0.025% P and/or 0.025% S (e.g., alloy 52). In some examples, the metal collar or sleeve comprises greater than or equal to about 41% Ni, greater than or equal to about 58% Fe, and less than or equal to about 0.05% C, 0.80% Mn, 0.40% P, 0.025% S, 0.30% Si, 0.250% Cr and/or 0.10% Al (e.g., alloy 42). In some examples, the metal collar or sleeve comprises an Fe alloy with between about 17.5% and 19.5% Cr, between about 0.10% and 0.50% Ti, between about 0.5% and 0.90% niobium, less than or equal to about 1% Ni, 1% Si, 1% Mn, 0.04% phosphorus, 0.03% nitrogen, 0.03% sulfur and/or 0.03% carbon, and a balance of Fe (e.g., 18CrCb ferritic stainless steel). Such Fe alloy (e.g., 18CrCb ferritic stainless steel) may have a CTE of about 8 ppm/K, 9 ppm/K, 10 ppm/K, 11 ppm/K or 12 ppm/K. In some examples, the metal collar or sleeve comprises an Fe alloy with between about 17.5% and 18.5% Cr, between about 0.10% and 0.60% Ti, between about 0.3% and 0.90% niobium, less than about 1% Si, 1% Mn, 0.04% phosphorus, 0.015% sulfur and/or 0.03% carbon, and a balance of Fe (e.g., grade 441 stainless steel). Such Fe alloy (e.g., 441 stainless steel) may have a CTE of about 9 ppm/K, 10 ppm/K, 11 ppm/K, 12 ppm/K, 13 ppm/K or 14 ppm/K. In some examples, the metal collar or sleeve comprises a Ni alloy with at least about 72% Ni, between about 14% and 17% Cr, between about 6% and 10% Fe, and less than about 0.15% C, 1% Mn, 0.015% S, 0.50% Si and/or 0.5% Cu (e.g., Inconel 600). Such Ni alloy (e.g., Inconel 600) may have a CTE of about 12 ppm/K, 13 ppm/K, 14 ppm/K, 15 ppm/K, 16 ppm/K or 17 ppm/K. In some examples, the metal collar or sleeve comprises a Ni alloy with less than about 0.05% C, 0.25% Mn and/or 0.002% S, less than or equal to about 0.20% Si, 15.5% Cr, 8% Fe and/or 0.1% Cu, and a balance of Ni and Co (e.g., ATI alloy 600). Such Ni alloy (e.g., ATI alloy 600) may have a CTE of about 12 ppm/K, 13 ppm/K, 14 ppm/K, 15 ppm/K, 16 ppm/K or 17 ppm/K. In some examples, the metal collar or sleeve comprises greater than or equal to about 67% Ni, less than about 2% Co, 0.02% C, 0.015% B, 0.35% Cu, 1.0% W, 0.020% P and/or 0.015% S, between about 14.5% and 17% Cr, between about 14% and 16.5% Mo, between about 0.2% and 0.75% Si, between about 0.30% and 1.0% Mn, between about 0.10% and 0.50% Al, between about 0.01% and 0.10% La, and less than or equal to about 3% Fe (e.g., Hastelloy S). Such alloy (e.g., Hastelloy S) may have a CTE of about 12 ppm/K, 13 ppm/K, 14 ppm/K, 15 ppm/K, 16 ppm/K or 17 ppm/K. The metal collar or sleeve may have the aforementioned CTE values for a temperature range of, for example, between about 25° C. and 400° C., 20° C. and 500° C., 25° C. and 500° C., 25° C. and 600° C., 25° C. and 900° C., or 25° C. and 1000° C.

The seal may comprise one or more braze materials (e.g., same or different braze materials at different joints when using a metal collar or sleeve, or one braze material when the joining the ceramic material directly to the cell lid or body). The CTE of a braze material may be at least about 3 microns per meter per degree Celsius ($\mu m/m/°$ C.), 4 $\mu m/m/°$ C., 5 $\mu m/m/°$ C., 6 $\mu m/m/°$ C., 7 $\mu m/m/°$ C., 8 $\mu m/m/°$ C., 9 $\mu m/m/°$ C., 10 $\mu m/m/°$ C., 11 $\mu m/m/°$ C., 12 $\mu m/m/°$ C., 13 $\mu m/m/°$ C., 14 $\mu m/m/°$ C., 15 $\mu m/m/°$ C., 16 $\mu m/m/°$ C., 17 $\mu m/m/°$ C., 18 $\mu m/m/°$ C., 19 $\mu m/m/°$ C. or 20 $\mu m/m/°$ C. The CTE of the braze material may be less than or equal to about 3 microns per meter per degree Celsius ($\mu m/m/°$ C.), 4 $\mu m/m/°$ C., 5 $\mu m/m/°$ C., 6 $\mu m/m/°$ C., 7 $\mu m/m/°$ C., 8 $\mu m/m/°$ C., 9 $\mu m/m/°$ C., 10 $\mu m/m/°$ C., 11 $\mu m/m/°$ C., 12 $\mu m/m/°$ C., 13 $\mu m/m/°$ C., 14 $\mu m/m/°$ C., 15 $\mu m/m/°$ C., 16 $\mu m/m/°$ C., 17 $\mu m/m/°$ C., 18 $\mu m/m/°$ C., 19 $\mu m/m/°$ C. or 20 $\mu m/m/°$ C. The braze material may have such CTE values for a temperature range of, for example, between about 25° C. and 400° C., 20° C. and 500° C., 25° C. and 500° C., 25° C. and 600° C., 25° C. and 900° C., or 25° C. and 1000° C.

The stress(es) at the ceramic-to-metal joint may be reduced by using a braze material that is suitably (e.g., sufficiently) ductile. A ductile braze material may comprise silver (Ag), copper (Cu) and/or nickel (Ni). The braze material may comprise, for example, at least about 95% or 99% Ag (e.g., by weight), at least about 95% or 99% Cu (e.g., by weight) or at least about 95% or 99% Ni (e.g., by weight). The braze material may comprise any suitably ductile braze material described herein. The ductile braze material may have a yield strength of less than or equal to about 10 MPa, 20 MPa, 30 MPa, 40 MPa, 50 MPa, 60 MPa, 70 MPa, 80 MPa, 90 MPa, 100 MPa, 150 MPa, 200 MPa, 250 MPa, 300 MPa, 350 MPa, 400 MPa, 450 MPa, 500 MPa, 600 MPa, 700 MPa, 800 MPa, 900 MPa or 1000 MPa. The braze material may have such yield strengths at a temperature of, for example, greater than or equal to about 25° C., 400° C., 500° C., 600° C., 700° C., 800° C., 900° C., 1000° C. or 1100° C. In some examples, braze materials may be coated (e.g., Ni coated).

The seal may comprise one or more metallization materials (e.g., metallization powders). The CTE of a metallization material (e.g., after the metallization layer is formed) may be at least about 3 $\mu m/m/°$ C., 4 $\mu m/m/°$ C., 5 $\mu m/m/°$ C., 6 $\mu m/m/°$ C., 7 $\mu m/m/°$ C., 8 $\mu m/m/°$ C., 9 $\mu m/m/°$ C., 10 $\mu m/m/°$ C., 11 $\mu m/m/°$ C., 12 $\mu m/m/°$ C., 13 $\mu m/m/°$ C., 14 $\mu m/m/°$ C., 15 $\mu m/m/°$ C., 16 $\mu m/m/°$ C., 17 $\mu m/m/°$ C., 18 $\mu m/m/°$ C., 19 $\mu m/m/°$ C. or 20 $\mu m/m/°$ C. The CTE of the metallization material (e.g., after the metallization layer is formed) may be less than or equal to about 3 microns per meter per degree Celsius ($\mu m/m/°$ C.), 4 $\mu m/m/°$ C., 5 $\mu m/m/°$ C., 6 $\mu m/m/°$ C., 7 $\mu m/m/°$ C., 8 $\mu m/m/°$ C., 9 $\mu m/m/°$ C., 10 $\mu m/m/°$ C., 11 $\mu m/m/°$ C., 12 $\mu m/m/°$ C., 13 $\mu m/m/°$ C., 14 $\mu m/m/°$ C., 15 $\mu m/m/°$ C., 16 $\mu m/m/°$ C., 17 $\mu m/m/°$ C., 18 $\mu m/m/°$ C., 19 $\mu m/m/°$ C. or 20 $\mu m/m/°$ C. The metallization material may have such CTE values for a temperature range of, for example, between about 25° C. and 400° C., 20° C. and 500° C., 25° C. and 500° C., 25° C. and 600° C., 25° C. and 900° C., or 25° C. and 1000° C. The Young's modulus of a metallization material may be less than about 50 giga-Pascals (GPa), 75 GPa, 100 GPa, 150 GPa or 500 GPa. The metallization material may have such Young's modulus values for a temperature of, for example, 25° C., 300° C., 400° C., 500° C., 600° C., 900° C., or 1000° C. The metallization material may be chemically stable in air and/or when exposed to reactive materials in the device at a temperature of greater than or equal to about 200° C., 300° C., 400° C., 500° C., 600° C., 900° C., or 1000° C.

The seal may comprise a ceramic material and a braze material. In some examples, the ceramic material is stable (e.g., thermodynamically stable) when in contact with (e.g., does not chemically react with) one or more reactive materials (e.g., reactive liquid metals or reactive liquid metal vapors such as, for example, molten lithium, lithium vapor, or calcium metal). In some examples, the ceramic material (e.g., AlN, $Nd_2O_3$) is stable when in contact with air (or any other type of external atmosphere). In some examples, the ceramic material is stable with, is not substantially attacked by (e.g., the material may have a slight surface reaction, but does not progress into degradation or attack of the bulk of the material) and does not substantially dissolve into the molten salt. Examples of ceramic materials include, but are not limited to, aluminum nitride (AlN), beryllium nitride ($Be_3N_2$), boron nitride (BN), calcium nitride ($Ca_3N_2$), silicon nitride ($Si_3N_4$), aluminum oxide ($Al_2O_3$), beryllium oxide (BeO), calcium oxide (CaO), cerium oxide ($CeO_2$ or $Ce_2O_3$), erbium oxide ($Er_2O_3$), lanthanum oxide ($La_2O_3$), magnesium oxide (MgO), neodymium oxide ($Nd_2O_3$), samarium oxide ($Sm_2O_3$), scandium oxide ($Sc_2O_3$), ytterbium oxide ($Yb_2O_3$), yttrium oxide ($Y_2O_3$), zirconium oxide ($ZrO_2$), yttria partially stabilized zirconia (YPSZ), boron carbide ($B_4C$), silicon carbide (SiC), titanium carbide (TiC), zirconium carbide (ZrC), titanium diboride ($TiB_2$), chalcogenides, quartz, glass, or any combination thereof. The ceramic material may be electrically insulating (e.g., the ceramic material may have a resistivity greater than about $10^2$ Ohm-cm, $10^4$ Ohm-cm, $10^6$ Ohm-cm, $10^8$ Ohm-cm, $10^{10}$ Ohm-cm, $10^{12}$ Ohm-cm, $10^{14}$ Ohm-cm or $10^{16}$ Ohm-cm). The ceramic material may have a CTE that is (e.g., substantially) similar to (e.g., less than or equal to about 0.1%, 0.5%, 1%, 2%, 3%, 4%, 5%, 6%, 7%, 8%, 9%, 10%, 15%, 20%, 25%, 30%, 35%, 40%, 45% or 50% different than) a CTE of stainless steel (e.g., grade 430 stainless steel, 441 stainless steel or 18CrCb ferritic stainless steel) or nickel alloy (e.g., an alloy comprising greater than or equal to about 50% Ni and greater than or equal to about 48% Fe, such as, for example, alloy 52).

In some examples, the braze material comprises one or more braze constituents such that at least one braze constituent has low solubility in the reactive material, the reactive material has low solubility in at least one braze constituent, at least one braze constituent does not react (e.g., form intermetallic alloys with) the reactive material at the operating temperature of the device, and/or the braze material melts above the operating temperature of the device. The reactive material can be, for example, a reactive metal. In some examples, the braze material comprises at least one braze constituent that has low solubility in the reactive metal. In some examples, the reactive metal has low solubility in the braze constituent. In some examples, the braze constituent does not form intermetallic alloys with the reactive metal at the operating temperature of the device. In some examples, the braze constituent and/or braze material melts above the operating temperature of the device. In some examples, the braze constituent(s) may include Ti, Ni, Y, Re, Cr, Zr, and/or Fe and the reactive metal may include lithium (Li) and/or calcium (Ca).

Examples of braze constituent materials include, but are not limited to, aluminum (Al), beryllium (Be), copper (Cu), chromium (Cr), iron (Fe), manganese (Mn), molybdenum (Mo), nickel (Ni), niobium (Nb), rubidium (Rb), scandium (Sc), silver (Ag), tantalum (Ta), rhenium (Re), titanium (Ti), vanadium (V), yttrium (Y), zirconium (Zr), phosphorus (P), boron (B), carbon (C), silicon (Si), or any combination thereof. In some instances, the ceramic material comprises aluminum nitride (AlN) and the braze material comprises titanium (Ti). In some examples, the braze material comprises a mixture of two or more materials (e.g., 3 materials). The materials may be provided in any proportion. For example, the braze can comprise 3 materials at a ratio (e.g., in weight-%, atomic-%, mol-% or volume-%) of about 30:30:40 or 40:40:20. In some examples, the braze material comprises a mixture of titanium, nickel, copper, and/or zirconium. In some instances, the braze comprises at least about 20, 30 or 40 weight-% titanium, at least about 20, 30% or 40 weight-% nickel, and at least about 20, 30, 40, 50 or 60 weight-% zirconium. In some instances, the braze comprises less than about 20, 30 or 40 weight-% titanium, less than about 20, 30% or 40 weight-% nickel, and less than about 20, 30, 40, 50 or 60 weight-% zirconium. In some instances, the braze comprises about 18% Ti, about 60% Zr, about 22% Ni (e.g., on a weight-%, atomic-%, mol-% or volume-% basis). In some instances, the braze comprises about 7% Ti, about 67% Zr, and about 26% Ni (e.g., on a weight-%, atomic-%, mol-% or volume-% basis). In some instances, the braze comprises at least about 5, 10, 15, 20, 25, 30, 35, 40, 45, 50, 55, 60, 65, 70, 75, 80, 85, 90, 95 or more weight-%, atomic-%, mol-% or volume-% of titanium, nickel or zirconium (or any other braze material herein). In some examples, the braze comprises about 19-21 weight percent (wt %) Zr, 19-21 wt % Ni, 19-21 wt % Cu, and the remainder comprises mostly of or all of Ti (i.e., 'TiBraze 200'). In some examples, the braze comprises about 61-63 wt % Zr, 19-21 wt % Ni, and the remainder comprises mostly of or all of Ti (i.e., 'TiZrNi' braze). In some examples, the braze comprises about 29-31 wt % Ni and the remainder comprises mostly or all of Ti (i.e., 'TiNi-70' braze). In some examples, the braze comprises at least about 10 wt % or 15 wt % Ti (i.e., 'Ti braze alloy'). In some instances, the braze comprises less than or equal to about 5, 10, 15, 20, 25, 30, 35, 40, 45, 50, 55, 60, 65, 70, 75, 80, 85, 90, 95 or more weight-%, atomic-%, mol-% or volume-% of titanium, nickel or zirconium (or any other braze material herein). In some examples, the braze comprises greater than about 70 wt %, greater than about 74 wt %, greater than about 78 wt %, greater than about 82 wt %, greater than about 86 wt %, greater than about 90 wt %, greater than about 94 wt %, or more nickel. In some examples, the braze comprises between about 70 wt % and 80 wt %, between about 70 wt % and 90 wt %, between about 70 wt % and 95 wt %, between about 80 wt % and 90 wt %, or between about 80 wt % and 95 wt % nickel. In some examples, the braze comprises between about 82 wt % and 94 wt % nickel. In some instances, the braze comprises greater than or equal to about 70 wt % Ni ("BNi braze" herein). In some instances, the braze comprises greater than or equal to about 82% Ni, and less than or equal to about 7% Cr, 3% Fe, 4.5% Si, 3.2% B and/or 0.06% C (e.g., BNi-2 braze). In some instances, the braze comprises greater than or equal to about 82% Ni, and less than or equal to about 15% Cr, 4.0% B and/or 0.06% C (e.g., BNi-9 braze). In some instances, the braze comprises greater than or equal to about 82% Ni, and less than or equal to about 15% Cr, 7.3% Si, 0.06% C and/or 1.4% B (e.g., BNi-5b braze). In some instances, the braze comprises yttrium, chromium or rhenium, and nickel. In some examples, the braze comprises silver (Ag) and aluminum (Al) and may also comprise titanium. The braze may comprise about 5:1, 6:1, 7:1, 8:1, 9:1, 10:1, 11:1, 12:1, 13:1, 14:1, 15:1, 16:1, 17:1, 18:1, 19:1, 20:1, 25:1, or greater ratio of silver to aluminum (Ag:Al). In some examples, the braze comprises a ratio of about 19:1 Ag:Al by weight or volume (e.g., about 95 wt % Ag to about 5 wt % Al) and may also comprise other additives, such as Ti.

To facilitate the use of certain braze materials (e.g., non-active braze materials) to bond the ceramic material to a metal collar or sleeve, a layer comprising metal (also "metallization layer" and "pre-metallization layer" herein) may first be applied to the ceramic material via a pre-metallization step (e.g., the metallization layer may be applied to the ceramic material by a coating process). For example, a metallization layer with a controlled layer thickness may be applied onto the ceramic material by sputter-coating or by vacuum or controlled atmosphere (e.g., Ar or $N_2$ with $H_2$ gas) high temperature thermal treatment (e.g., sintering the metallization layer onto the ceramic) without bonding a metal collar or sleeve to the braze material. The pre-metallization step may enable, for example, a subsequent brazing step to bond the pre-metallized ceramic surface to a metal collar or sleeve by using a braze material that may not bond to the ceramic material directly (e.g., the braze material may not bond to the ceramic material without a metallization layer).

A metallization layer may comprise metallization material (also "pre-metallization material" herein). As described in greater detail elsewhere herein, the metallization material may include one or more metal and/or non-metal materials (e.g., one or more metals, ceramics, silicon oxide glass, etc.). Application of a metallization material may result in formation of one or more layers of the pre-metallization layer. The sublayer(s) may be formed in one step (e.g., a processing step using a single metallization material may result in the formation of two sublayers) or may result from multiple processing steps (e.g., multiple processing steps using different metallization materials). A metallization material may include a braze material. For example, at least a portion (e.g., some portion) of the braze material (e.g., yttrium, titanium or aluminum) may be applied as metallization material via a pre-metallization step. In some instances, a pre-metallization material may be referred to as a pre-metallization braze material. The metallization material may be different from a braze material. In some instances, a material may be referred to as a metallization material instead of a braze material. For example, when applying a metal coating as a powder and bonding that powder to the ceramic, the powder may be referred to as a metallization powder rather than a braze powder. Such nomenclature may distinguish between a braze material that may melt during a thermal process onto the ceramic and/or metal, and a metallization material (e.g., powder) that may effectively sinter onto the ceramic during a thermal process and may not melt (e.g., may not fully melt) during the thermal process.

In some implementations, a ceramic-to-metal brazed joint may be formed by a metallization process followed by a brazing process. In some implementations, the metallization step may not be included and the ceramic-to-metal brazed joint may be formed directly by an active braze step (e.g., using a Ti-containing braze).

The ceramic material may comprise AlN. The ceramic material may comprise a primary ceramic material (e.g., AlN), and one or more secondary ceramic materials (e.g., $Y_2O_3$, SiC, or combinations thereof). The ceramic material may be substantially or wholly formed of the primary ceramic material. The ceramic material may comprise various levels of secondary ceramic material(s). For example, the ceramic material may comprise a first secondary ceramic material and a second secondary ceramic material. The ceramic material may comprise the first secondary ceramic material (e.g., $Y_2O_3$) at a concentration greater than or equal to about 3 wt %. As an alternative, the ceramic material may comprise the first secondary ceramic material (e.g., $Y_2O_3$) at a concentration less than about 3 wt %. The ceramic material may comprise the first secondary ceramic material in combination with at least the second secondary ceramic material (e.g., SiC), the second secondary ceramic material being at a concentration greater than or equal to about 25 wt % (or 25 volume-% (also "v %," "vol %" and "volume percent" herein). In some examples, the ceramic material may comprise AlN as a primary ceramic material, and about 1 wt % to 5 wt % $Y_2O_3$ as a second ceramic material.

The braze can be a passive braze or an active braze. Passive brazes can melt and wet a ceramic material or wet a ceramic material that has a metallization layer deposited onto it. Copper and silver are examples of passive brazes. Active brazes can react with the ceramic (e.g., chemically reduce the metal component of the ceramic (e.g., Al is reduced from AlN)). In some examples, active brazes can comprise a metal alloy having an active metal species such as titanium (Ti) or zirconium (Zr) that reacts with the ceramic material (e.g., AlN+Ti→Al+TiN or AlN+Zr→Al+ZrN or $2Nd_2O_3+3Ti→4Nd+3TiO_2$). The active braze can further comprise one or more passive components (e.g., Ni). The passive component(s) can, for example, reduce the melting point of the braze and/or improve the chemical stability of the braze. In some examples, the active metal braze beads up on the ceramic and/or does not wet the ceramic.

The seal can be welded or brazed to the electrically conductive housing, cell (housing) lid, and/or the conductor. In some examples, the electrically conductive housing and/or the conductor comprises 400-series stainless steel, 300-series stainless steel, nickel, steel, or any combination thereof. In some examples the electrically conductive housing and/or the conductor comprises a low-carbon stainless steel, such as 304L stainless steel (304L SS), for example. Low carbon stainless steel (e.g. 304L SS) can also be used in the metal collar and/or sleeves of the seal. In some examples, the sleeves comprise alloy 42 and the collar and conductor comprise low carbon stainless steel (e.g. 304L SS) and/or steel (e.g., mild steel). In some examples, the conductor comprises a Ni coating (e.g., Ni-plated mild steel). In some examples, a low carbon stainless steel may reduce unwanted chemical reactions with the reactive material inside a cell.

In some examples, the sleeve or collar materials can include, for example, 304 stainless steel, 304L stainless steel, 430 stainless steel (430 SS), 410 stainless steel, alloy 42, alloy 52, and nickel-cobalt ferrous alloy. In some examples, the sleeve or collar components may include a coating, such as a Ni coating (e.g., Ni-coated alloy 42). The braze materials can include, for example, nickel-100, molybdenum (Mo) and tungsten (W). The ceramic materials can include, for example, aluminum nitride (AlN), aluminum oxide ($Al_2O_3$), boron nitride (BN) in the direction parallel to the grain orientation, boron nitride (BN) in the direction perpendicular to the grain orientation, yttrium oxide ($Y_2O_3$) and yttria partially stabilized zirconia (YPSZ).

In some examples, the electrically conductive components of the seal comprise a metal with low CTE (e.g., less than about 1 ppm/° C., 2 ppm/° C., 3 ppm/° C., 4 ppm/° C., 5 ppm/° C., 6 ppm/° C., 7 ppm/° C., 8 ppm/° C., 9 ppm/° C., 10 ppm/° C., 11 ppm/° C., 12 ppm/° C. or 15 ppm/° C.), low Young's modulus (e.g., less than about 0.1 GPa, 0.5 GPa, 1 GPa, 10 GPa, 50 GPa, 100 GPa, 150 GPa, 200 GPa or 500 GPa), high ductility (e.g., an ultimate strength greater than about 100%, 200%, 300%, 400% or 500% that of the yield strength), or any combination thereof. In some examples, the ultimate strength can be greater than about 50%, 100% or 200% that of the yield strength of the material for it to have sufficient ductility. In some examples, the electrically conductive components do not comprise an electrically conductive ceramic. Low CTE, low Young's modulus and/or high ductility component characteristics can lead to low stress concentrations in the ceramic. Low Young's modulus component characteristics can result in less stress generated between components with different CTE values (e.g., for a given CTE mismatch between two materials that are bonded together, if at least one material has a low Young's modulus, the strain generated by the CTE difference can cause the material with the low Young's modulus to "stretch," resulting in a relatively small stress force between the two materials). Low CTE, low Young's modulus and/or high ductility component characteristics may reduce likelihood of failure (e.g., due to reduced stress concentrations and/or less stress generated). Metals that meet these specifications (in addition to corrosion resistance to the internal and external cell environment) can include, for example, zirconium (Zr), high-zirconium content alloys, tungsten (W), titanium (Ti), niobium (Nb), tantalum (Ta), nickel (Ni) and/or molybdenum (Mo).

In some implementations, the seal comprises a ceramic, one or more braze materials and one or more metal collars. For example, two metal collars may be joined to the ceramic, one to each side of the ceramic. Each such metal collar may be further joined to additional metal collar(s). Thus, a compound metal collar may be created that comprises two or more metal collars. In some examples, the compound metal collar comprises at least two metal collars, of which at least one metal collar comprises a material that is suitably joined (e.g., using one type of braze) to the ceramic and at least one metal collar comprises a material that is suitably joined to another component of the seal or of the cell (e.g., using another type of braze). The two metal collars may also be joined (e.g., using yet another type of braze). In some instances, at least a portion (e.g., all) of the brazes used to join the metal collars of the seal to each other and/or to other parts of the cell may be of the same type. In some examples, at least a portion or all of the brazes may be of different types. Further, one or more of the metal collars may be welded rather than brazed, or welded and brazed. The seal may comprise one or more compound metal collars. In some examples, the seal comprises at least about 1, 2, 3, 4, 5, 6, 7, 8, 9, 10, 12, 14, 16, 18, 20 or more individual metal collars. In an example, the seal comprises 3 or 4 individual metal collars forming two compound metal collars. In some examples, at least a portion of the individual metal collars may comprise the same material. For example, metal collars comprising the same material may be used for joining metal collars to similar materials (e.g., similar cell housing or conductors materials).

In some examples, the seal comprises a ceramic, a braze material, a first (e.g., thin) metal collar, and/or a second metal collar. The first metal collar may be brazed to the ceramic, and the second metal collar may be brazed to the first metal collar. In some examples, the first metal collar is a low CTE material such as alloy 42, zirconium (Zr) or tungsten (W) and the second metal collar is a ferrous alloy, such as steel, stainless steel, a 300 series stainless steel (e.g., 304L stainless steel), or 400 series stainless steel (e.g., 430 stainless steel). In some examples, the first metal collar is less than about 2 micro-meters (μm, or microns) thick, 5 μm, 10 μm, 20 μm, 50 μm, 100 μm, 150 μm, 250 μm, 500 μm, 1,000 μm, μm 1,500 or 2,000 μm thick.

In some examples, the seal comprises a ceramic, a braze, a first metal collar, a second metal collar and a third metal collar. The first metal collar may be joined to one part of the ceramic, and the second metal collar may be joined to the first metal collar. The third metal collar may be joined to a different part of the ceramic such that the first metal collar and the third metal collar are separated by an electronically insulating ceramic material. Joints between the first metal collar and the ceramic and between the third metal collar and the ceramic may both be hermetic. In some examples, the seal further comprises a fourth metal collar that is joined to the third metal collar (e.g., the first metal collar is joined to one part of the ceramic, the second metal collar is joined to the first metal collar, the third metal collar is joined to another part of the ceramic and the fourth metal collar is joined to the third metal collar). The braze material used to join the first metal collar to the second metal collar may comprise or be similar to any of the braze compositions described herein. The first metal collar or the second metal collar may be joined (e.g., using a braze composition similar to any of the braze compositions described herein, or welded) to the cell lid. The third metal collar may be joined to the fourth metal collar or directly to a negative current lead (e.g., brazed using any of the braze compositions of the disclosure).

Figure 3:
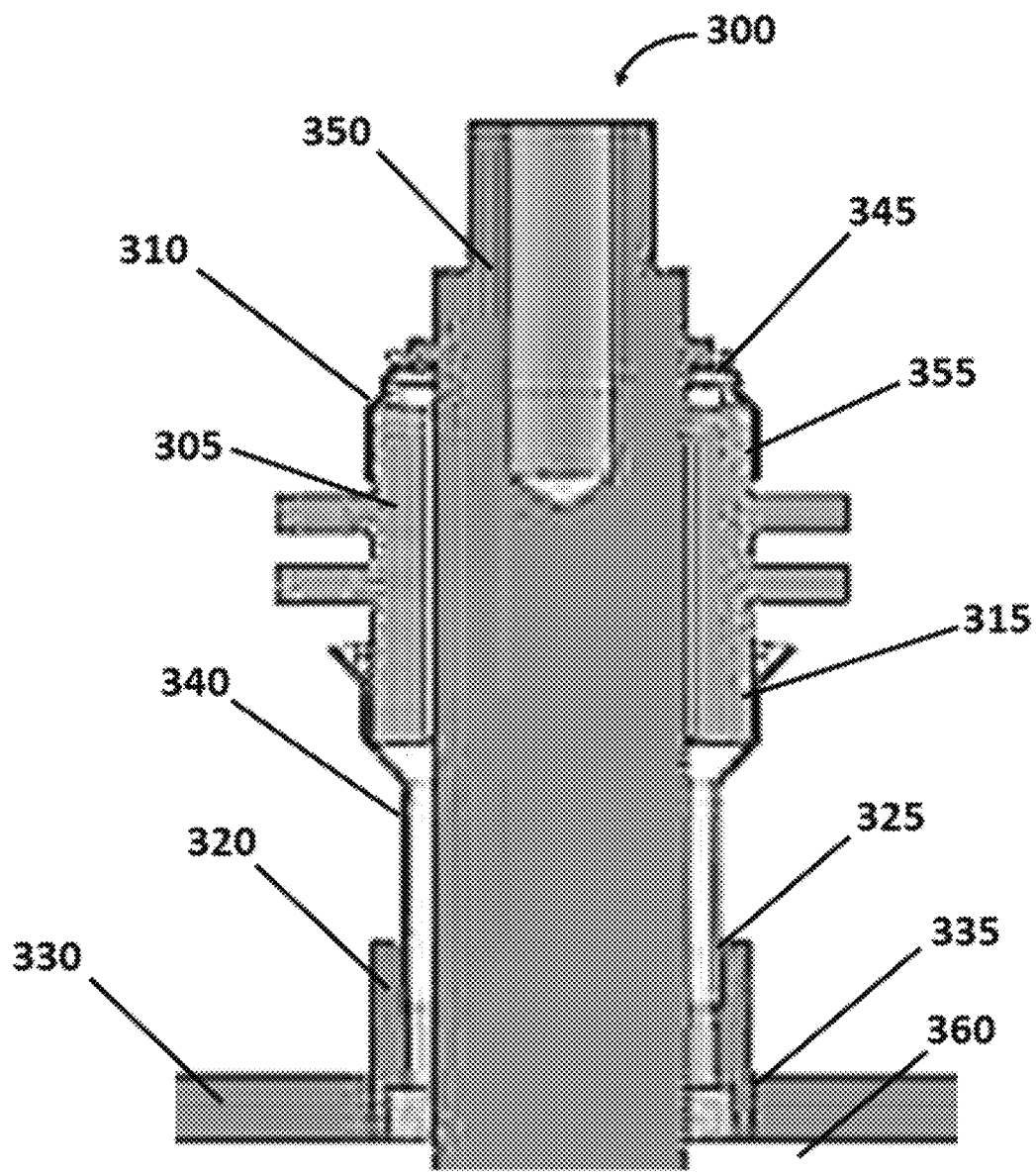
FIG. 3 shows a seal design having a ceramic component disposed between one or more metal sleeves.

FIG. 3 is a cross-section of a radially symmetric example of a seal 300 comprising a ceramic component 305. The ceramic component can comprise aluminum nitride (AlN), for example. In some examples, the ceramic component can comprise yttrium oxide ($Y_2O_3$). In an example, the ceramic component comprises about 3 weight percent or more yttrium oxide. In some examples, the ceramic component comprises about 1 percent to about 4 percent yttrium oxide.

The ceramic component 305 is joined with a first metal sleeve (e.g., Ni-plated alloy 42) 310 via a first metal-to-ceramic joint (e.g., braze) 355. The seal further comprises a second metal sleeve (e.g., Ni-plated alloy 42) 340 joined to the ceramic component 305 via a second metal-to-ceramic joint (e.g., a first braze alloy) 315. The first and second metal-to-ceramic joints 355 and 315 can comprise a first braze alloy of silver and aluminum (Ag—Al), for example. The first and second metal-to-ceramic joints 355 and 315 may comprise a first braze alloy and an internal braze alloy. The first braze alloy may be exposed to the environment external to the container (e.g., ambient air) and the internal braze alloy may be exposed to the internal environment of the container (e.g., high temperature reactive materials). The first braze alloy may comprise a ductile material. The first braze may be an alloy of at least two different metals. The first braze alloy can have a ratio of silver to aluminum of less than 19 to 1; for example, the first braze alloy can contain about 95% silver or less. The first braze alloy can further comprise a wetting agent. For example, the wetting agent can comprise titanium or titanium hydride. In some examples, the wetting agent can be provided as a metallization layer for the first braze alloy. The metal sleeves 310 and 340 can be brazed to the outer surface of the ceramic component, for example.

The first and/or second metal-to-ceramic joint(s) 355 and 315 may also comprise an internal braze alloy. The internal braze alloy may be at or adjacent to an internal surface of the first and/or second metal-to-ceramic joint(s) 355 and 315. The internal braze alloy may be more chemically stable than the first braze alloy. The internal braze may be an alloy of at least two different metals. The internal braze alloy may comprise a brittle material. The internal braze alloy may be an active metal braze. The internal braze alloy may be stable when exposed to the reactive metal materials internal to the sealed container (e.g., high temperature battery cell). The internal braze alloy may form a protective barrier between the reactive materials and the first braze alloy. The first braze alloy may be exposed to air external to the sealed container and may provide a barrier between the ambient air and the internal braze alloy. The internal braze alloy may comprise a Ni-based braze alloy (e.g., BNi-2, BNi-7, BNi-9) or a Ti braze alloy (e.g., TiBraze 200, TiZrNi, TiNi-70). The bottom metal-to-ceramic joint 315 may comprise the first braze alloy of silver and aluminum and the top metal-to-ceramic joint 355 may comprise both a first braze alloy of silver and aluminum (e.g., about 95% Ag and 5% Al), and an internal braze alloy of a Ti braze alloy (e.g., TiBraze200). The internal braze alloy may be exposed to the reactive materials (e.g., reactive metal vapors and/or salt vapors and/or liquid) in the sealed container and may not be exposed to air outside the sealed container. The first braze alloy in the top metal-to-ceramic joint 355 may be exposed to air outside the sealed container and not exposed to the reactive materials in the sealed container. In some examples, the bottom metal-to-ceramic joint 315 may also comprise a first and an internal braze alloy (as described above for joint 355).

The first metal sleeve 310 is joined with a conductor (e.g., a current lead, such as a negative current lead) 350 via a first metal-to-metal joint (e.g., weld, braze) 345. The conductor can comprise a low-carbon stainless steel, such as 304L stainless steel, for example, or mild steel or Ni alloy (e.g., Ni 201). The second metal sleeve 340 is joined with a metal collar (e.g., 304L SS) 320 via a second metal-to-metal joint (e.g., weld, braze) 325. The metal collar 320 is joined to the container (e.g. at the cell lid, comprising, e.g., 304L SS) 330 via a third metal-to-metal joint (e.g., weld, braze) 335. The seal encloses a chamber 360 of the container, which can contain a reactive material, such as reactive liquids and gasses of an electrochemical cell, for example.

The metal-to-metal joints can comprise a BNi braze comprising 70 wt % or more of Ni; for example, a BNi-2, BNi-5b, or BNi-9 braze, a titanium-based braze alloy (e.g., TiBraze 200, TiZrNi, TiNi-70, a silver-aluminum braze alloy (e.g., an alloy with a 19:1 ratio of Ag:Al), a silver alloy, an aluminum alloy, an alloy that contains at least silver, and/or an alloy that contains at least aluminum. In some embodiments, the second metal-to-metal joint comprises a BNi braze or a titanium-based braze alloy (e.g., TiBraze 200). In some embodiments, the first and second metal-to-metal joints comprise a BNi braze or a Ti braze alloy. In some embodiments, each metal-to-metal joint comprises a BNi braze, a Ti braze alloy, and/or a Ag—Al braze alloy. In some examples, the metal collar 320 is welded to the container, or is formed integrally as part of the container.

Although described as metal sleeves, in some embodiments one or both of metal sleeves 310 and 340 can be provided as a metal collar. In various embodiments, the seal illustrated in FIG. 3 can comprise a variety of materials. In one example, the ceramic component 305 comprises an $Al_2O_3$ ceramic, joints 315 and 355 comprise a Cu—Ag braze, and metal sleeves 310 and 340 comprise a Fe—Ni alloy (e.g., a Fe—Ni sleeve or collar). In one example, the ceramic component 305 comprises an AlN ceramic, joints 315 and 355 comprise a copper braze with a metallization layer comprising Ni-plating, and metal sleeves 310 and 340 comprise nickel metal (e.g., a Ni metal sleeve or collar). In one example, the ceramic component 305 comprises an AlN ceramic, joints 315 and 355 comprise a Cr—Ni braze with a metallization layer, and metal sleeves 310 and 340 comprise nickel metal (e.g., a Ni metal sleeve or collar).

Figure 4:
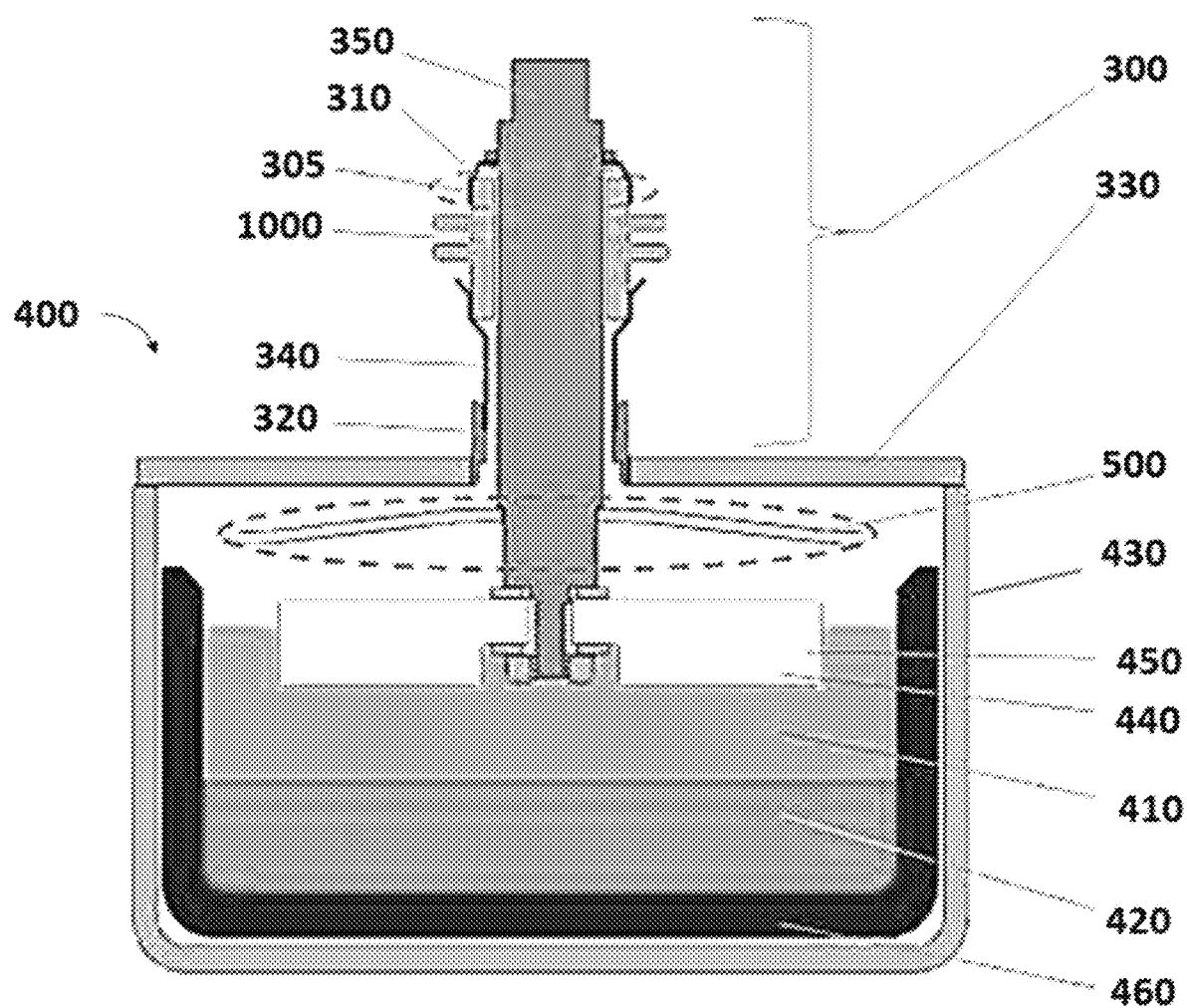
FIG. 4 illustrates an electrochemical cell containing a reactive material and comprising a seal including additional components to inhibit seal corrosion.

Seal 300 can be incorporated into an electrochemical cell 400, optionally in combination with additional features as illustrated in FIG. 4. Electrochemical cell 400 comprises a container including a lid 330 and can 430. The container contains a reactive material held at high temperature (e.g., greater than 200° C.) when operating. The reactive material comprises an electrolyte 410 (e.g. a salt) in contact with a positive electrode 420 (e.g., Pb—Sb, Bi, Sb, or $FeS_2$) and a negative electrode 440 (e.g., Li, Na, Mg, Ca). A negative current collector 450 (e.g., a foam) connects the negative electrode to a negative current lead 350, which extends through a seal 300 to the outside environment. A liner 460 (e.g., a graphite crucible) can be provided between the can 430 and active cell components (e.g., electrolyte 410 and positive electrode 420).

A seal 300 may comprise multiple features as illustrated in FIG. 4. In one example, the ceramic component 305 comprises AlN ceramic, joints 315 and 355 comprise Al—Ag braze activated with Ti, $TiH_2$, and/or a Ti braze alloy, and metal sleeves 310 and 340 comprise alloy 42 metal alloy with a layer of nickel on its surface (e.g., Ni plated alloy 42 metal sleeve(s)). The thickness of the metal sleeve components 310 and 340 may be less than about 0.030 inches. In some examples, the thickness of the metal sleeve is less than or equal to about 0.025 inches, 0.02 inches, 0.015 inches, 0.01 inches or less. In some examples, the thickness of the metal sleeve is between about 0.01 inches and 0.015 inches, between about 0.01 inches and 0.02 inches, or between about 0.01 inches and 0.025 inches. In one example, the ceramic component comprises physical ion blocking features 1000 (as further described below) that may prevent or inhibit the formation of metal dendrites along the surface of the ceramic. In one example, the current lead 350 (e.g., negative current lead) comprises a Ni alloy, steel (e.g., mild steel), or stainless steel (e.g., 304L SS alloy), and a stainless steel (e.g., 304L SS) metal collar 320. The current lead 350 may comprise a feature, such as a shoulder, that is an integral part of the current lead and serves as the surface for brazing the top metal sleeve 310. The top metal-to-metal joint 345 between the current lead 350 and the top metal sleeve 310 may comprise Ag—Al braze (e.g., ~95% Ag and ~5% Al), may comprise a Ni-based braze alloy (e.g., BNi-9 braze), or may comprise a Ti-based braze alloy (e.g., TiBraze 200), for example. The bottom metal-to-metal joint 325 between the bottom metal sleeve 340 and the metal coupler 320 may comprise Ag—Al braze (e.g., ~95% Ag and ~5% Al) or may comprise a Ni-based braze alloy (e.g., BNi-9 braze) or a Ti braze alloy (e.g., TiBraze 200), for example.

The container of the cell can comprise a gas portion within between the liquid portion and the seal. In some examples, reactive material from the liquid portion can evaporate into the gas portion, eventually coming into contact with the seal. Additionally, liquid and/or ions can flow from the negative electrode along the surface of the negative current lead toward the seal. These processes can cause undesirable corrosion when particles of reactive material contact the seal. Accordingly, a shield 500 can be provided to inhibit the flow of vapor, liquid, and/or ions from the liquid portion to the seal.

Figure 5:
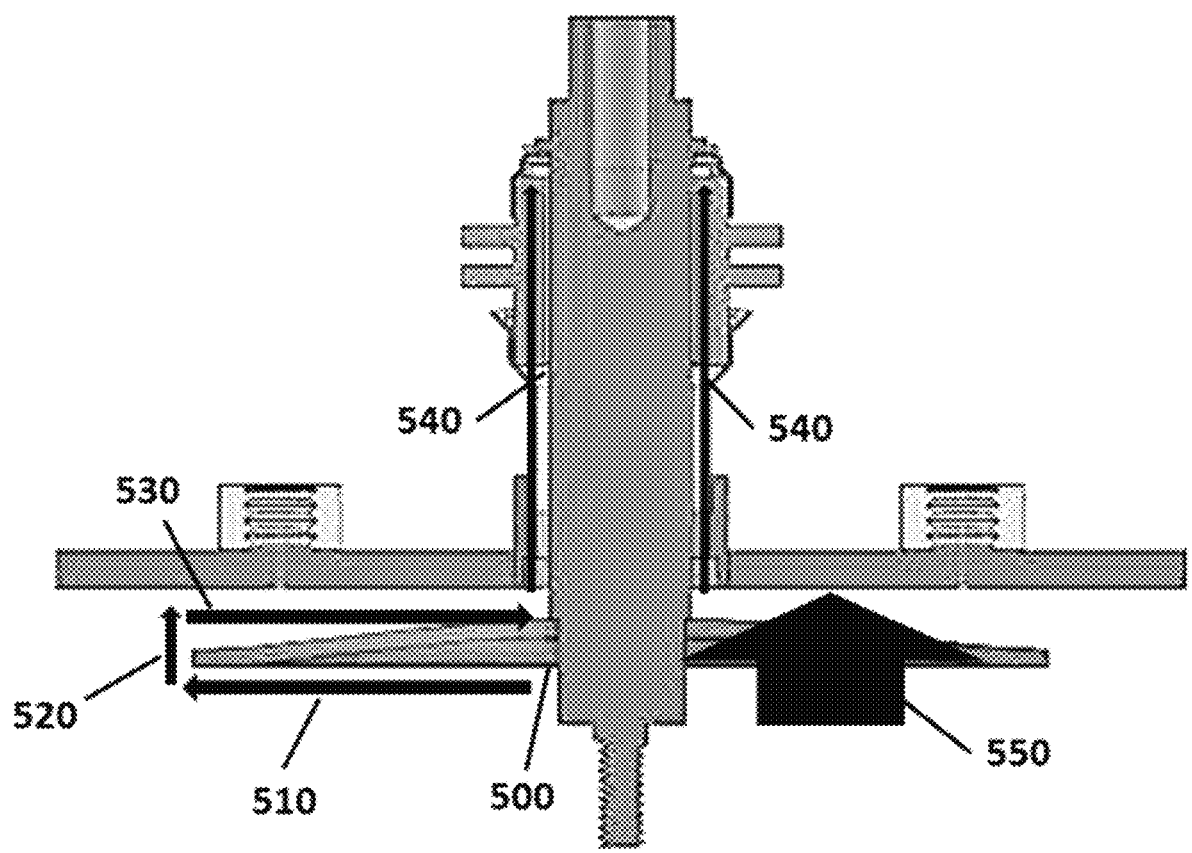
FIG. 5 shows an electrochemical cell having a shield configured to increase an effective gas diffusion path.

FIG. 5 illustrates an electrochemical cell comprising a shield 500 shaped to inhibit or obscure the flow of vapor from the liquid portion to the seal. The shield 500 extends into a gas portion between the liquid portion and the seal. For a vapor to flow from the liquid portion (e.g., at a point near the center) at the bottom of the image to the seal at the top, the vapor may follow a path outwards, around the shield, then back inwards toward the center, and up to the top of the seal. This path is illustrated by paths 510, 520, 530, and 540 respectively. The shield may either partially or fully obscure and/or block the seal and the liquid portion from each other. By contrast, if the shield is absent, the gas flows directly upwards along path 550, then shares path 540 to the seal. The latter path may provide less impedance to the flow of the gas, as discussed in greater detail below.

The shield can force the gas to flow along a narrow path for each segment by allowing a small gap between the shield and surrounding walls; in general, the width of this path can be assigned to a parameter, w, which can have a variable value (for example, in some cases w is less than or equal to about 1 cm, or less than or equal to about 2 mm, or less than or equal to about 1 mm). The amount of gas flowing along an infinitesimal distance dL of one of the paths can be proportional to the cross sectional area through which the path flows. The smaller the area, the more restricted the gas flow may be; additionally, the longer the length over which the gas flows, the more its flow may be slowed. The shield may extend from the conductor. The shield may extend a distance from the conductor that is greater than or equal to about 1 time, 1.5 times, 2 times, 3 times, 4 times, 5 times, or move the width of the conductor. In some examples, the shield extends from the conductor to within an infinitesimal distance of the container wall.

The degree to which gas flow is subjected to a longer path as a result of a shield can be estimated by a parameter called the "effective gas diffusion path" or EGDP. The EGDP can be defined as an integral along a path between two points (e.g., from the liquid to the seal) of the inverse cross-sectional area through which a gas following the path can flow. For example, on path 510 in a circularly symmetric cell, at a radius r from the center, and with a path width w, the area can be estimated as the width w times the circumference of a circle of radius r. Under this assumption of radially symmetric cell/shield geometry, the infinitesimal EGDP can then be approximated as $$\frac{dr}{2\pi rw},$$

and the full EGDP can be estimated by the integral $$\int \frac{dr}{2\pi rw}$$

over each path. The units of EGDP are 1/length, and larger values of EGDP may correspond to longer effective distances over which vapor may flow. For example, given a path from the inner radius $r_1$ of the current lead to an outer radius $r_2$ of the can and back (approximating paths 510, 520, and 530, with path 520 along a length L at radius $r_2$), the EGDP for the portion of the path from the liquid to the seal can be estimated as $$\frac{1}{2\pi w}\ln\frac{r_2}{r_1} + \frac{L}{2\pi wr_2}$$

(neglecting second order terms, e.g., $O(w^2)$). A similar integral performed for path 550, traveling up a distance L in an annular region between $r_1$ and $r_2$, gives an EGDP of $$\frac{L}{\pi(r_2^2 - r_1^2)},$$

which may be a significantly smaller value than with a shield. Path 540 within the seal is common to both configurations, and so can be neglected. For example, a shield can increase the EGDP from a liquid portion to a seal by greater than or equal to about 10 percent, about 15 percent, about 20 percent, about 30 percent, or about 50 percent relative to the same cell without a shield. For example, a simple shield such as the one depicted in FIG. 5 can increase EGDP of a cell from about 6.35 cm$^{-1}$ to about 7.30 cm$^{-1}$ or more. In some examples, the EGDP from the liquid portion to the seal is at least about 1 cm$^{-1}$, 2 cm$^{-1}$, 3 cm$^{-1}$, 4 cm$^{-1}$, 5 cm$^{-1}$, 6 cm$^{-1}$, 7 cm$^{-1}$, or more. In an example, the EGDP from the liquid portion to the seal is 7 cm$^{-1}$ or more.

Figure 6:
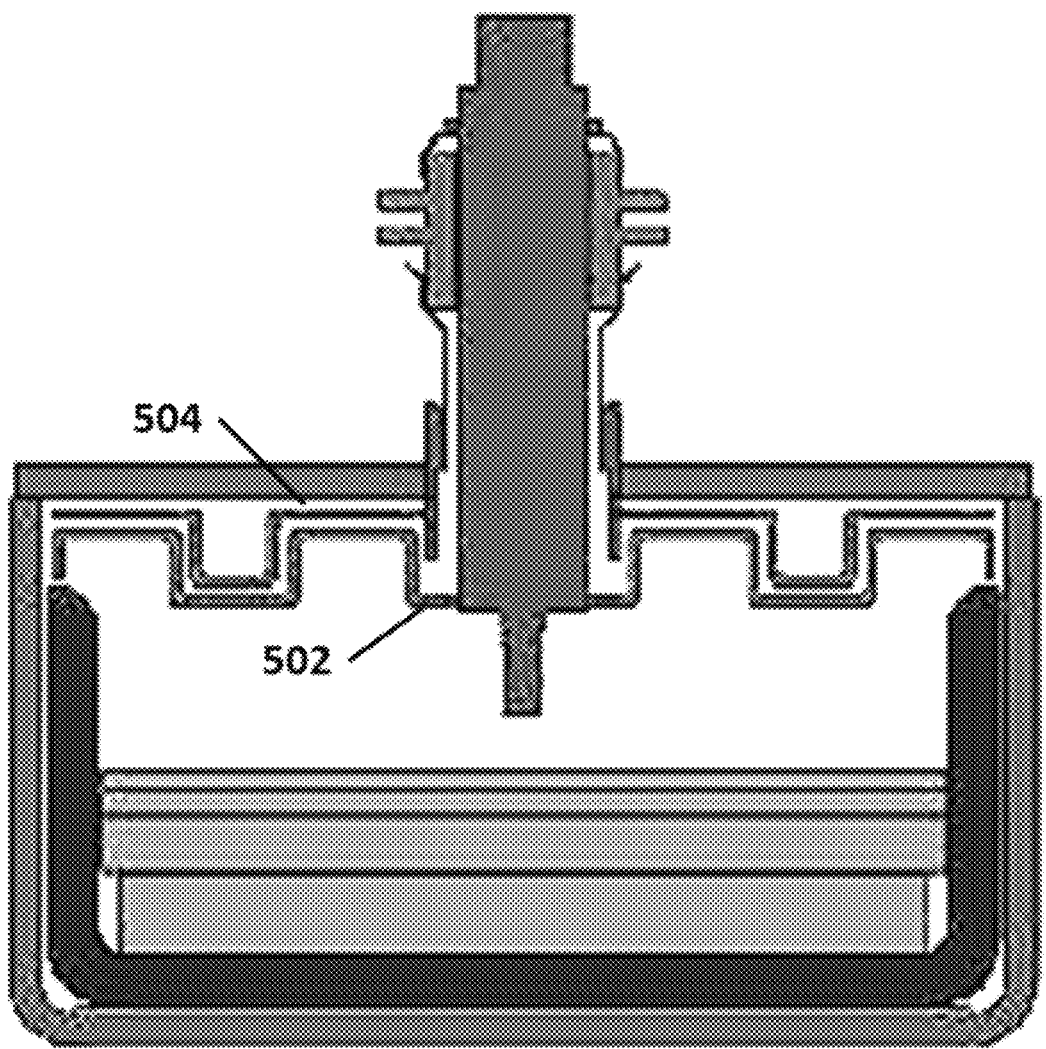
FIG. 6 shows an electrochemical cell having a plurality of shields configured to further increase a diffusion path length.

Further increases in EGDP can be achieved using more complex shield designs. For example, FIG. 6 illustrates a cell comprising a more complex shield system comprising a plurality of shields. A first shield 502 is attached to the negative current lead in the center, and a second shield 504 is attached to the walls of the cell container, joined to the lid. The two shields comprise a plurality of alternating convex and concave portions to provide a long and winding path from the liquid portion to the seal. The path can be S-shaped, for example. Such a path can have a length greater than or equal to about 1.2 times, 1.5 times, 1.7 times, 2 times, 3 times, or 5 times as long as a width of the container, for example.

Figure 7:
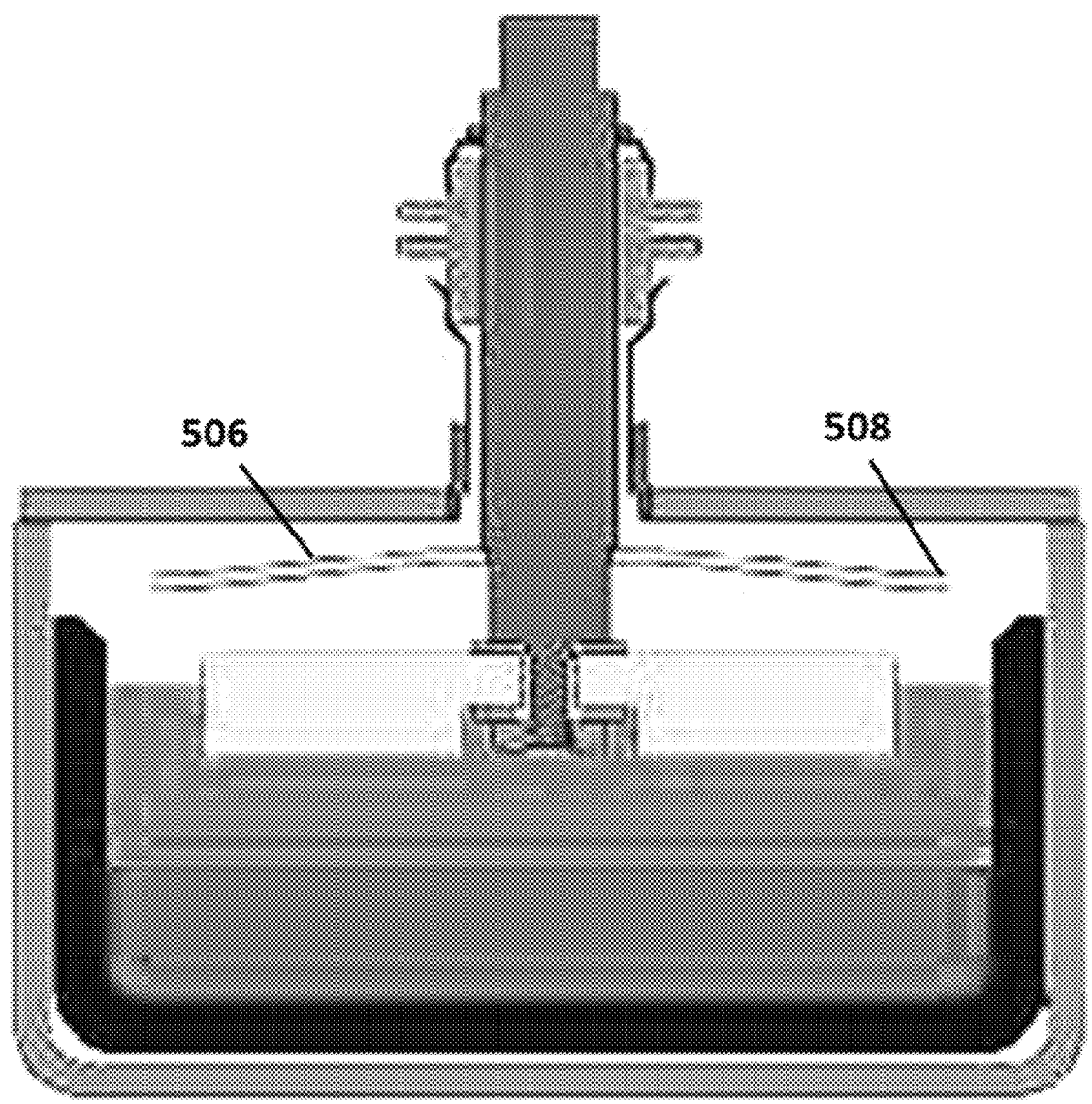
FIG. 7 illustrates an electrochemical cell with a shield having a lip to inhibit flow and splashing of liquid towards a seal.

The shields provided herein can be shaped to provide additional benefits. For example, FIG. 7 illustrates a shield 506 comprising a lip 508 at its end. The lip is shaped to inhibit flow of liquid (e.g., splashing or creeping of liquid along solid surfaces, such as by capillary forces) from the liquid portion to the seal. For example, liquids with modest surface wetting angle may be prevented or resisted from flowing around the edge of the shield.

Figure 8:
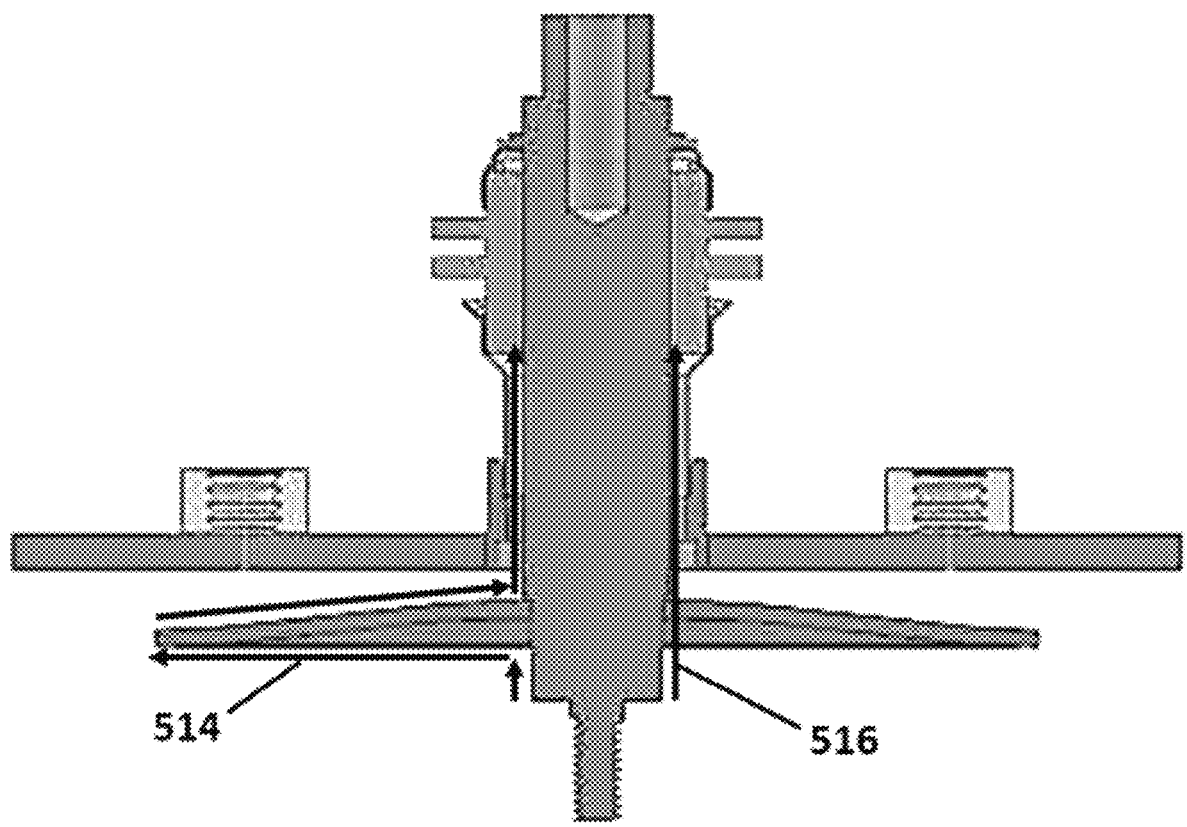
FIG. 8 shows an electrochemical cell having a shield configured to increase an effective ion diffusion path.

The shield may also provide protection against flow of ions along the surface of the negative current conductor to the seal. For example, FIG. 8 illustrates a shield 512 configured to increase an effective ion diffusion path (EIDP) of ions traveling from the liquid portion at the bottom of the image to the seal at the top. A first path 514 along the surface of shield 512 and the negative current lead to the seal is compared to a second path 516 traveling along the surface of the negative current lead. The EIDP can be defined as a dimensionless parameter given by an integral along a path between two points (e.g., from the liquid to the seal) of the inverse perimeter through which particles following the path along a surface can flow. For example, when flowing along a radial path from the center of a circle to its perimeter, the infinitesimal EIDP can be approximated as $$\frac{dr}{2\pi r},$$

where r is the radius of the circle. The full integral will then be $$\int \frac{dr}{2\pi r}$$

over me path. If the distance from the liquid portion to the seal in FIG. 8 is L, the radius of the current lead is $r_1$, the radius of the shield is $r_2$, and circular symmetry is assumed, Then the EIDP of path 516 can be approximated as $$\frac{L}{2\pi r_1},$$

and the EIDP of path 514 is the same value, plus about $$\frac{1}{2\pi}\ln\frac{r_2}{r_1},$$

representing the added EIDP from the shield. Additional shields can further increase EIDP by causing ions to repeatedly flow back and forth. For example, a shield or shields in such a system can provide an increase of greater than or equal to about 30 percent, about 40 percent, about 50 percent, about 70 percent, about 75 percent, about 80 percent, about 90 percent, or about 100 percent EIDP compared to the same system with no shield. In some examples, the effective ion diffusion path length is increased by about 75 percent or more. For example, the EIDP with a shield can be greater than or equal to about 1, about 1.5, about 2, about 3, about 4, or about 5. In one example, a cell with no shield has an EIDP of 1.17 and the same cell with a shield as illustrated has an EIDP of 1.60. In a second example, a plurality of shields are provided, producing an EIDP of 2.24. More complicated structures, such as the S-shaped structures of FIG. 6, can provide further increases in EIDP.

An additional feature that can be provided by the shields disclosed herein is cathodic protection. For example, referring to FIG. 4, shield 500 blocks vapor from liquid portion 410 from traveling in a straight-line path to seal 300. Instead, vapor is directed to the outer edge of the container, coming in close proximity to the walls of can 430. The walls of can 430 can be in electrical communication with a positive electrode. Accordingly, atomic metal vapors from the liquid portion can be oxidized by coming into contact with the positive current source of the wall. The wall can include an ionically conductive film (e.g., comprising salt from the electrolyte and/or prior vapor-wall interactions), such that liquid metal atoms can be oxidized to a salt upon contact with the wall. For example, the ionically conductive film can conduct ions between the wall and the liquid portion. These interactions can inhibit flow of reactive metal atoms from the liquid portion to the seal. Shields configured to direct vapor along conductive container walls, especially in close proximity (e.g., about 5 mm or less), and for extended distances (e.g., about 1 cm or more) can enhance this effect.

Figure 9:
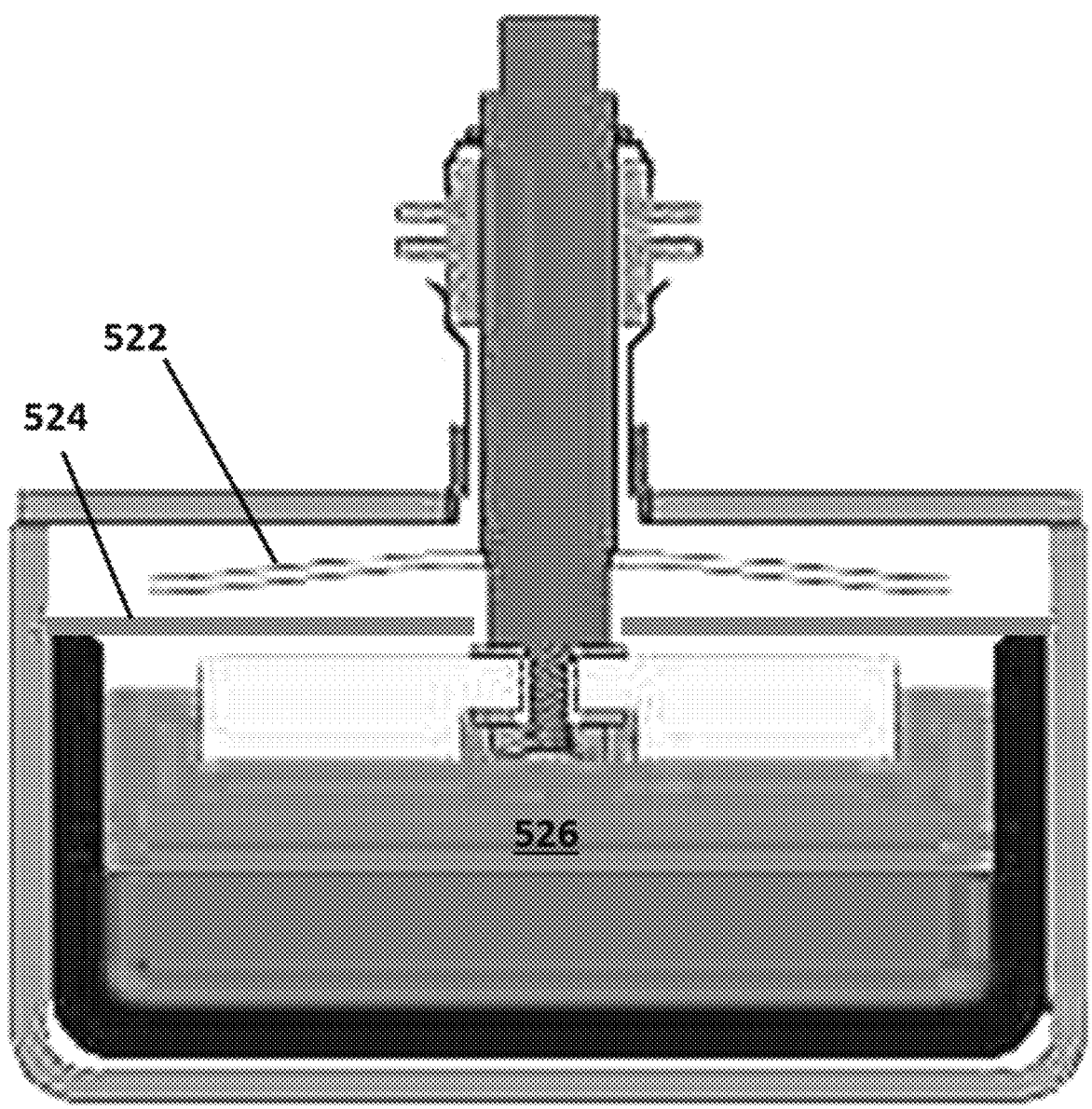
FIG. 9 is an image of a cell having a positively-polarized shield disposed between a liquid portion and a negatively polarized shield.

FIG. 9 illustrates a configuration comprising a plurality of shields, wherein a first shield 522 is attached to a negative current lead and a second shield 524 is disposed between the first shield 522 and a liquid portion 526, the second shield 524 in contact with a positive current lead. To reach the seal at the top of the image, vapor may pass by the second shield 524, which acts to oxidize reactive metal vapors to less-reactive salt ions, thereby reducing seal corrosion.

The ceramic portion of a seal can include measures to reduce flow of metal species, including electromigration of metal ions from braze material, along the surface of the ceramic component. A seal may include a ceramic component with a tubular structure. The tubular structure may have any cross-sectional geometry including, but not limited to, circular, elliptical, triangular, square, rectangular, or polygonal. In some embodiments, the ceramic component is annular or 'ring-shaped'. An inner dimension of the tubular structure may be greater than or equal to an outer dimension of the current lead such that the ceramic component may circumscribe the current lead (e.g., the ceramic component may be a ring that fits over the exterior surface of the current lead). The ceramic component may be in contact with, may be in partial contact with, or may not be in contact with portions of the exterior surface of the current lead. The seal may be formed by brazing metal sleeves to the top and bottom of the external surface of the ceramic component (e.g., the surface of the ceramic component not exposed to the reactive materials that are inside the sealed container), forming a first and a second braze joint. Alternatively, or in addition to, the first and second braze joints may be formed by brazing the metal sleeves to the top and bottom of the internal surface of the ceramic component, by brazing to the inner and outer top edges of the ceramic component, by brazing to the inner and outer bottom edges of the ceramic component, or by brazing the metal sleeves to the top and bottom edges of the ceramic component. The first and the second braze joint may circumscribe the ceramic component and form a hermetic and gas-tight seal along the external surface of the ceramic component. The braze joints may conceal or cover a portion of the external surface of the ceramic component. A portion of the ceramic component between the first and the second braze joints may not be covered by the first and second braze joints and may be exposed to an ambient environment. The ambient environment may be any environment external to the cell. For example, the exposed surface of the ceramic component between the first and second braze may be external to the cell and not in contact with the reactive vapors or reactive material inside the cell. The ceramic component that is exposed to the ambient environment may have a surface that extends from the first braze joint to the second braze joint and circumscribes the current lead. The ceramic component may or may not come into contact with the current lead. In some examples, the surface of the ceramic component extending between the first and second braze joints is smooth (e.g., the surface may include a linear intercept between the first braze joint and the second braze joint) and may result in the lowest surface area when compared to other possible surfaces that intercept both the first and second braze joints. In some examples, the surface of the ceramic component extending between the first and the second braze joints has protrusions that increase the area of the exposed surface of the ceramic component. The protrusions may be defined as one or more features that extend away from (e.g., are at least partially orthogonal to) a theoretical or imaginary smooth surface (e.g., reference surface) extending between the first and second braze joints of the seal. In some embodiments, the protrusions may also be defined as one or more features that simultaneously extend at least partially away from both the first and second braze joints of the seal.

Some braze materials may, under some operating conditions, permit the flow of metal ions across the surface of the ceramic component which may lead to undesirable shorting, for example, due to the formation of metal dendrites as ions reach the far electrode and reduce to neutral metal. As the process repeats, dendrites can grow across the surface of the ceramic component, eventually forming a metallic link between oppositely polarized conductors, causing a short. To inhibit this, a physical ion blocker can be provided on the exposed surface of the ceramic component and/or integrated into the design of the ceramic component. For example seal 300 of FIG. 4 illustrates a physical ion blocker 1000 comprising a plurality of protrusions on the surface extending substantially orthogonal to a reference surface extending between the first and second braze joints. The protrusions may be formed by one or more exposed surfaces of the ceramic component that are substantially parallel to, substantially orthogonal to, and/or that are at an acute angle to a reference surface extending from the first braze joint to the second braze joint. The plurality of protrusions may each comprise first, second, and/or third surface portions. The first surface portion may extend away from the exposed surface of the ceramic component perpendicular to, substantially perpendicular to, or at an angle to a reference surface of the ceramic component extending from the first braze joint to the second braze joint. For example, the protrusions can be angled less than or equal to about 20 degrees from a right angle, less than or equal to about 5 degrees from a right angle, or less than or equal to about 1 degree from a right angle. The second surface portion may be parallel to, substantially parallel to, or at a defined slope relative to the reference surface of the ceramic component extending from the first braze joint to the second braze joint. The third surface portion may extend towards the reference surface of the ceramic component. An electric field vector may be parallel with the reference surface and oriented from a first ceramic-to-metal braze joint to a second ceramic-to-metal braze joint. One of the ceramic-to-metal braze joints may be in electrical communication with a positive electrode. In the absence of protrusions, ions can be pulled by electric fields between the braze of positively polarized sleeve (e.g., 340) and the braze of negatively polarized sleeve (e.g., 310). The protrusions may cause ions traveling along the exposed surface of the ceramic component to move orthogonal to or at least partially against the electric field and, thereby, slow or stop the progress of the ions. Although two protrusions are illustrated, more or fewer protrusions can also be used, such as a single protrusion (e.g., encircling the outer perimeter of the ceramic component), or three or more such protrusions. The ceramic component and protrusions may be a single component (i.e., the ceramic component and protrusions may be one continuous material). Alternatively, or in addition to, the protrusions may be multiple components that are adhered together and/or to the ceramic component through a weld, braze, ceramic glue or cement, or other adhesion method. In some examples, the protrusions can differ from each other in length or angle. The protrusions may extend a distance of greater than or equal to about 0.5 millimeters (mm), 1 mm, 2 mm, 3 mm, 4 mm, 6 mm, 8 mm, 10 mm, or more from a reference surface of the ceramic component extending from the first braze joint to the second braze joint.

FIGS. 10A, 10B, and 10C illustrate various ceramic components comprising physical ion blockers. FIGS. 10A, 10B, and 10C illustrate radially symmetric two-dimensional cross-sections of ceramic components comprising physical ion blockers, with the line of radial symmetry running vertically through the center of each image. FIG. 10A illustrates a ceramic component 1010 comprising a physical ion blocker 1012. Physical ion blocker 1012 comprises a protrusion angled to form a void or groove 1014 oriented downward, in a direction towards the positive side of electric field 1016. When ions traveling along the surface in the direction of electric field 1016 reach the physical ion blocker, they are redirected in a direction with a vector component that is opposite the electric field vector, as illustrated by reverse arrow 1018. Thus, the path from the bottom end to the top first approaches the top, then reverses course, before resuming motion toward the top. Because this movement is in a direction opposite the electric field, positive ions will be effectively resisted by the field, inhibiting electromigration. FIG. 10B illustrates a further embodiment in which ceramic component 1020 comprises a physical ion blocker 1022 with protrusions defining a slope at an acute angle to the surface of the ceramic component, and forming an angled groove 1024 facing generally toward the source of positive electric field (downward). This angled groove (or void) provides a similar effect to the parallel groove 1014, as ions moving along the surface over the groove may travel at least partly against the vertical electric field along the surface of the ceramic component. FIG. 10C illustrates a third example, wherein ceramic component 1030 comprises a physical ion blocker 1032 including protrusions defining a groove 1034, the groove defining a slope substantially orthogonal to the surface of the ceramic component. As illustrated here, the physical ion blocker can be formed as an integral part of, or be integrated with, the ceramic component. Alternatively, the physical ion blocker can be attached to the ceramic component.

Figure 11A:
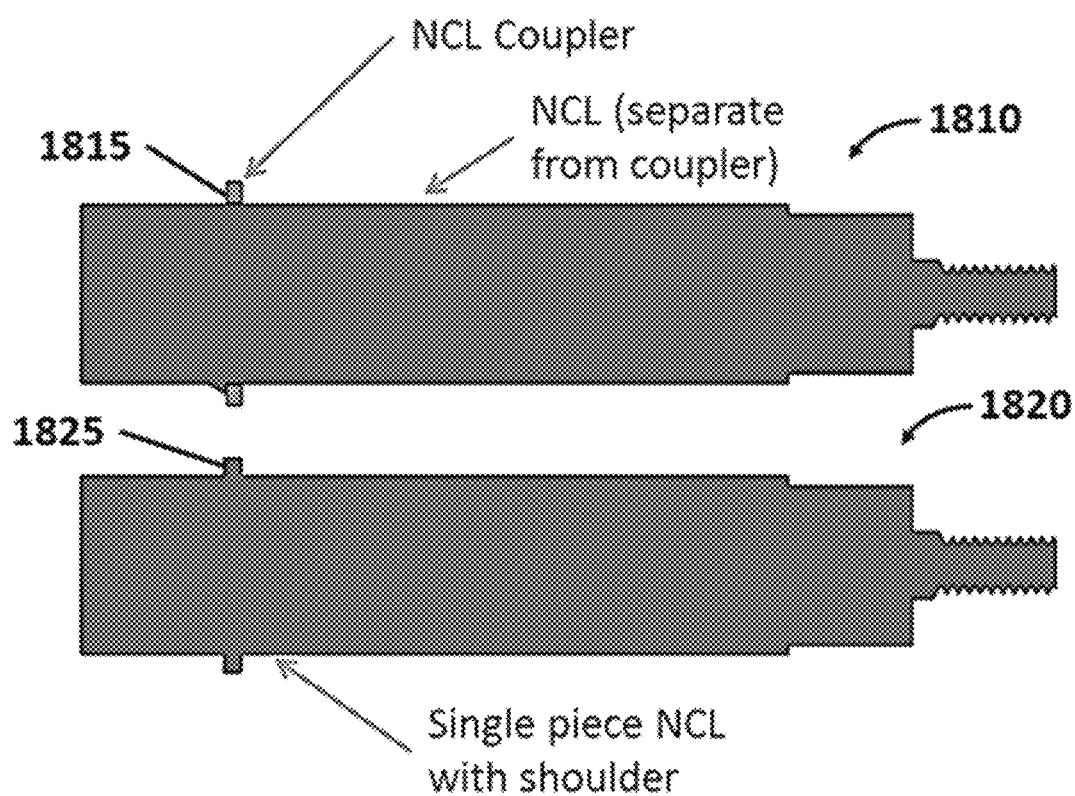
FIG. 11A illustrates negative current leads comprising negative current lead (NCL) couplers.

Refinements to current leads (e.g., negative current leads) are illustrated in FIG. 11A. FIG. 11A illustrates two embodiments of a negative current lead (NCL) comprising a coupler for joining to a metal sleeve. In the first embodiment 1110, a coupler 1115 is provided as a separate piece attached (e.g., welded) to the NCL. In the second embodiment 1120, a coupler 1825 is provided as an integral part of the NCL, forming a shoulder to which a sleeve can be joined (e.g. brazed or welded).

Figure 11B:
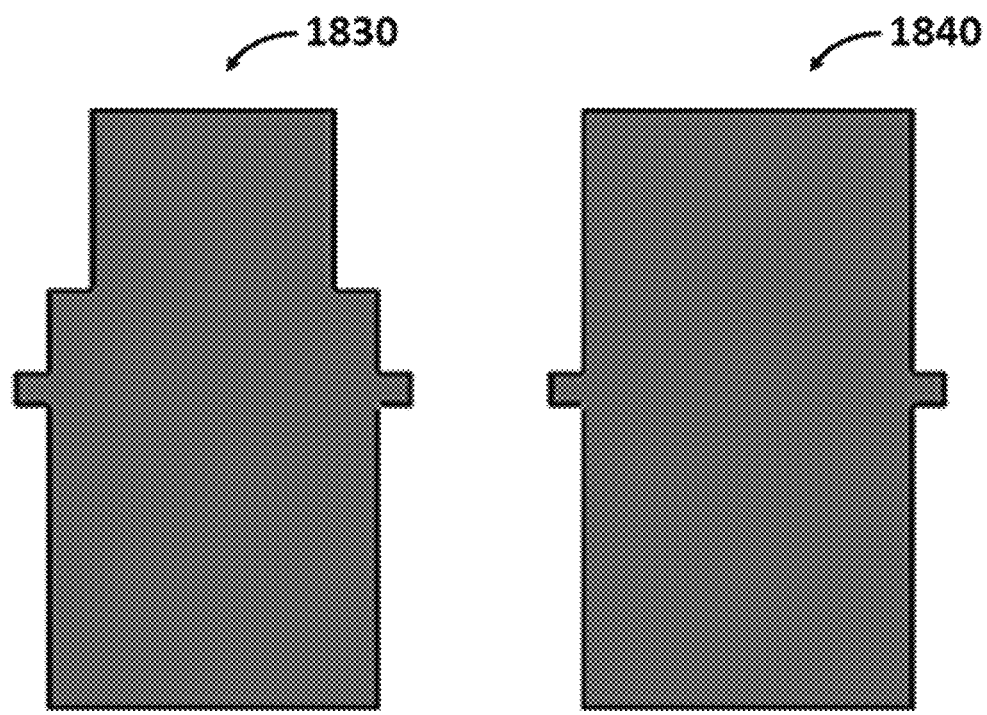
FIG. 11B shows front and side views of a current lead comprising a pair of substantially flat, parallel surfaces at one end.

FIG. 11B illustrates an additional feature that may be included in a current lead such as an NCL. In some embodiments, NCL may be provided comprising a uniform cylindrical top. Such a top can be difficult to constrain, for example, when attaching a negative current collector (e.g. to a threaded connector) on the opposite side of the NCL, or when making other attachments to the NCL. To more efficiently constrain the NCL, a pair of substantially flat, parallel surfaces can be provided on the end of the NCL. FIG. 11B shows such a feature, as illustrated by front view 1130 and side view 1140. By breaking cylindrical symmetry, these surfaces provide an effective grip point, such as by a wrench, for example. This allows torque to be applied to rotate or stabilize the NCL when adjusting the cell or NCL, or when attaching other parts (e.g., a negative current collector).

In some examples, a brazed ceramic seal comprises a sub-assembly. The sub-assembly can comprise the insulating ceramic bonded to one or more (e.g., two) flexible, spring-like or accordion-like components, referred to herein as metal sleeves. After the sub-assembly is fabricated, the sleeves can be brazed or welded to other cell components such as the negative current lead, the cell lid and/or a collar joined (e.g., welded) to the cell lid. Alternatively, all of the joints can be created on the complete cap assembly by brazing (e.g., if tolerance limits are sufficiently tight). The chemical compatibility between the braze materials and the atmospheres the materials will be exposed to, and the thermal robustness during high temperature operation and thermal cycling can be evaluated during design of the sub-assembly. In some instances, the ceramic material is aluminum nitride (AlN) or silicon nitride ($Si_3N_4$), and the braze is a titanium alloy, titanium doped nickel alloy, a zirconium alloy or a zirconium doped nickel alloy. In some instances, the ceramic material is aluminum nitride (AlN) and the braze is a silver aluminum alloy.

Figure 12:
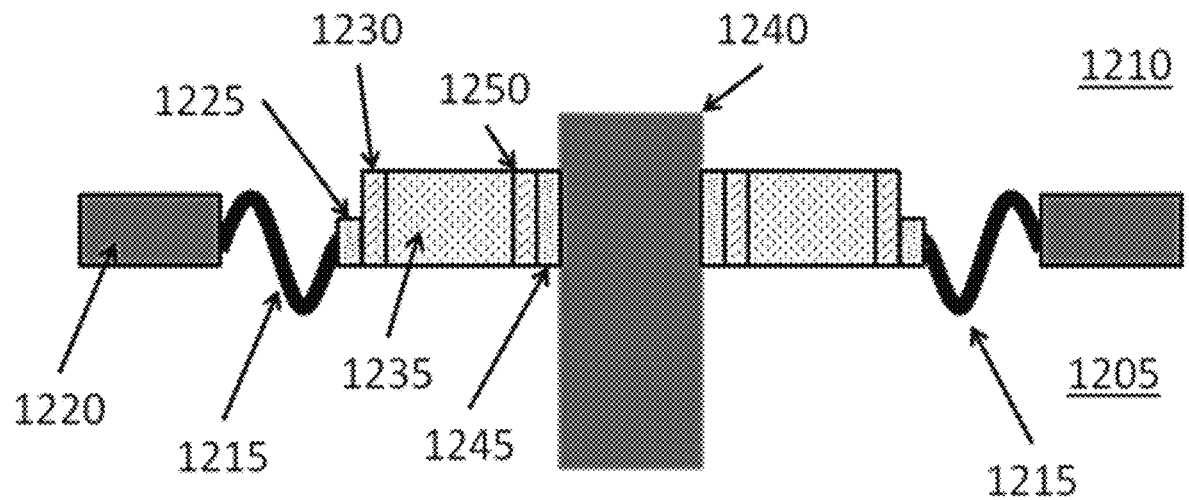
FIG. 12 shows a schematic drawing of a brazed ceramic seal where the materials are thermodynamically stable with respect to the internal and external environments of the cell.

FIG. 12 shows a schematic drawing of a brazed ceramic seal with materials that are thermodynamically stable with respect to internal 1205 and/or external 1210 environments of a cell. Such materials may not include a coating. The various materials can have mismatched CTEs that can be accommodated for with one or more geometric or structural features 1215 (e.g., a flexible metal bend, fin, or fold). The CTE-accommodating feature 1215 can be welded to a cell housing 1220 (e.g., 400-series stainless steel) on one end and brazed 1225 to a first metalized surface 1230 of a ceramic material 1235 on the other end. The ceramic material 1235 can be, for example, aluminum nitride (AlN), boron nitride (BN) or yttrium oxide ($Y_2O_3$) as described herein. The ceramic material can be brazed to a current collector (conductive feed-through) 1240 by a braze 1245. The braze 1245 can comprise, for example, iron (Fe), nickel (Ni), titanium (Ti) or zirconium (Zr). The braze 1245 can be in contact with a second metalized surface of the ceramic 1250 (e.g., titanium or titanium nitride). Several layers of materials placed adjacent to each other can result in a CTE gradient that can mitigate mismatch.

Figure 13:
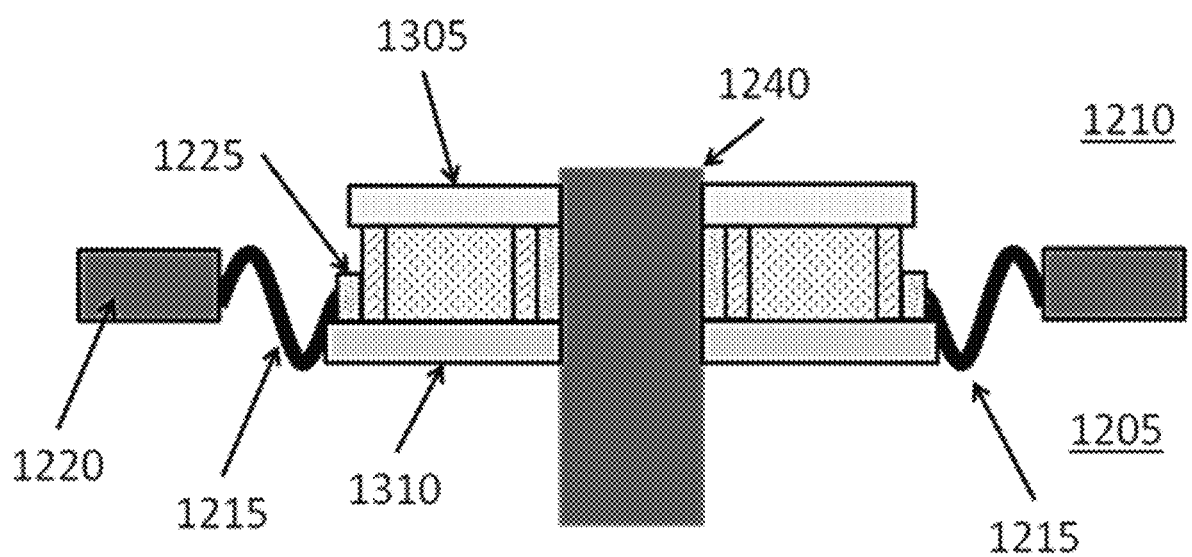
FIG. 13 shows a seal where the ceramic and/or braze materials are not thermodynamically stable with respect to the internal and external environments.

FIG. 13 shows a seal where the ceramic and/or braze materials are not thermodynamically stable with respect to the internal 1205 and external 1210 environments. In some instances, a coating can be applied to an inside 1305 and/or an outside 1310 of the seal or enclosure components.

Figure 14:
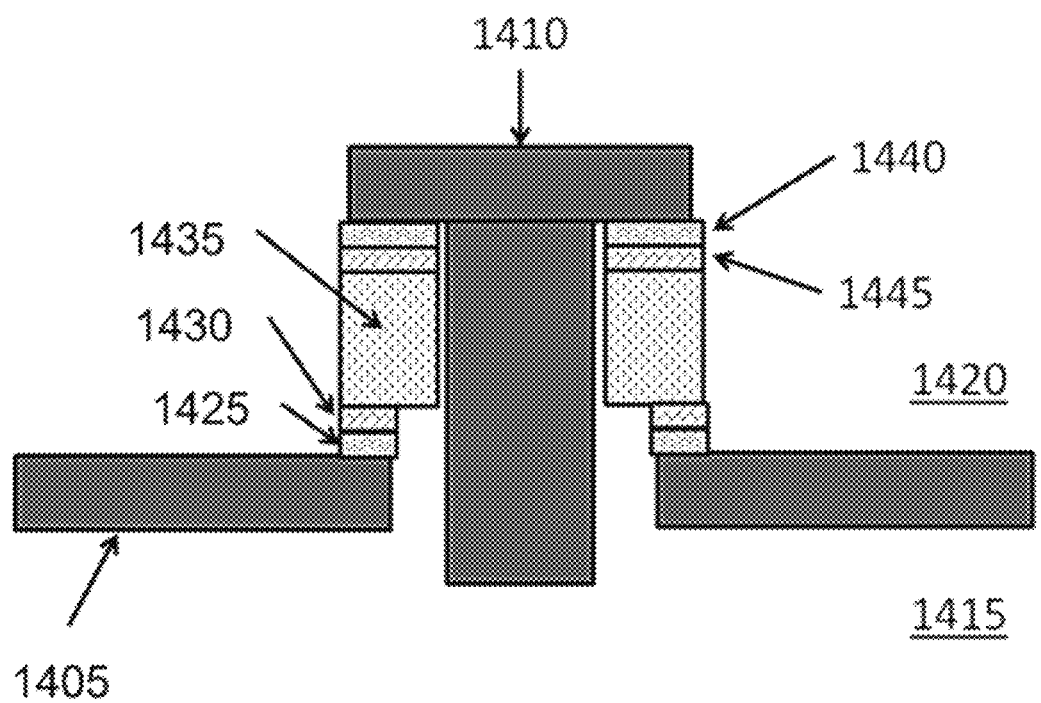
FIG. 14 shows an example of a brazed ceramic seal.

FIG. 14, FIG. 15, FIG. 16 and FIG. 17 show more examples of brazed ceramic seals. In some examples, the seals extend above the housing by a greater distance. FIG. 14 shows an example of a seal on a cell which may advantageously not include a coating, not include a CTE mismatch accommodation feature, and/or provide increased structural stability against vibration and mechanical forces during operation, manufacturing or transportation. In this example, a housing 1405 can be sealed from a current collector 1410. This arrangement can hermetically seal an inside 1415 of the cell from an outside 1420 of the cell. The components of the seal can be arranged vertically and can include a first braze 1425, a ceramic 1435, a first metalized surface 1430 of the ceramic, a second braze 1440, and a second metalized surface 1445 of the ceramic.

Figure 15:
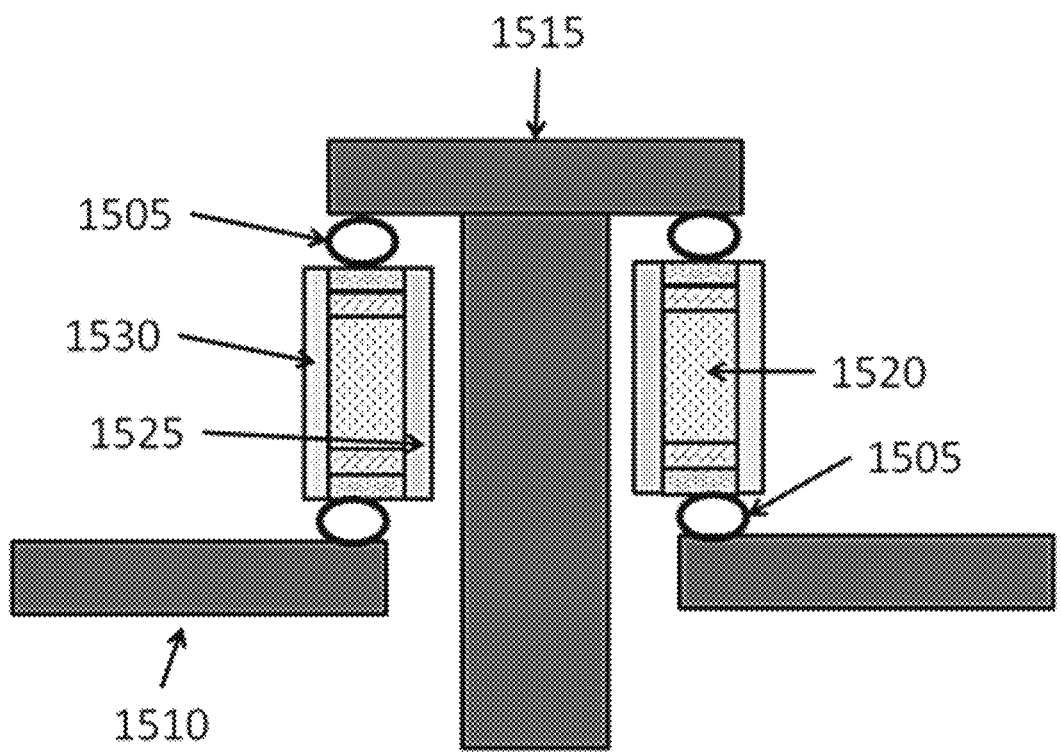
FIG. 15 shows an example of a brazed ceramic seal.

FIG. 15 shows a seal 1520 that can provide structural stability against vibration and mechanical forces during operation, manufacturing and transportation. In this example, CTE accommodating features 1505 are disposed between a housing 1510 and a current collector 1515. The seal 1520 can comprise a ceramic and two brazes in contact with metalized surfaces of the ceramic. In some examples, the seal is coated on an inside 1525 and/or an outside 1530. In some examples, the coating(s) can comprise yttrium oxide ($Y_2O_3$).

Figure 16:
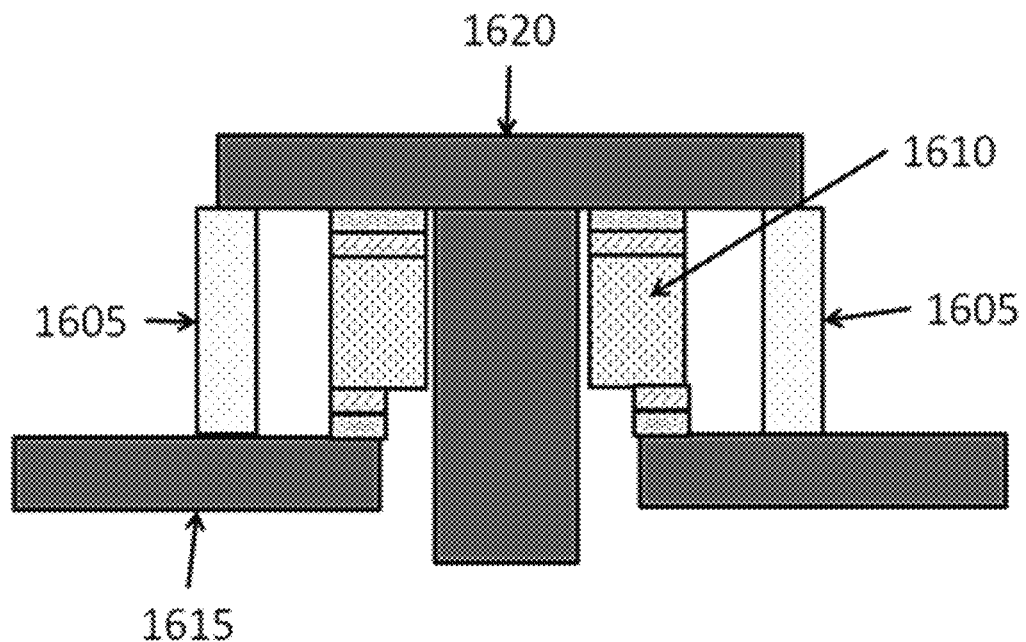
FIG. 16 shows an example of a brazed ceramic seal.

FIG. 16 shows a seal 1610 with secondary mechanical load bearing components 1605. The load bearing components are electrically insulating in some cases. In some instances, the load bearing components do not form a hermetic seal. The seal 1610 (e.g., including a ceramic, two brazes in contact with metalized surfaces of the ceramic, etc.) can hermetically seal a cell housing 1615 from a current collector 1620.

Figure 17:
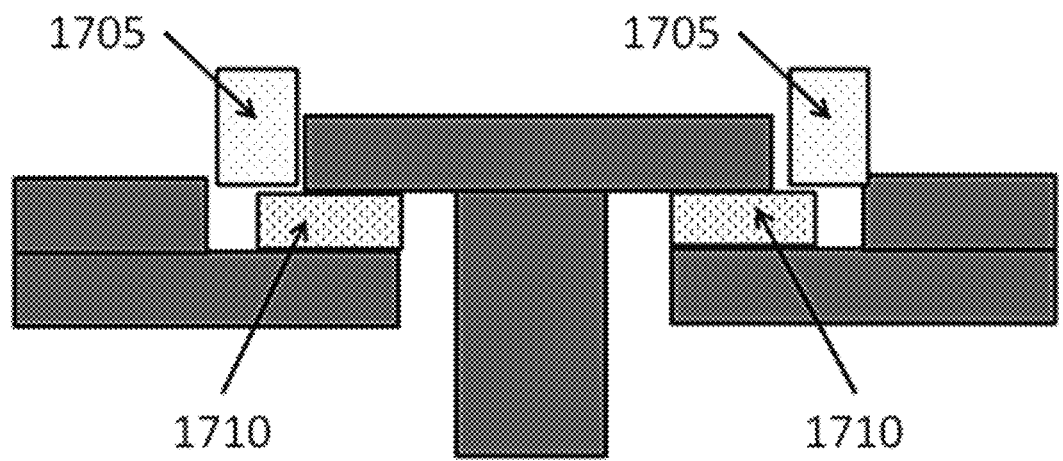
FIG. 17 shows an example of a brazed ceramic seal.

FIG. 17 shows an example of a secondary back-up seal 1705 (e.g., in case of failure of a primary seal 1710). The secondary seal can fall onto and/or bond over the primary seal in the case of failure of the primary seal. In some examples, the secondary seal comprises glass that melts and becomes flowable in the case of the primary seal failing. The melted secondary seal can pour down onto the failed primary seal and block leaks. In some examples, the seal 1705 and/or the seal 1710 can be axisymmetric (e.g., doughnut-shaped around a vertical axis through the aperture in the cell lid).

Figure 18:
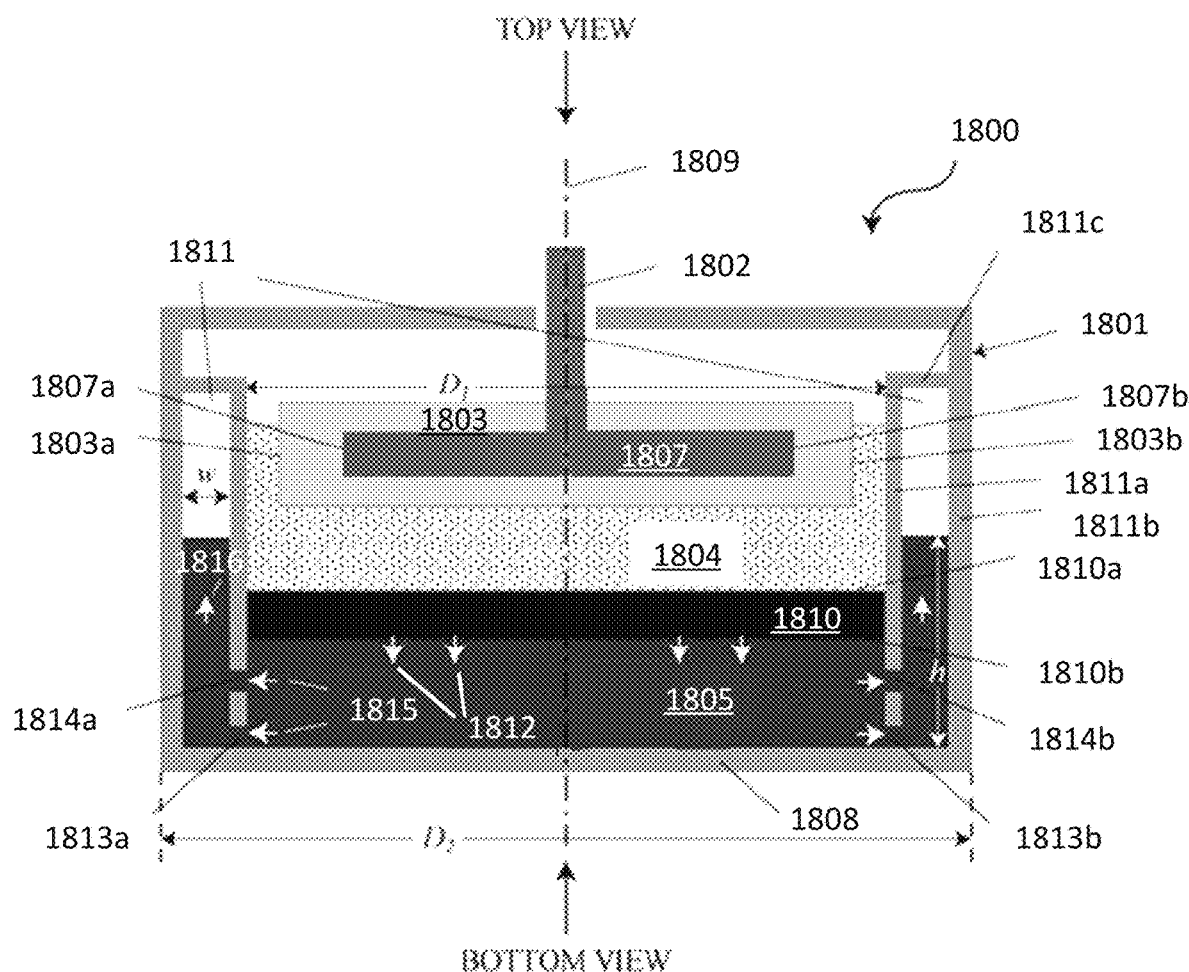
FIG. 18 is a cross-sectional size view of an electrochemical cell or battery with a pressure relief structure.

FIG. 18 is a cross-sectional side view of an electrochemical cell or battery 1800 with a pressure relief structure 1811. In an example, the battery cell 1800 can have an axially symmetric, circular cross-section when viewed from above ("top view" in FIG. 18). The housing 1801 can have concentric walls 1811a, 1811b. A first chamber or cavity can include a negative liquid metal electrode 1803, a negative current collector 1807, a liquid metal electrolyte 1804, a positive liquid metal electrode 1805 and a positive current collector 1808. During discharge, a solid intermetallic layer 1810 may form, as described elsewhere herein. The pressure relief structure 1811 forms a second chamber. The walls of the first and second chambers can form the concentric walls of the housing 1801 which may include a container, as described elsewhere herein. Thus, the pressure relief structure 1811 is provided in the annular chamber (also referred to as "riser pipe" herein) defined by the concentric walls. In some cases, the concentric walls of the housing may be integrally formed. Alternatively, the concentric walls may be formed separately and mechanically joined, e.g., by welding. The housing and/or the walls can be formed of any materials for housings/containers described herein.

During discharge, the negative liquid metal electrode 1803 can be an anode and the positive liquid metal electrode 1805 can be a cathode. The intermetallic layer 1810 includes an upper interface 1810a and a lower interface 1810b. As the lower interface 1810b of the intermetallic layer 1810 moves in a downward direction indicated by arrows 1812, the liquid material of the cathode 1805 is compressed. When pressure builds due to active electrochemistry in the first chamber space, the cathode material can rise between the walls 1811a, 1811b of the pressure relief structure 1811 via one or more openings 1813a, 1813b, 1814a, 1814b. The openings can be provided adjacent to the housing 1801 (e.g., openings 1813a, 1813b) such that the inner wall 1811a of the pressure relief structure is not in contact with the bottom wall of the housing 1801. In some examples, the bottom wall can be the positive current collector 1808. The openings can also be provided at some predetermined distance from the bottom wall of the housing 1801 (e.g., openings 1814a, 1814b). For example, the inner wall 1811a can be attached to the bottom wall of the housing and only have openings 1814a, 1814b.

The holes may be circular or of any other shape allowing the cathode material to flow through the holes. For example, circular holes may be preferred to minimize drag on the flowing cathode material. The cathode material may flow through the holes as indicated by arrows 1815, and upward in the pressure relief structure as indicated by arrows 1816.

Combinations and/or a plurality of openings 1813a, 1813b, 1814a, 1814b can be provided along the inner wall of the annular pressure relief chamber 1811. The holes may be provided at different axial distances from the bottom wall of the housing and may be of varying size. For example, the holes may be spaced to prevent the intermetallic layer 1810 from "bottoming out", i.e., from reaching the uppermost level of the holes (which may be near the bottom of the first chamber), and blocking the riser pipe inlet (the area around arrows 1815).

The pressure relief structure can have a top wall 1811c. The top wall 1811c can close the pressure relief structure to prevent material inside the riser pipe from spilling over the top of the riser pipe. In some cases, the wall 1811b may be formed separately from the housing. For example, the walls 1811a, 1811b, and 1811c can be integrally formed as an annular tube with a closed top and an open bottom (e.g., openings 1813a, 1813b), or as an annular tube with closed top and bottom but with perforations or holes near the bottom (e.g., openings 1814a, 1814b). In some examples, one or more parts or all of the pressure relief structure may be formed of one or more materials different than the housing 1801. One or more parts or all of the pressure relief structure may be formed of an electrically insulating material, such as the electrically insulating materials described elsewhere herein.

With continued reference to FIG. 18, the cathode material in the riser pipe is not in contact with to the electrolyte 1804. Further, the cathode material is electrically isolated from the electrolyte and the anode. When the cathode material is electrically conductive (e.g., a liquid metal cathode material), the cathode material in the riser pipe (second chamber) can be electrically connected with the cathode material in the first chamber. In some cases, such as, for example, when an unsheathed housing is employed as described elsewhere herein, only the wall 1811b may be electrically insulating; the walls 1811b and 1811c may be electrically conductive. The wall 1811c may only be electrically conductive if it is to not contact the electrolyte at any point.

The cathode material may rise in the pressure relief structure 1811 to a height h. The height h may vary around the circumference of the pressure relief structure. The height h can be related to the volume change of the cathode (i.e., the liquid and solid cathode materials 1805 and intermetallic layer 1810). For example, the cathode materials 1805 and 1810 can have a volume $V_1$ when charged, and a volume $V_2$ when discharged. The height h can be related to the volume difference $V_2-V_1$ and the cross-sectional area of the pressure relief structure. The annular pressure relief structure in FIG.

18 can have a width w, and an area related to w and the circumference of the annular structure. The dimensions of the pressure relief structure, e.g., w, may be such that the cathode material can easily enter and rise in the structure. For example, the pressure relief structure can be dimensioned to minimize capillary wicking effects, and to ensure that the cathode material experiences minimal drag forces. The pressure relief structure can be dimensioned to accommodate a predetermined amount of cathode material. For example, the pressure relief structure may be dimensioned to accommodate less than 10%, less than 25%, less than 50%, or less than 75% of maximum volume or mass of the cathode material or of the liquid cathode material.

In some cases, the addition of the riser pipe decreases the gap between a first negative electrode end 1803a and an adjacent wall (e.g., the wall 1811a in FIG. 18), which may contribute to enhanced side wall creep of the liquid cathode material. To prevent the cathode material from climbing the pressure relief structure 1811 along the wall facing the first chamber and shorting to the anode from the sides (i.e., climbing upward in FIG. 18, parallel and on the opposite side of the wall 1811a from the arrows 1816), the pressure relief structure(s) may be isolated from the anode by a sheath (e.g., carbon or metal nitride or other sheath materials described herein) or coating of material (e.g., PVD or CVD coating of a high temperature material), which is not readily wet by the cathode material. In some cases, the material may provide a surface texture or chemistry that interacts with the intermetallic material, e.g., the intermetallic may easily slide along the surface.

Conversely, one or more parts of the pressure relief structure, e.g., the surfaces defining the chamber of the riser pipe, may be formed of and/or coated with a material that is readily wet by the cathode to ensure smooth flow of the cathode material in the riser pipe. The material can be inert. In some cases, the material may have desired reactivity with the cathode material. In some cases, the inlet and/or the openings 1813a, 1813b, 1814a, 1814b can be coated with a material that prevents the intermetallic from sliding into the riser pipe. The inlet and/or the openings 1813a, 1813b, 1814a, 1814b may be covered with a mesh. The inlet and/or the openings 1813a, 1813b, 1814a, 1814b may comprise one or more valves or valve-like features. For example, the inlet and/or the openings can be configured to allow flow into the riser pipe above a certain hydraulic pressure value (e.g., during discharging), and to allow flow from the riser pipe into the first chamber (e.g., during charging) at a relatively lower pressure.

Alternative configurations of the pressure relief mechanism may include external pressure relief structures, such as, for example, a riser pipe mounted externally to the housing 1801 and in fluid communication with the first chamber via one or more the openings 1813a, 1813b, 1814a, 1814b, ducts or connectors.

Devices, systems and methods of the present disclosure may be combined with or modified by other devices, systems and/or methods, such as, for example, batteries and battery components described in U.S. Pat. No. 3,663,295 ("STORAGE BATTERY ELECTROLYTE"), U.S. Pat. No. 3,775,181 ("LITHIUM STORAGE CELLS WITH A FUSED ELECTROLYTE"), U.S. Pat. No. 8,268,471 ("HIGH-AMPERAGE ENERGY STORAGE DEVICE WITH LIQUID METAL NEGATIVE ELECTRODE AND METHODS"), U.S. Patent Publication No. 2011/0014503 ("ALKALINE EARTH METAL ION BATTERY"), U.S. Patent Publication No. 2011/0014505 ("LIQUID ELECTRODE BATTERY"), U.S. Patent Publication No. 2012/0104990 ("ALKALI METAL ION BATTERY WITH BIMETALLIC ELECTRODE"), U.S. Patent Publication No. 2014/0099522 ("LOW-TEMPERATURE LIQUID METAL BATTERIES FOR GRID-SCALED STORAGE"), and PCT Application No. PCT/US2016/021048 ("CERAMIC MATERIALS AND SEALS FOR HIGH TEMPERATURE REACTIVE MATERIAL DEVICES"), each of which is entirely incorporated herein by reference.

Energy storage devices of the disclosure may be used in grid-scale settings or standalone settings. Energy storage device of the disclosure can, in some cases, be used to power vehicles, such as scooters, motorcycles, cars, trucks, trains, helicopters, airplanes, and other mechanical devices, such as robots.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A high-temperature device, comprising:
    a container comprising an internal cavity, wherein the internal cavity comprises a reactive material and a gaseous headspace, and wherein the reactive material is maintained at a temperature of at least 200° C.;
    a seal that seals the internal cavity of the container from an environment external to the container, wherein the seal comprises a ceramic component, and wherein the seal is exposed to both the reactive material and the environment external to the container;
    a conductor that extends from the environment external to the container through the seal to the internal cavity of the container;
    a shield coupled to the conductor or to a wall of the internal cavity and positioned within the gaseous headspace between the reactive material and the seal; and
    a metal sleeve coupled to the conductor and to the ceramic component, wherein the metal sleeve is coupled to the ceramic component by a braze joint comprising a braze, and wherein the braze is formed of a material that is substantially unreactive to air and prevents diffusion of air into the container when the reactive material is maintained at the temperature of at least about 200° C. for a time period of at least about 1 day.

2. The high-temperature device of claim 1, wherein the braze is ductile.

3. The high-temperature device of claim 1, further comprising an internal braze and wherein the internal braze is in contact with and protects the braze from the reactive material.

4. The high-temperature device of claim 3, wherein the internal braze is an active metal braze.

5. The high-temperature device of claim 1, wherein the diffusion of air into the container is of at most about $1 \times 10^{-8}$ atmosphere-cubic centimeters per second.

6. The high-temperature device of claim 1, wherein the braze is an alloy of at least two different metals.

7. The high-temperature device of claim 1, wherein the high-temperature device is a battery, and wherein the battery comprises a negative electrode, a positive electrode, and a liquid electrolyte.

8. The high-temperature device of claim 7, wherein at least one of the negative electrode and the positive electrode is a liquid metal electrode.

9. The high-temperature device of claim 7, wherein the liquid electrolyte is a molten halide electrolyte.

10. The high-temperature device of claim 7, wherein the positive electrode comprises a solid metal or metalloid.

11. The high-temperature device of claim 1, wherein the shield is coupled to the conductor, wherein the shield at least partially blocks the seal and a liquid portion from each other, and wherein the shield is configured to (i) reduce a flow of vapor from the reactive material to the seal or (ii) reduce a flow of ions along a surface of the conductor to the seal.

12. The high-temperature device of claim 11, wherein the shield extends a distance from the conductor that is greater than or equal to about a width of the conductor.

13. The high-temperature device of claim 1, wherein the ceramic component comprises aluminum and nitrogen.

14. The high-temperature device of claim 13, wherein the ceramic component further comprises greater than or equal to about 3 weight percent of a material comprising yttrium and oxygen.

15. The high-temperature device of claim 1, wherein the braze comprises silver, titanium, or nickel.

16. The high-temperature device of claim 15, wherein the braze comprises titanium and one or more members selected from the group consisting of zirconium, copper, and nickel.

17. The high-temperature device of claim 15, wherein the braze comprises nickel and one or more members selected from the group consisting of chromium, silicon, boron, and iron.

18. The high-temperature device of claim 15, wherein the braze comprises silver, and wherein the ceramic component comprises a physical ion blocker on a surface of the ceramic component.

19. The high-temperature device of claim 1, further comprising an additional metal sleeve coupled to the ceramic component and (i) the container or (ii) a collar joined to the container.

20. The high-temperature device of claim 1, wherein the vapor is a reactive metal vapor.

* * * * *